US008401766B2

(12) United States Patent
Iwazaki et al.

(10) Patent No.: US 8,401,766 B2
(45) Date of Patent: Mar. 19, 2013

(54) INTER-CYLINDER AIR-FUEL RATIO IMBALANCE DETERMINATION APPARATUS FOR INTERNAL COMBUSTION ENGINE

(75) Inventors: Yasushi Iwazaki, Ebina (JP); Hiroshi Sawada, Gotenba (JP); Hiroshi Miyamoto, Susono (JP); Fumihiko Nakamura, Susono (JP); Keiichiro Aoki, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/514,764

(22) PCT Filed: Dec. 9, 2009

(86) PCT No.: PCT/JP2009/070939
§ 371 (c)(1),
(2), (4) Date: Jul. 27, 2012

(87) PCT Pub. No.: WO2011/070688
PCT Pub. Date: Jun. 16, 2011

(65) Prior Publication Data
US 2012/0323466 A1 Dec. 20, 2012

(51) Int. Cl.
*G06F 19/00* (2011.01)
*F02D 41/14* (2006.01)
*G01N 27/407* (2006.01)

(52) U.S. Cl. ........ 701/109; 123/697; 73/23.32; 204/426

(58) Field of Classification Search .................. 123/673, 123/674, 697, 703; 701/102–104, 109, 114; 73/23.31, 23.32, 114.71–114.73; 204/401, 204/424–427; 324/610, 611, 720, 725
See application file for complete search history.

(56) References Cited

U.S. PATENT DOCUMENTS
(Continued)

FOREIGN PATENT DOCUMENTS

| | | |
|---|---|---|
| JP | A-11-072473 | 3/1999 |
| JP | A-2000-065782 | 3/2000 |

(Continued)

OTHER PUBLICATIONS

Feb. 23, 2010 Written Opinion issued in Application No. PCT/JP2009/070939 (with English translation).

(Continued)

*Primary Examiner* — Willis R Wolfe, Jr.
(74) *Attorney, Agent, or Firm* — Oliff & Berridge, PLC

(57) ABSTRACT

An inter-cylinder air-fuel ratio imbalance determination apparatus (determination apparatus) according to the present invention obtains, based on the output value of the air-fuel ratio sensor, an imbalance determination parameter which becomes larger as an air-fuel ratio fluctuation of an exhaust gas passing through a position at which the air-fuel ratio sensor is disposed becomes larger, during a parameter obtaining period. The determination apparatus energizes the heater of the air-fuel ratio sensor in such a manner that a temperature of the air-fuel ratio element during the parameter obtaining period is higher than a temperature of the air-fuel ratio element during a period other than the parameter obtaining period. Accordingly, the imbalance determination parameter is obtained while the responsiveness of the air-fuel ratio sensor is high, and thus, the inter-cylinder air-fuel-ratio imbalance determination having a high accuracy can be made.

12 Claims, 25 Drawing Sheets

U.S. PATENT DOCUMENTS

| | | | | | |
|---|---|---|---|---|---|
| 5,182,519 | A * | 1/1993 | Suzuki | 324/611 |
| 5,279,145 | A * | 1/1994 | Suzuki | 73/23.32 |
| 5,976,350 | A * | 11/1999 | Yamada et al. | 204/426 |
| 6,099,717 | A * | 8/2000 | Yamada et al. | 204/426 |
| 6,532,932 | B1 * | 3/2003 | Strauss | 123/673 |
| 7,152,594 | B2 | 12/2006 | Anilovich et al. | |
| 2009/0260419 | A1 | 10/2009 | Maeda et al. | |
| 2011/0054761 | A1 * | 3/2011 | Sawada et al. | 701/103 |
| 2011/0308506 | A1 * | 12/2011 | Hayashita et al. | 123/703 |
| 2012/0277980 | A1 * | 11/2012 | Iwazaki et al. | 701/104 |

FOREIGN PATENT DOCUMENTS

| | | |
|---|---|---|
| JP | A-2003-107035 | 4/2003 |
| JP | A-2003-328848 | 11/2003 |
| JP | A-2004-069547 | 3/2004 |
| JP | A-2009-013967 | 1/2009 |
| JP | A-2009-074559 | 4/2009 |
| JP | A-2009-257245 | 11/2009 |
| JP | A-2009-264287 | 11/2009 |

OTHER PUBLICATIONS

Feb. 23, 2010 International Search Report issued in Application No. PCT/JP2009/070939.

* cited by examiner

INTER-CYLINDER AIR-FUEL RATIO IMBALANCE DETERMINATION APPARATUS FOR INTERNAL COMBUSTION ENGINE

TECHNICAL FIELD

The present invention relates to an "inter-cylinder air-fuel ratio imbalance determination apparatus for an internal combustion engine," which is applied to a multi-cylinder internal combustion engine, and which can determine (monitor/detect) that a degree of imbalance among the air-fuel ratios of air-fuel mixtures, each supplied to each of cylinders (inter-cylinder air-fuel ratio imbalance; inter-cylinder air-fuel ratio variation; or inter-cylinder air-fuel ratio non-uniformity) has increased excessively.

BACKGROUND ART

Conventionally, as shown in FIG. 1, there has been widely known an air-fuel ratio control apparatus which includes a three-way catalyst (53) disposed in an exhaust passage of an internal combustion engine, and an upstream air-fuel ratio sensor (67) and a downstream air-fuel ratio sensor (68) that are disposed upstream and downstream, respectively, of the three-way catalyst (53) in the exhaust passage.

This air-fuel ratio control apparatus calculates, based on the outputs of the upstream and downstream air-fuel ratio sensors, an "air-fuel ratio feedback amount for having the air-fuel ratio of the air-fuel mixture supplied to the engine (air-fuel ratio of the engine) coincide with the stoichiometric air-fuel ratio such that the air-fuel ratio of the engine coincides with the stoichiometric air-fuel ratio, and is configured so as to feedback-control the air-fuel ratio of the engine based on the air-fuel ratio feedback amount. Furthermore, there has been also widely known an air-fuel ratio control apparatus which calculates, based on the output of the upstream air-fuel ratio sensor only, an "air-fuel ratio feedback amount for having the air-fuel ratio of the engine coincide with the stoichiometric air-fuel ratio", and is configured so as to feedback-control the air-fuel ratio of the engine based on the air-fuel ratio feedback amount. The air-fuel ratio feedback amount used in each of those air-fuel ratio control apparatuses is a control amount commonly used for all of the cylinders.

Meanwhile, in general, an electronic-fuel-injection-type internal combustion engine has at least one fuel injection valve (39) at each of the cylinders or at each of intake ports communicating with the respective cylinders. Accordingly, when the characteristic/property of the fuel injection valve of a certain cylinder changes to a characteristic that it injects fuel in an amount excessively larger than an instructed fuel injection amount, only the air-fuel ratio of an air-fuel mixture supplied to that certain cylinder (the air-fuel ratio of the certain cylinder) greatly changes toward the rich side. That is, the degree of an air-fuel ratio non-uniformity among the cylinders (inter-cylinder air-fuel ratio variation; inter-cylinder air-fuel ratio imbalance) increases. In other words, there arises an imbalance among "cylinder-by-cylinder air-fuel ratios," each of which is the air-fuel ratio of the air-fuel mixture supplied to each of the cylinders.

In such a case, the average of the air-fuel ratios of the air-fuel mixtures supplied to the entire engine becomes an air-fuel ratio richer than the stoichiometric air-fuel ratio. Accordingly, by the air-fuel ratio feedback amount commonly used for all of the cylinders, the air-fuel ratio of the above-mentioned certain cylinder is changed toward the lean side so as to come closer to the stoichiometric air-fuel ratio, and, at the same time, the air-fuel ratios of the remaining cylinders are changed toward the lean side so as to deviate from the stoichiometric air-fuel ratio. As a result, the average of the air-fuel ratios of the air-fuel mixtures supplied to the entire engine becomes substantially equal to the stoichiometric air-fuel ratio.

However, since the air-fuel ratio of the certain cylinder is still in the rich side in relation to the stoichiometric air-fuel ratio and the air-fuel ratios of the remaining cylinders are in the lean side in relation to the stoichiometric air-fuel ratio, combustion of the air-fuel mixture in each of the cylinders fail to become complete combustion. As a result, the amount of emissions (the amount of unburned combustibles and/or the amount of nitrogen oxides) discharged from each of the cylinders increases. Therefore, even when the average of the air-fuel ratios of the air-fuel mixtures supplied to the cylinders of the engine is equal to the stoichiometric air-fuel ratio, the increased emissions cannot be completely removed by the three-way catalyst. Consequently, the amount of emissions may increase.

Accordingly, in order to prevent emissions from increasing, it is important to detect a state in which the degree of the air-fuel ratio non-uniformity among the cylinders becomes excessively large (generation of an inter-cylinder air-fuel ratio imbalance state) for taking some measures against the imbalance state. It should be noted that, the inter-cylinder air-fuel ratio imbalance also occurs, for example, in a case where the characteristic of the fuel injection valve of the certain cylinder changes to a characteristic that it injects fuel in an amount excessively smaller than the instructed fuel injection amount.

One of such conventional apparatuses for determining whether or not an inter-cylinder air-fuel ratio imbalance state has occurred is configured so as to obtain a trace/trajectory length of an output value (output signal) of an air-fuel ratio sensor (the above-mentioned upstream air-fuel ratio sensor 67) disposed at an exhaust merging/aggregated region/portion into which exhaust gases from a plurality of cylinders of an engine merge, compare the trace length with a "reference value which changes in accordance with the rotational speed of the engine," and determine whether or not the inter-cylinder air-fuel ratio imbalance state has occurred based on the result of the comparison (see, for example, U.S. Pat. No. 7,152,594).

It should be noted that, in the present specification, the expression of "an inter-cylinder air-fuel ratio imbalance state (excessive inter-cylinder air-fuel ratio imbalance state)" means a state in which the difference between the cylinder-by-cylinder air-fuel ratios is equal to or greater than an allowable value; in other words, it means an inter-cylinder air-fuel ratio imbalance state in which the amount of unburned combustibles and/or nitrogen oxides exceeds a prescribed value. The determination as to whether or not an "inter-cylinder air-fuel ratio imbalance state" has occurred will be simply referred to as an "inter-cylinder air-fuel ratio imbalance determination" or an "imbalance determination." Moreover, a cylinder supplied with an air-fuel mixture whose air-fuel ratio deviates from the air-fuel ratio of air-fuel mixtures supplied to the remaining cylinders (for example, an air-fuel ratio approximately equal to the stoichiometric air-fuel ratio) will also be referred to as an "imbalanced cylinder." The air-fuel ratio of the air-fuel mixture supplied to such an imbalanced cylinder will also be referred to as an "air-fuel ratio of the imbalanced cylinder." The remaining cylinders (cylinders other than the imbalanced cylinder) will also be referred to as "normal cylinders" or "balanced cylinders." The air-fuel ratio of air-fuel mixtures supplied to such normal cylinders will also be referred as an "air-fuel ratio of the normal cylinders" or an "air-fuel ratio of the balanced cylinders."

In addition, a parameter (e.g., the above-mentioned trace length of the output value of the air-fuel ratio sensor), whose absolute value increases as the difference between the cylinder-by-cylinder air-fuel ratios (the difference between the air-fuel ratio of the imbalanced cylinder and those of the normal cylinders) becomes larger will also be referred to as an "air-fuel ratio fluctuation indicating amount." That is, the air-fuel ratio fluctuation indicating amount is a "value obtained based on the output value of the air-fuel ratio sensor" in such a manner that its absolute value becomes larger as the air-fuel ratio variation/fluctuation of the exhaust gas reaching the above-mentioned air-fuel ratio sensor becomes larger. Further, a value, which is obtained based on the air-fuel ratio fluctuation indicating amount, and which becomes larger as the absolute value of the air-fuel ratio fluctuation indicating amount becomes larger, will also be referred to as an "imbalance determination parameter." In other words, the imbalance determination parameter is a parameter which becomes larger as the fluctuation/variation of the air-fuel ratio of the exhaust gas passing through the position at which the air-fuel ratio sensor is disposed becomes larger. This imbalance determination parameter is compared with the imbalance determination threshold in order to perform (carry out) the imbalance determination.

SUMMARY OF THE INVENTION

As shown in (A) of FIG. 2, for example, a well-known air-fuel ratio sensor includes an air-fuel ratio detecting section, which includes at least a solid electrolyte layer (671), an exhaust-gas-side electrode layer (672), an atmosphere-side electrode layer (673), a diffusion resistance layer (674), and a heater (678).

The exhaust-gas-side electrode layer (672) is formed on one of surfaces of the solid electrolyte layer (671). The exhaust-gas-side electrode layer (672) is covered with the diffusion resistance layer (674). Exhaust gas within an exhaust passage reaches an outer surface of the diffusion resistance layer (674), and reaches the exhaust-gas-side electrode layer (672) after passing through the diffusion resistance layer (674). The atmosphere-side electrode layer (673) is formed on the other one of surfaces of the solid electrolyte layer (671). The atmosphere-side electrode layer (673) is exposed to an atmosphere chamber (67A) into which atmospheric air is introduced. The heater (678) generates a heat when energized so as to adjust a temperature of a sensor element section. The sensor element section includes at least the solid electrolyte layer (671), the exhaust-gas-side electrode layer (672), and the atmosphere-side electrode layer (673).

As shown in (B) and (C) of FIG. 2, a voltage (Vp) is applied between the exhaust-gas-side electrode layer (672) and the atmosphere-side electrode layer (673) so as to generate a "limiting current which changes in accordance with the air-fuel ratio of the exhaust gas." In general, this voltage is applied such that the potential of the atmosphere-side electrode layer (673) becomes higher than that of the exhaust-gas-side electrode layer (672).

As shown in (B) of FIG. 2, when an excessive amount of oxygen is contained in the exhaust gas reaching the exhaust-gas-side electrode layer (672) through the diffusion resistance layer (674) (that is, when the air-fuel ratio of the exhaust gas reaching the exhaust-gas-side electrode layer is leaner than the stoichiometric air-fuel ratio), the oxygen is led in the form of oxygen ion from the exhaust-gas-side electrode layer (672) to the atmosphere-side electrode layer (673) owing to the application of the above-mentioned voltage and an oxygen pump characteristic of the solid electrolyte layer (671).

In contrast, as shown in (C) of FIG. 2, when excessive unburned combustibles are contained in the exhaust gas reaching the exhaust-gas-side electrode layer (672) through the diffusion resistance layer (674) (that is, when the air-fuel ratio of the exhaust gas reaching the exhaust-gas-side electrode layer is richer than the stoichiometric air-fuel ratio), oxygen within the atmosphere chamber (67A) is led in the form of oxygen ion from the atmosphere-side electrode layer (673) to the exhaust-gas-side electrode layer (672) owing to an oxygen cell characteristic of the solid electrolyte layer (671), so as to react with the unburned combustibles at the exhaust-gas-side electrode layer (672).

Because of the presence of the diffusion resistance layer (674), a moving amount of such oxygen ions is limited to a value corresponding to the "air-fuel ratio of the exhaust gas reaching the outer surface of the diffusion resistance layer (674)." In other words, a current generated as a result of movement of the oxygen ions has a magnitude corresponding to the air-fuel ratio (A/F) of the exhaust gas (that is, limiting current Ip) (see FIG. 3).

The air-fuel ratio sensor outputs an output value Vabyfs corresponding to the "air-fuel ratio of the exhaust gas passing through the position at which the air-fuel ratio sensor is disposed" based on the limiting current (the current flowing through the solid electrolyte layer owing to the application of the voltage between the exhaust-gas-side electrode layer and the atmosphere-side electrode layer). This output value Vabyfs is generally converted into a detected air-fuel ratio abyfs based on a previously obtained "relationship between the output value Vabyfs and the air-fuel ratio, shown in FIG. 4." As understood from FIG. 4, the output value Vabyfs is substantially proportional to the detected air-fuel ratio abyfs.

Meanwhile, the air-fuel ratio fluctuation indicating amount which is a "base data for the imbalance determination parameter" is not limited to the trace length of "the output value Vabyfs of the air-fuel ratio sensor or the detected air-fuel ratio abyfs," but may be any one of values which reflect a fluctuation of the air-fuel ratio of the exhaust gas flowing through the position at which the air-fuel ratio sensor is disposed (e.g., a fluctuation amount of one of those per/for a predetermined period). This point will be described further.

Exhaust gases from the cylinders successively reach the air-fuel ratio sensor in the order of ignition (accordingly, in the order of exhaust). In a case where no inter-cylinder air-fuel ratio imbalance state has been occurring, the air-fuel ratios of the exhaust gases discharged from the cylinders are approximately equal to one another. Accordingly, in the case where no inter-cylinder air-fuel ratio imbalance state has been occurring, as shown by a broken line C1 in (B) of FIG. 5, the waveform of the output value Vabyfs of the air-fuel ratio sensor (in (B) of FIG. 5, the waveform of the detected air-fuel ratio abyfs) is almost flat.

In contrast, in a case where there has been occurring an inter-cylinder air-fuel ratio imbalance state in which only the air-fuel ratio of a specific cylinder (for example, the first cylinder) has deviated toward the rich side from the stoichiometric air-fuel ratio (specific-cylinder rich-side-deviated imbalance state), the air-fuel ratio of the exhaust gas from the specific cylinder greatly differs from those of the exhaust gases from the cylinders (the remaining cylinders) other than the specific cylinder.

Accordingly, as shown by a solid line C2 in (B) of FIG. 5, the waveform of the output value Vabyfs of the air-fuel ratio sensor (in (B) of FIG. 5, the waveform of the detected air-fuel ratio abyfs) in a case where the specific-cylinder rich-side-deviated imbalance state has been occurring greatly fluctuates. Specifically, in a case of a four-cylinder, four-cycle engine, the waveform of the output value Vabyfs of the air-fuel ratio sensor greatly fluctuates every 720° crank angle (the crank angle required for all of the cylinders, each of which discharges exhaust gas which reaches a single air-fuel ratio sensor, to complete their single-time combustion strokes). It should be noted that, in the present specification, a "period corresponding to the crank angle required for all of the cylinders, each of which discharges the exhaust gas which reaches the single air-fuel ratio sensor, to complete their single-time combustion strokes" will also be referred to as a "unit combustion cycle period."

Further, an amplitude of the output value Vabyfs of the air-fuel ratio sensor and that of the detected air-fuel ratio abyfs become larger, as the air-fuel ratio of the imbalanced cylinder deviates more greatly from the air-fuel ratios of the balanced cylinders. For example, assuming that the detected air-fuel ratio abyfs varies as shown by a solid line C2 in (B) of FIG. 5 when a difference between the air-fuel ratio of the imbalanced cylinder and the air-fuel ratios of the balanced cylinders is equal to a first value, the detected air-fuel ratio abyfs varies as shown by a broken line C2*a* in (B) of FIG. 5 when the difference between the air-fuel ratio of the imbalanced cylinder and the air-fuel ratios of the balanced cylinders is equal to a "second value larger than the first value."

Accordingly, a change amount per unit time of the output value Vabyfs of the air-fuel ratio sensor or of the detected air-fuel ratio abyfs (i.e., a first order differential value of the output value Vabyfs of the air-fuel ratio sensor or of the detected air-fuel ratio abyfs with respect to time, refer to angles $\alpha$1, $\alpha$2 shown in (B) of FIG. 5) fluctuates slightly as shown by a broken line C3 in (C) of FIG. 5 when the cylinder-by-cylinder air-fuel ratio difference is small, and fluctuates greatly as shown by a solid line C4 in (C) of FIG. 5 when the cylinder-by-cylinder air-fuel ratio difference is large. That is, an absolute value of the differential value d(Vabyfs)/dt or of the differential value d(abyfs/dt) becomes larger as the degree of the inter-cylinder air-fuel-ratio imbalance state becomes larger (as the cylinder-by-cylinder air-fuel ratio difference becomes larger).

In view of the above, for example, "a maximum value or a mean value" of the absolute values of "the differential values d(Vabyfs)/dt or the differential values d(abyfs/dt)", that are obtained a plurality of times in the unit combustion cycle period can be adopted as the air-fuel ratio fluctuation indicating amount. Further, the air-fuel ratio fluctuation indicating amount itself or a mean value of the air-fuel ratio fluctuation indicating amounts obtained for a plurality of the unit combustion cycle periods can be adopted as the imbalance determination parameter.

Further, as shown in (D) of FIG. 5, a change amount of the change amount of "the output value Vabyfs of the air-fuel ratio sensor or of the detected air-fuel ratio abyfs" (i.e., a second order differential value $d^2$(Vabyfs)/$dt^2$ or a second order differential value $d^2$(abyfs)/$dt^2$) hardly fluctuates as shown by a broken line C5 when the cylinder-by-cylinder air-fuel ratio difference is small, but greatly fluctuates as shown by a solid line C6 when the cylinder-by-cylinder air-fuel ratio difference is large.

In view of the above, for example, "a maximum value or a mean value" of the absolute values of "the second order differential values $d^2$(Vabyfs)/$dt^2$ or the second order differential values $d^2$(abyfs)/$dt^2$", that are obtained a plurality of times in the unit combustion cycle period can also be adopted as the air-fuel ratio fluctuation indicating amount. Further, the air-fuel ratio fluctuation indicating amount itself or a mean value of the air-fuel ratio fluctuation indicating amounts obtained for a plurality of the unit combustion cycle periods can be adopted as the imbalance determination parameter.

The inter-cylinder air-fuel ratio imbalance determination apparatus determines whether or not the inter-cylinder air-fuel-ratio imbalance state has been occurring by determining whether or not the imbalance determination parameter thus obtained is larger than a predetermined threshold (imbalance determination threshold).

However, the present inventor(s) has/have acquired findings/knowledge that a state occurs in which the output value Vabyfs of the air-fuel ratio sensor fails to change/vary with respect to the fluctuation of the exhaust gas while showing a good responsiveness (or in which the responsiveness of the air-fuel sensor is not sufficient), and in such a state, the imbalance determination parameter obtained according to the air-fuel ratio fluctuation indicating amount fails to represent the "degree of the inter-cylinder air-fuel ratio imbalance state", and thus, the inter-cylinder air-fuel ratio imbalance determination cannot be performed accurately.

The state in which the output value Vabyfs of the air-fuel ratio sensor fails to change/vary with respect to the fluctuation of the exhaust gas while showing a good responsiveness (in other words, the state in which the responsiveness of the air-fuel sensor becomes worse) occurs, when, for example, the air-fuel ratio of the exhaust gas fluctuates in an air-fuel ratio range which is very close to the stoichiometric air-fuel ratio. It is inferred that the reason why the responsiveness of the air-fuel sensor becomes worse when the air-fuel ratio of the exhaust gas fluctuates in the air-fuel ratio range which is very close to the stoichiometric air-fuel ratio is a direction of a reaction (oxidation-reduction reaction) at the exhaust-gas-side electrode layer must change to a reverse direction when the air-fuel ratio of the exhaust gas changes from an "air-fuel ratio richer than the stoichiometric air-fuel ratio" to an "air-fuel ratio leaner than the stoichiometric air-fuel ratio," or vice versa, and accordingly, it requires a considerable time for a direction of the oxygen ions passing through the solid electrolyte layer to be reversed.

Meanwhile, FIG. 6 is a graph showing a relation between the temperature of the element section of the air-fuel ratio sensor (hereinafter, also referred to as "an air-fuel ratio sensor element temperature or a sensor element temperature") and the responsiveness of the air-fuel ratio sensor. In FIG. 6, a response time t representing the responsiveness of the air-fuel ratio sensor is, for example, a time (duration) from a "specific point in time" at which an "air-fuel ratio of the exhaust gas which is present in the vicinity of the air-fuel ratio sensor" is changed from a "first air-fuel ratio (e.g., 14) richer than the stoichiometric air-fuel ratio" to a "second air-fuel ratio (e.g., 15) leaner than the stoichiometric air-fuel ratio" to a point in time at which the detected air-fuel ratio abyfs changes from the first air-fuel ratio to a third air-fuel ratio which is between the first air-fuel ratio and the second air-fuel ratio (e.g., the third air-fuel ratio being $14.63=14+0.63\cdot(15-14)$). Accordingly, the responsiveness of the air-fuel ratio sensor is better (higher) as the response time t is shorter.

As understood from FIG. 6, the responsiveness of the air-fuel ratio sensor is better as the air-fuel ratio sensor element temperature is higher. It is inferred that the reason for that is the reaction (oxidation-reduction reaction) at the sensor element section (especially, at the exhaust-gas-side electrode layer) becomes more active. Accordingly, adjusting a heat amount of the heater in such a manner that the air-fuel ratio sensor element temperature is maintained at a high temperature enables to obtain the imbalance determination parameter having a high accuracy. On the other hand, if the air-fuel ratio sensor element temperature is always maintained at the high temperature, the air-fuel ratio sensor may deteriorate (deterioration with age may occurs) relatively early.

In view of the above, one of objects of the present invention is to provide an inter-cylinder air-fuel ratio imbalance determination apparatus (hereinafter, also referred to as a "present invention apparatus") which can accurately perform an inter-cylinder air-fuel ratio imbalance determination while avoiding the deterioration of the air-fuel ratio sensor as much as possible.

The present invention apparatus controls the heater (controls an amount of heat generation) in such a manner that "an air-fuel ratio sensor element temperature during (while) the imbalance determination parameter is being obtained (parameter-obtaining-period-element-temperature)" becomes/is higher than "an air-fuel ratio sensor element temperature during (while) the imbalance determination parameter is not being obtained (parameter-non-obtaining-period-element-temperature)." This makes it possible to obtain the imbalance determination parameter in a "state where the responsiveness of the air-fuel ratio sensor is good." Accordingly, the thus obtained imbalance determination parameter becomes a value which accurately represents the inter-cylinder air-fuel-ratio imbalance state (cylinder-by-cylinder air-fuel ratio difference). Consequently, the inter-cylinder air-fuel-ratio imbalance determination can be performed accurately.

Further, the present invention apparatus maintains the air-fuel ratio sensor element temperature for a period in which the imbalance determination parameter is not being obtained (the parameter-non-obtaining-period-element-temperature) at a "relatively low temperature which is equal to or higher than an activating temperature of the air-fuel ratio sensor." Accordingly, it is possible to avoid that the deterioration of the sensor occurs early, as compared to a case in which the air-fuel ratio sensor element temperature is always maintained at a relatively high temperature.

Specifically, one of aspects of the present invention apparatus is applied to a multi-cylinder internal combustion engine, and includes a plurality of fuel injection valves (injectors), heater control means, and imbalance determining means.

The air-fuel ratio sensor is disposed in an exhaust merging portion of an exhaust passage of the engine into which exhaust gases discharged from at least two or more (preferably, three or more) of the cylinders among a plurality of cylinders merge, or is disposed in the exhaust passage at a position/location downstream of the exhaust merging portion.

Further, the air-fuel ratio sensor includes an air-fuel ratio detecting section having a solid electrolyte layer, an exhaust-gas-side electrode layer formed on one of surfaces of the solid electrolyte layer, a diffusion resistance layer which covers the exhaust-gas-side electrode layer and at which the exhaust gases arrive, an atmosphere-side electrode layer which is formed on the other one of the surfaces of the solid electrolyte layer and is exposed to an atmosphere chamber, and a heater. The heater heats up the sensor element section so as to control/adjust a temperature of the sensor element section. The sensor element section includes the solid electrolyte layer, the exhaust-gas-side electrode layer, and the atmosphere-side electrode layer. In addition, the air-fuel ratio sensor outputs an output value corresponding to an "air-fuel ratio of the exhaust gas passing through the position at which the air-fuel ratio sensor is disposed" based on a limiting current flowing through the solid electrolyte layer owing to an application of a voltage between the exhaust-gas-side electrode layer and the atmosphere-side electrode layer.

Each of a plurality of the fuel injection valves is disposed in such a manner that each of the injection valves corresponds to each of the above-mentioned at least two or more of the cylinders, and injects fuel contained in an air-fuel mixture supplied to a combustion chamber of the corresponding cylinder. That is, one or more fuel injection valves are provided for each cylinder. Each of the fuel injection valves injects fuel to the cylinder corresponding to that fuel injection valve.

The heater control means controls an amount of heat generation of the heater.

The imbalance determining means:

(1) obtains, based on the output value of the air-fuel ratio sensor, an imbalance determination parameter which becomes larger as a "variation/fluctuation of the air-fuel ratio of the exhaust gas passing/flowing through the position at which the air-fuel ratio sensor is disposed" becomes larger, in a "parameter obtaining period" which is a "period for/in which a predetermined parameter obtaining condition is being satisfied";

(2) determines that an inter-cylinder air-fuel ratio imbalance state has occurred, when the obtained imbalance determination parameter is larger than a predetermined imbalance determination threshold; and (3) determines that an inter-cylinder air-fuel ratio imbalance state has not occurred, when the obtained imbalance determination parameter is smaller than the imbalance determination threshold.

The imbalance determination parameter may be, for example, one of "a maximum value or a mean value" of absolute values of "the above mentioned differential values d(Vabyfs)/dt or of the above mentioned differential values d(abyfs/dt)" for a predetermined period (e.g., for the unit combustion cycle period); "a maximum value or a mean value" of the absolute values of "the second order differential values $d^2(Vabyfs)/dt^2$ or of the second order differential value $d^2((abyfs)/dt^2$" for a predetermined period (e.g., for the unit combustion cycle period); a trace length and the like of "the output value Vabyfs or the detected air-fuel ratio abyfs"; and a value based on one of those values. The imbalance determination parameter is not limited to those values.

Further, the imbalance determining means is configured so as to make the "heater control means" perform a control to have an "air-fuel ratio sensor element temperature (parameter-obtaining-period-element-temperature) for a parameter-obtaining-period" be higher than an "air-fuel ratio sensor element temperature (parameter-non-obtaining-period-element-temperature) for a period (parameter-non-obtaining-period) other than the parameter-obtaining-period." The control is also referred to as a "sensor element section temperature elevating control". In other words, the parameter-non-obtaining-period-element-temperature is set at (to) a "first temperature", and the "parameter-obtaining-period-element-temperature" is set at (to) a "second temperature higher than the first temperature."

According to the above configuration, the imbalance determination parameter is obtained when the responsiveness of the air-fuel ratio sensor is good by raising (elevation of) the temperature of the air-fuel ratio sensor element (i.e., when the output value of the air-fuel ratio sensor can follow the fluctuation of the air-fuel ratio of the exhaust gas without an excessive delay). Accordingly, since the imbalance determination parameter becomes a value which can accurately represent the cylinder-by-cylinder air-fuel ratio difference, it can be determined accurately whether or not the inter-cylinder air-fuel-ratio imbalance state has been occurring.

Further, according to the above configuration, the temperature of the air-fuel ratio sensor element during the parameter non-obtaining period is controlled to the relatively low temperature (the first temperature). Accordingly, it is possible to avoid that the sensor deteriorates early (early deterioration with age) due to heat, as compared to the case in which the air-fuel ratio sensor element temperature is always maintained at the relatively high temperature (the second temperature).

It should be noted that the parameter obtaining condition may include, for example, at least one or more of following conditions.

The imbalance determination has never performed since the current start of the engine.

An intake air flow rate is within a predetermined range.

An engine rotational speed is within a predetermined range.

A cooling water temperature is equal to or higher than a cooling water temperature threshold.

A predetermined time has elapsed since a point in time at which a change amount of "a throttle valve opening or an operation amount of an accelerator pedal" per unit time becomes equal to or smaller than a predetermined value.

The parameter obtaining condition is not limited to those.

Meanwhile, when the cylinder-by-cylinder air-fuel ratio difference is very large, the air-fuel ratio of the exhaust gas fluctuates extremely greatly. Accordingly, when the cylinder-by-cylinder air-fuel ratio difference is very large, the obtained imbalance determination parameter becomes extremely large even if the responsiveness of the air-fuel ratio sensor is relatively low. It is therefore possible to clearly determine that the inter-cylinder air-fuel-ratio imbalance state has been occurring, when the imbalance determination parameter is obtained while the air-fuel ratio sensor element temperature is maintained at the relatively low temperature (the first temperature), and thus obtained imbalance determination parameter is larger than a "predetermined threshold (also referred to as a high-side threshold)."

In contrast, when the cylinder-by-cylinder air-fuel ratio difference is very small, the air-fuel ratio of the exhaust gas fluctuates extremely slightly. Accordingly, even if the imbalance determination parameter is obtained when the responsiveness of the air-fuel ratio sensor is relatively low, it is possible to clearly determine that the inter-cylinder air-fuel-ratio imbalance state has not been occurring if the obtained imbalance determination parameter is extremely small. In other words, when the imbalance determination parameter is obtained while the air-fuel ratio sensor element temperature is maintained at the relatively low temperature (the first temperature), and thus obtained imbalance determination parameter is smaller than a "predetermined threshold (also referred to as a low-side threshold) which is smaller by a predetermined value than the high-side threshold", it is possible to clearly determine that the inter-cylinder air-fuel-ratio imbalance state has not been occurring.

In view of the above, the imbalance determining means of another aspect of the present invention apparatus is configured so as to:

(4) obtain, based on the output value of the air-fuel ratio sensor, the imbalance determination parameter as a tentative parameter before having the heater control means perform the sensor element section temperature elevating control (i.e., while maintaining the air-fuel ratio sensor element temperature at the relatively low temperature) in/during the parameter obtaining period;

(5) determine that the inter-cylinder air-fuel ratio imbalance state has been occurring, when the obtained tentative parameter is larger than the predetermined high-side threshold; and (6) determine that the inter-cylinder air-fuel ratio imbalance state has not been occurring, when the obtained tentative parameter is smaller than the "low-side threshold which is smaller by the predetermined value than the high-side threshold."

In this case, it is preferable that the high-side threshold be a value which is equal to or larger than the imbalance determination threshold, and the low-side threshold be a value which is equal to or smaller than the imbalance determination threshold.

To the contrary, when the imbalance determination parameter obtained while the air-fuel ratio sensor element temperature is relatively low (while the responsiveness of the air-fuel ratio sensor is relatively low) is between the high-side threshold and the low-side threshold, it is not possible to clearly determine whether or not the inter-cylinder air-fuel-ratio imbalance state has occurred.

Accordingly, the imbalance determining means of another aspect of the present invention apparatus is configured so as to:

(7) withhold (making) the determination as to whether or not the inter-cylinder air-fuel-ratio imbalance state has occurred, when the obtained tentative parameter is between the high-side threshold and the low-side threshold;

(8) have the heater control means perform the sensor element section temperature elevating control during the parameter obtaining period, and obtain, based on the output value of the air-fuel ratio sensor, the imbalance determination parameter as a final parameter, while (in the case in which) the determination as to whether or not the inter-cylinder air-fuel-ratio imbalance state has occurred is being withheld; and (9) determine that the inter-cylinder air-fuel-ratio imbalance state has occurred when the obtained final parameter is larger than the imbalance determination threshold, and determine that the inter-cylinder air-fuel-ratio imbalance state has not occurred when the obtained final parameter is smaller than the imbalance determination threshold.

According to the above configuration, in the case in which the determination as to whether or not the inter-cylinder air-fuel-ratio imbalance state has occurred is withheld, the air-fuel ratio sensor element temperature is elevated (raised), and thus, the imbalance determination parameter (the final parameter) can be obtained while the responsiveness of the air-fuel ratio sensor is high. Accordingly, even in the case in which it is not possible to clearly determine whether or not the inter-cylinder air-fuel-ratio imbalance state has occurred using the tentative parameter, the imbalance determination can be performed accurately using the final parameter.

Further, according to the apparatus of the above aspect, it is not necessary to perform the sensor element section temperature elevating control in the case in which it is possible to clearly determine whether or not the inter-cylinder air-fuel-ratio imbalance state has occurred using the imbalance determination parameter (the tentative parameter) obtained while the responsiveness of the air-fuel ratio sensor is relatively low. Accordingly, since chances/frequency that the air-fuel ratio sensor element temperature is elevated up to the relatively high temperature for the imbalance determination decreases, it can be avoided that the deterioration of the air-fuel ratio sensor is accelerated.

It requires some time for the air-fuel ratio sensor element temperature to actually becomes higher after a start of the execution of the sensor element section temperature elevating control. Accordingly, if the imbalance determination parameter is obtained immediately after the start of the execution of the sensor element section temperature elevating control, the imbalance determination parameter may be obtained while the responsiveness of the air-fuel ratio sensor is not sufficiently high.

In view of the above, in the present invention apparatus configured so as to perform the sensor element section temperature elevating control, it is preferable that the imbalance determining means be configured so as to start to obtain the imbalance determination parameter after a predetermined delay time has elapsed since a point in time at which the sensor element section temperature elevating control was started.

According to the above configuration, the imbalance determination parameter can be obtained based on the output value of the air-fuel ratio sensor after a point in time at which the responsiveness of the air-fuel ratio sensor becomes sufficiently high owing to the elevation (high temperature) of the air-fuel ratio sensor element temperature. It is therefore possible to obtain the imbalance determining parameter which more accurately represents the cylinder-by-cylinder air-fuel ratio difference.

It is preferable that the imbalance determining means be configured so as to set the predetermined delay time in such a manner that the delay time is shorter as a temperature of the exhaust gas is higher.

It is also preferable that the imbalance determining means be configured so as to set the predetermined delay time in such a manner that the delay time is shorter as “the intake air flow rate of the engine or the load of the engine” is greater.

The air-fuel ratio sensor element temperature increases more rapidly as the temperature of the exhaust gas is higher. Accordingly, the delay time can be (set) shorter as the temperature of the exhaust gas is higher. The temperature of the exhaust gas may be obtained from an exhaust gas temperature sensor, or may be estimated based on the intake air flow rate or the load of the engine. In this case, the temperature of the exhaust gas becomes higher as the intake air flow rate or the load of the engine becomes greater. Accordingly, the delay time can be (set) shorter as the intake air flow rate or the load of the engine is greater.

As described before, it requires some time for the air-fuel ratio sensor element temperature to actually increase after the start of the execution of the sensor element section temperature elevating control. Accordingly, if the sensor element section temperature elevating control is started after the parameter obtaining condition becomes satisfied, there may be a case in which obtaining the imbalance determination parameter can not be started until the air-fuel ratio sensor element temperature becomes sufficiently high. In addition, if the parameter obtaining condition becomes unsatisfied in a period from the start of the execution of the sensor element section temperature elevating control to a point in time at which the air-fuel ratio sensor element temperature becomes sufficiently high, the sensor element section temperature elevating control is stopped. Consequently, chances/frequency to obtain the imbalance determination parameter may decrease.

On the other hand, in a case in which the engine has not been warmed up yet since the start of the engine, moisture in the exhaust gas is cooled down to form water droplets. In such a case in which it is likely that the water droplets adhere to the air-fuel ratio detecting section of the air-fuel ratio sensor (hereinafter, this is expressed as “the air-fuel ratio sensor gets wet with water”), if the temperature of the “air-fuel ratio detecting section including the sensor element section” is elevated by the sensor element section temperature elevating control, a great temperature unevenness in the air-fuel ratio detecting section occurs when the air-fuel ratio sensor actually get wet with water, and thus, the air-fuel ratio detecting section may crack/dunt (be broken). Accordingly, it is not preferable to perform the sensor element section temperature elevating control immediately after the start of the engine.

In view of the above, the imbalance determining means of another aspect of the present invention apparatus is configured so as to have the heater control means start to perform the sensor element section temperature elevating control at a point in time at which the warming-up of the engine is completed after the start of the engine, and finishes/ends the sensor element section temperature elevating control at a point in time at which obtaining the imbalance determination parameter is completed.

It is unlikely that the air-fuel ratio sensor gets wet with water after a point in time at which the warming-up of the engine is completed. Accordingly, if the sensor element section temperature elevating control is started at the point in time at which the warming-up of the engine is completed, it is unlikely that the air-fuel ratio sensor gets wet with water. In addition, according to the above configuration, changces/frequency that the air-fuel ratio sensor element temperature has become sufficiently high at the point in time at which the parameter obtaining condition becomes satisfied can be increased, changces/frequency that the imbalance determination parameter having a high accuracy is obtained can be increased.

A temperature of the solid electrolyte layer which is a part of the sensor element section of the air-fuel ratio sensor has a strong correlation with an admittance (inverse of the impedance) of the solid electrolyte layer. In general, the admittance of the solid electrolyte layer becomes higher as the temperature of the solid electrolyte layer becomes higher.

In view of the above, the heater control means is configured so as to control the amount of heat generation of the heater in such a manner that a difference between a value corresponding to the actual admittance of the solid electrolyte layer (e.g., the admittance or the impedance) and a target value is decreased, and so as to realize the sensor element section temperature elevating control by making the target value during the sensor element section temperature elevating control is being performed different from the target value during the sensor element section temperature elevating control is not being performed.

For example, the “value corresponding to the actual admittance of the solid electrolyte layer” is the actual admittance of the solid electrolyte layer, the target value during the sensor element section temperature elevating control is being performed is made higher than the target value during the sensor element section temperature elevating control is not being performed. Alternatively, the “value corresponding to the actual admittance of the solid electrolyte layer” is the actual impedance of the solid electrolyte layer, the target value during the sensor element section temperature elevating control is being performed is made lower than the target value during the sensor element section temperature elevating control is not being performed.

Meanwhile, the air-fuel ratio sensor changes with age (the passage of time) when the air-fuel ratio is used for a long time. Consequently, as shown in FIG. 23, the admittance (refer to a broken line Y2) of the air-fuel ratio sensor which has changed with the passage of time is smaller than the admittance (refer to a solid line Y1) of the air-fuel ratio sensor which has not changed with the passage of time.

Accordingly, even when the actual admittance of the solid electrolyte layer coincides with a “certain specific admittance", the air-fuel ratio sensor element temperature when the air-fuel ratio sensor has not changed with the passage of time is higher than the air-fuel ratio sensor element temperature when the air-fuel ratio sensor has changed with the passage of time. In other words, in a case in which the heater control is performed based on the admittance and the air-fuel ratio sensor has changed with the passage of time, the air-fuel ratio sensor element temperature is sufficiently high and the responsiveness of the air-fuel ratio sensor is good even when the target value (target admittance) during the sensor element section temperature elevating control is being performed is not made higher than the target value (target admittance) during the sensor element section temperature elevating control is not being performed. Similarly, in a case in which the heater control is performed based on the impedance and the air-fuel ratio sensor has changed with the passage of time, the air-fuel ratio sensor element temperature is sufficiently high and the responsiveness of the air-fuel ratio sensor is good even when the target value (target impedance) during the sensor element section temperature elevating control is being performed is not made lower than the target value (target impedance) during the sensor element section temperature elevating control is not being performed.

In view of the above, it is preferable that the imbalance determining means be configured so as to include deterioration-with-age-occurrence determining means for determining whether or not the air-fuel ratio sensor has deteriorated with age, and obtain, when it is determined that the air-fuel ratio has deteriorated with age, the imbalance determination parameter without performing the sensor element section temperature elevating control even when the sensor element section temperature elevating control should be performed.

According to the above configuration, since the air-fuel ratio sensor element temperature is not elevated more than necessary, it is possible to avoid that the deterioration of the sensor occurs early.

Another aspect of the determination apparatus according to the present invention is applied to the multi-cylinder internal combustion engine, and includes the air-fuel ratio sensor, and a plurality of the fuel injection valves (injectors), similarly to the above mentioned aspect, and further includes heater control means configured as follows.

That is, the imbalance determining means is configured so as to:

(10) control the temperature of the sensor element section to the first temperature using the heater during the parameter obtaining period in which a predetermined parameter obtaining condition is satisfied, and obtain, as a usual temperature air-fuel ratio fluctuation indicating amount, a value corresponding to an air-fuel ratio fluctuation indicating amount which becomes larger as a fluctuation of the air-fuel ratio of said exhaust gas passing/flowing through the position at which the air-fuel ratio sensor is disposed becomes larger;

(11) control the temperature of the sensor element section to a second temperature higher than the first temperature using the heater during the parameter obtaining period, and obtain, as an elevated temperature air-fuel ratio fluctuation indicating amount, a value corresponding to an air-fuel ratio fluctuation indicating amount which becomes larger as the fluctuation of the air-fuel ratio of said exhaust gas passing/flowing through the position at which the air-fuel ratio sensor is disposed becomes larger;

(12) obtain, based on the elevated temperature air-fuel ratio fluctuation indicating amount and the usual temperature air-fuel ratio fluctuation indicating amount, a value which becomes larger as a degree becomes larger of difference between the elevated temperature air-fuel ratio fluctuation indicating amount and the usual temperature air-fuel ratio fluctuation indicating amount, as an imbalance determination parameter;

(13) determine that an inter-cylinder air-fuel-ratio imbalance state has occurred when the obtained imbalance determination parameter is larger than a predetermined imbalance determination threshold, and determine that an inter-cylinder air-fuel-ratio imbalance state has not occurred when the obtained imbalance determination parameter is smaller than the predetermined imbalance determination threshold.

FIG. 11 is one of examples of a graph showing how the air-fuel ratio fluctuation indicating amount changes with respect to the air-fuel ratio sensor element temperature. In FIG. 11, a solid line L2 indicates the air-fuel ratio fluctuation indicating amount when the inter-cylinder air-fuel-ratio imbalance state has been occurring, and a broken line L1 indicates the air-fuel ratio fluctuation indicating amount when the inter-cylinder air-fuel-ratio imbalance state has not been occurring.

As understood from FIG. 11, a value DX (e.g., DX=Ztujo−Ztup) increases as the air-fuel ratio sensor element temperature increases, the value DX being a value which becomes larger as the "degree of difference between the elevated temperature air-fuel ratio fluctuation indicating amount Ztup and the usual temperature air-fuel ratio fluctuation indicating amount Ztujo" becomes larger. Further, the "value DX (=DX1) when the inter-cylinder air-fuel-ratio imbalance state has been occurring (refer to the solid line L2)" is larger than the "value DX (=DX2) when the inter-cylinder air-fuel-ratio imbalance state has not been occurring (refer to the broken line L1)". Furthermore, a difference between the value DX1 and the value DX2 becomes larger as the air-fuel ratio sensor element temperature (more accurately, a difference between the elevated temperature and the usual temperature) becomes larger.

Accordingly, as the above configuration, the imbalance determination can be performed/made accurately, by obtaining values corresponding to the air-fuel ratio fluctuation indicating amount at the first temperature and at the second temperature, obtaining an imbalance determination parameter based on a value which becomes larger as a degree of difference between the values corresponding to the air-fuel ratio fluctuation indicating amount (e.g., a difference between the values corresponding to the air-fuel ratio fluctuation indicating amount or a ratio of those values) becomes larger; and performing an imbalance determination based on the imbalance determination parameter. Further, that imbalance determination parameter is a value obtained when an effect/impact which an individual difference among the air-fuel ratio sensors has on the imbalance determination parameter is diminished, and the imbalance determination can therefore be performed accurately.

The air-fuel ratio detecting section of the air-fuel ratio sensor includes a catalytic section which has an oxygen storage function and accelerates an oxidation-reduction reaction, and the air-fuel ratio sensor is configured so as to have the exhaust gas passing through the exhaust passage reach the diffusion resistance layer through the catalytic section.

For example, when the rich-side-deviated imbalance state occurs, an average (mean) value of the air-fuel ratio of the exhaust gas changes to a certain rich air-fuel ratio. In this case, as compared to a case in which air-fuel ratios of all of the cylinders change to that certain rich air-fuel ratio, the unburned combustibles including hydrogen generate in a greater amount. Since a particle diameter of hydrogen is small, hydrogen can pass through the diffusion resistance layer of the air-fuel ratio detecting section more easily than the other unburned combustibles. As a result, the output value of the air-fuel ratio sensor shifts to a value richer than that certain rich air-fuel ratio. Consequently, the air-fuel ratio feedback control based on the output value of the air-fuel ratio sensor may not be performed properly.

In contrast, when the catalytic section is provided with the air-fuel ratio sensor, the excessive hydrogen can be oxidized at the catalytic section. Accordingly, the excessive hydrogen which is contained in the exhaust gas reaching the exhaust-gas-side electrode layer can be decreased. Consequently, the output value of the air-fuel ratio sensor comes close to a value which represents the air-fuel ratio of the exhaust gas accurately.

However, a "change of the output value of the air-fuel ratio sensor with respect to the change of the air-fuel ratio of the exhaust gas" due to the oxidation-reduction reaction and the oxygen storage function is delayed. Consequently, the responsiveness of the air-fuel ratio sensor of the air-fuel ratio sensor is lower than the responsiveness of the air-fuel ratio sensor without the catalytic section. Especially, when the exhaust gas fluctuates in such a manner that it crosses over the stoichiometric air-fuel ratio, the delay of the output value of the air-fuel ratio sensor due to the oxygen storage function becomes prominent (great).

Accordingly, in the case in which the air-fuel ratio sensor having the catalytic section is used, the imbalance determination parameter becomes much smaller when the air-fuel ratio of the exhaust gas fluctuates in the vicinity of the stoichiometric air-fuel ratio. Thus, in the case in which the imbalance determination is performed using the imbalance determination parameter obtained based on the output value of the air-fuel ratio sensor in the internal combustion engine having the air-fuel ratio sensor including the catalytic section, the present invention apparatus which obtains the imbalance determination parameter while the responsiveness of the air-fuel ratio sensor is improved by elevating the air-fuel ratio sensor element temperature can have a more beneficial effect.

The air-fuel ration sensor usually further comprises a protective cover, which accommodates the air-fuel ratio detecting section so as to cover the air-fuel ratio detecting section in its inside, and which includes an inflow hole for allowing the exhaust gas flowing through the exhaust passage to flow into the inside and an outflow hole for allowing the exhaust gas which has flowed into the inside to flow out to the exhaust passage.

In this case, it is preferable that the imbalance determining means be configured so as to obtain, as a "base indicating amount", a differential value of "the output value or the detected air-fuel ratio represented by the output value" with respect to time, and obtain the imbalance determination parameter based on the base indicating amount.

As long as the cylinder-by-cylinder air-fuel ratio difference is not equal to "0", the output value of the air-fuel ratio sensor and the detected air-fuel ratio fluctuates/varies in a cycle which is equal to the unit combustion cycle. Accordingly, the trace length of the output value Vabyfs is strongly affected by the engine rotational speed. It is therefore necessary to set the imbalance determination threshold in accordance with the engine rotational speed accurately.

In contrast, in the case in which the air-fuel ratio sensor comprises the protective cover, a flow rate of the exhaust gas in the protective cover does not change depending on the engine rotational speed, but changes depending on a flow rate of the exhaust gas flowing through the exhaust passage (accordingly, the intake air flow rate). This is because the exhaust gas is flowed into the inside of the protective cover through the intake hole of the protective cover owing to a negative pressure flowing in the vicinity of the outflow hole of the protective cover.

Accordingly, as long as the intake air flow rate is constant, "the differential value d(Vabyfs/dt) of the output value of the air-fuel ratio sensor with respect to time, or the differential value d(abyfs/dt) of the detected air-fuel ratio represented by the output value of the air-fuel ratio sensor with respect to time" accurately represents the fluctuation of the air-fuel ratio of the exhaust gas, without depending on the engine rotational speed. In view of the above, when these differential values are obtained as the basic indicating amounts, and the imbalance determination parameter is obtained based on the thus obtained differential values, the imbalance determination parameter can be obtained as a value which can accurately represent the cylinder-by-cylinder air-fuel ratio difference regardless of whether the engine rotational speed is high or not.

Alternatively, it is preferable that the imbalance determining means be configured so as to obtain, as a "base indicating amount", a second-order differential value of "the output value or the detected air-fuel ratio represented by the output value" with respect to time, and obtain the imbalance determination parameter based on the base indicating amount.

The second-order differential value of the output value of the air-fuel ratio sensor or of the detected air-fuel ratio represented by the output value of the air-fuel ratio sensor, with respect to time ($d^2(Vabyfs/dt^2)$ or $d^2(abyfs/dt^2)$) is hardly affected by a moderate/slow change of the average value of the air-fuel ratio of the exhaust gas. Accordingly, when these second-order differential values are obtained as the basic indicating amounts, and the imbalance determination parameter is obtained based on the thus obtained differential values, the imbalance determination parameter can be obtained as a "value which can accurately represent the cylinder-by-cylinder air-fuel ratio difference" even if the center of the air-fuel ratio of the exhaust gas moderately varies.

MODE FOR CARRYING OUT THE INVENTION

An inter-cylinder air-fuel ratio imbalance determination apparatus (hereinafter may be simply referred to as a "determination apparatus") for an internal combustion engine according to each of embodiments of the present invention will be described with reference to the drawings. This determination apparatus is a portion of an air-fuel ratio control apparatus for controlling the air-fuel ratio of gas mixture supplied to the internal combustion engine (the air-fuel ratio of the engine), and also serves as a portion of a fuel injection amount control apparatus for controlling the amount of fuel injection.

First Embodiment

Configuration

Figure 7:
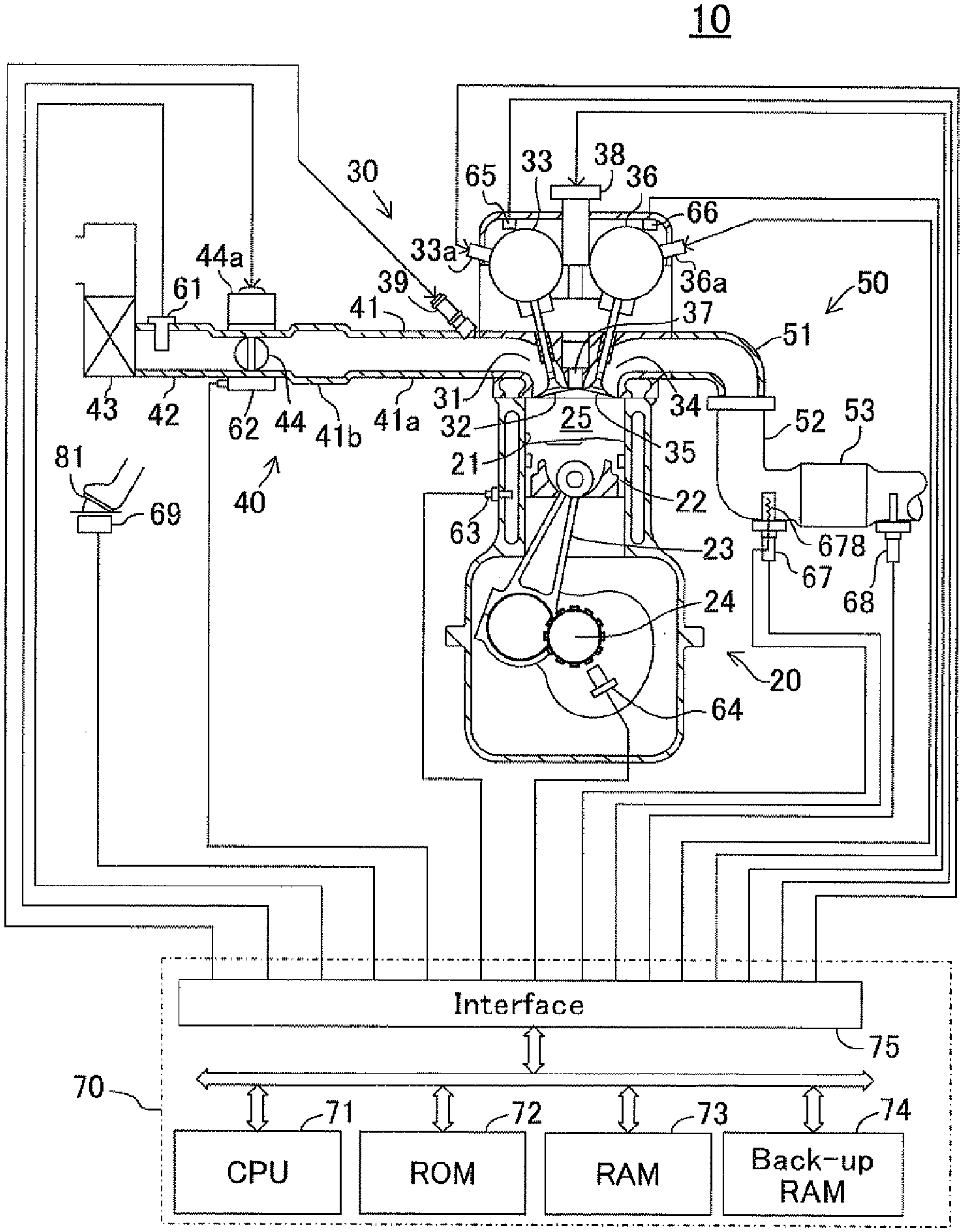
FIG. 7 is a diagram schematically showing the configuration of the internal combustion engine shown in FIG. 1.

FIG. 7 schematically shows the configuration of a system configured such that a determination apparatus according to a first embodiment (hereinafter also referred to as a "first determination apparatus") is applied to a spark-ignition multi-cylinder (straight 4-cylinder) four-cycle internal combustion engine 10. Although FIG. 7 shows the cross section of a specific cylinder only, the remaining cylinders have the same configuration.

This internal combustion engine 10 includes a cylinder block section 20 including a cylinder block, a cylinder block lower-case, an oil pan, etc.; a cylinder head section 30 fixedly provided on the cylinder block section 20; an intake system 40 for supplying gasoline gas mixture to the cylinder block section 20; and an exhaust system 50 for discharging exhaust gas from the cylinder block section 20 to the exterior of the engine.

The cylinder block section 20 includes cylinders 21, pistons 22, connecting rods 23, and a crankshaft 24. Each of the pistons 22 reciprocates within the corresponding cylinder 21. The reciprocating motion of the piston 22 is transmitted to the crankshaft 24 via the respective connecting rod 23, whereby the crankshaft 24 is rotated. The wall surface of the cylinder 21 and the top surface of the piston 22 form a combustion chamber 25 in cooperation with the lower surface of the cylinder head section 30.

The cylinder head section 30 includes an intake port 31 communicating with the combustion chamber 25; an intake valve 32 for opening and closing the intake port 31; a variable intake timing control apparatus 33 which includes an intake camshaft for driving the intake valve 32 and which continuously changes the phase angle of the intake camshaft; an actuator **33*a* of the variable intake timing control apparatus 33; an exhaust port 34 communicating with the combustion chamber 25; an exhaust valve 35 for opening and closing the exhaust port 34; a variable exhaust timing control apparatus 36 which includes an exhaust camshaft for driving the exhaust valve 35 and which continuously changes the phase angle of the exhaust camshaft; an actuator 36*a* of the variable exhaust timing control apparatus 36; a spark plug 37; an igniter 38 including an ignition coil for generating a high voltage to be applied to the spark plug 37; and a fuel injection valve (fuel injection means; fuel supply means) 39**.

The fuel injection valves (fuel injector) 39 are disposed such that a single fuel injection valve is provided for each combustion chamber 25. The fuel injection valve 39 is provided at the intake port 31. When the fuel injection valve 39 is normal, in response to an injection instruction signal, the fuel injection valve 39 injects "fuel of an amount corresponding to an instructed fuel injection amount contained in the injection instruction signal" into the corresponding intake port 31. In this way, each of a plurality of the cylinders has the fuel injection valve 39 which supplies fuel thereto independently of other cylinders.

The intake system 40 includes an intake manifold 41, an intake pipe 42, an air filter 43, and a throttle valve 44.

Figure 1:
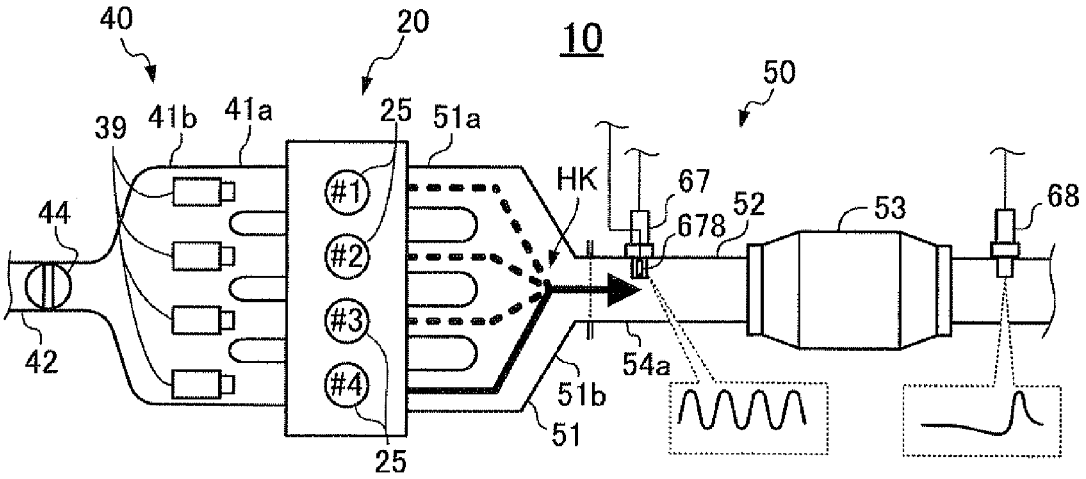
FIG. 1 is a schematic plan view of an internal combustion engine to which the inter-cylinder air-fuel ratio imbalance determination apparatus according to each of the embodiments of the present invention is applied.

As shown in FIG. 1, the intake manifold 41 is composed of a plurality of branch portions **41*a* and a surge tank 41*b*. One end of each of a plurality of the branch portions 41*a* is connected to each of a plurality of the corresponding intake ports 31, as shown in FIG. 7. The other end of each of a plurality of the branch portions 41a is connected to the surge tank 41b. One end of the intake pipe 42 is connected to the surge tank 41b. The air filter 43 is provided at the other end of the intake pipe 42. The throttle valve 44 is provided within the intake pipe 42 and adapted to change the opening cross sectional area of the intake passage. The throttle valve 44 is rotated within the intake pipe 42 by a throttle valve actuator 44**a (a portion of throttle valve drive means) including a DC motor.

The exhaust system 50 includes an exhaust manifold 51, an exhaust pipe 52, an upstream catalyst 53 disposed in the exhaust pipe 52, and an unillustrated downstream catalyst disposed in the exhaust pipe 52 at a position downstream of the upstream catalyst 53.

As shown in FIG. 1, the exhaust manifold 51 has a plurality of branch portions 51a whose one ends are connected to the exhaust ports, and a merging portion 51b where all of the branch portions 51a at their the other ends merge together. The merging portion 51b is also referred to as an exhaust merging portion HK, since exhaust gases discharged from a plurality (two or more, or four in the present example) of cylinders merge together at the merging portion 51b. The exhaust pipe 52 is connected to the merging portion 51b. As shown in FIG. 7, the exhaust ports 34, the exhaust manifold 51, and the exhaust pipe 52 constitute an exhaust passage.

Each of the upstream catalyst 53 and the downstream catalyst is a so-called three-way catalyst unit (exhaust purifying catalyst) carrying an active component formed of a noble metal such as platinum, rhodium, palladium, or the like. Each of the catalysts has a function of oxidizing unburned combustibles such as HC, CO, and $H_2$ and reducing nitrogen oxides (NOx) when the air-fuel ratio of gas flowing into each catalyst coincides with the stoichiometric air-fuel ratio. This function is also called a "catalytic function." Furthermore, each catalyst has an oxygen storage function of occluding (storing) oxygen. This oxygen storage function enables removal of the unburned combustibles and the nitrogen oxides even when the air-fuel ratio deviates from the stoichiometric air-fuel ratio. This oxygen storage function is realized by ceria ($CeO_2$) carried by the catalyst.

This system includes a hot-wire air flowmeter 61, a throttle position sensor 62, a water temperature sensor 63, a crank position sensor 64, an intake-cam position sensor 65, an exhaust-cam position sensor 66, an upstream air-fuel ratio sensor 67, a downstream air-fuel ratio sensor 68, and an accelerator opening sensor 69.

The air flowmeter 61 outputs a signal representing the mass flow rate (intake air flow rate) Ga of an intake air flowing through the intake pipe 42. That is, the intake air flow rate Ga represents the amount of air taken into the engine 10 per unit time.

The throttle position sensor 62 detects the opening of the throttle valve 44 (throttle valve opening), and outputs a signal representing the detected throttle valve opening TA.

The water temperature sensor 63 detects the temperature of cooling water of the internal combustion engine 10, and outputs a signal representing the detected cooling water temperature THW.

The crank position sensor 64 outputs a signal including a narrow pulse generated every time the crankshaft 24 rotates 10° and a wide pulse generated every time the crankshaft 24 rotates 360°. This signal is converted to an engine rotational speed NE by an electric controller 70, which will be described later.

The intake-cam position sensor 65 outputs a single pulse when the intake camshaft rotates 90 degrees from a predetermined angle, when the intake camshaft rotates 90 degrees after that, and when the intake camshaft further rotates 180 degrees after that. Based on the signals from the crank position sensor 64 and the intake-cam position sensor 65, the electric controller 70, which will be described later, obtains the absolute crank angle CA, while using, as a reference, the compression top dead center of a reference cylinder (e.g., the first cylinder). This absolute crank angle CA is set to a "0° crank angle" at the compression top dead center of the reference cylinder, increases up to a 720° crank angle in accordance with the rotational angle of the crank angle, and is again set to the "0° crank angle" at that point in time.

The exhaust-cam position sensor 66 outputs a single pulse when the exhaust camshaft rotates 90 degrees from a predetermined angle, when the exhaust camshaft rotates 90 degrees after that, and when the exhaust camshaft further rotates 180 degrees after that.

As is also shown in FIG. 1, the upstream air-fuel ratio sensor 67 (an air-fuel ratio sensor in the present invention) is disposed on/in "either one of the exhaust manifold 51 and the exhaust pipe 52 (that is, the exhaust passage)" at a position between the upstream catalyst 53 and the merging portion (exhaust merging portion HK) 51b of the exhaust manifold 51. The upstream air-fuel ratio sensor 67 is a "limiting-current-type wide range air-fuel ratio sensor including a diffusion resistance layer" disclosed in, for example, Japanese Patent Application Laid-Open (kokai) Nos. H11-72473, 2000-65782, and 2004-69547.

Figure 8:
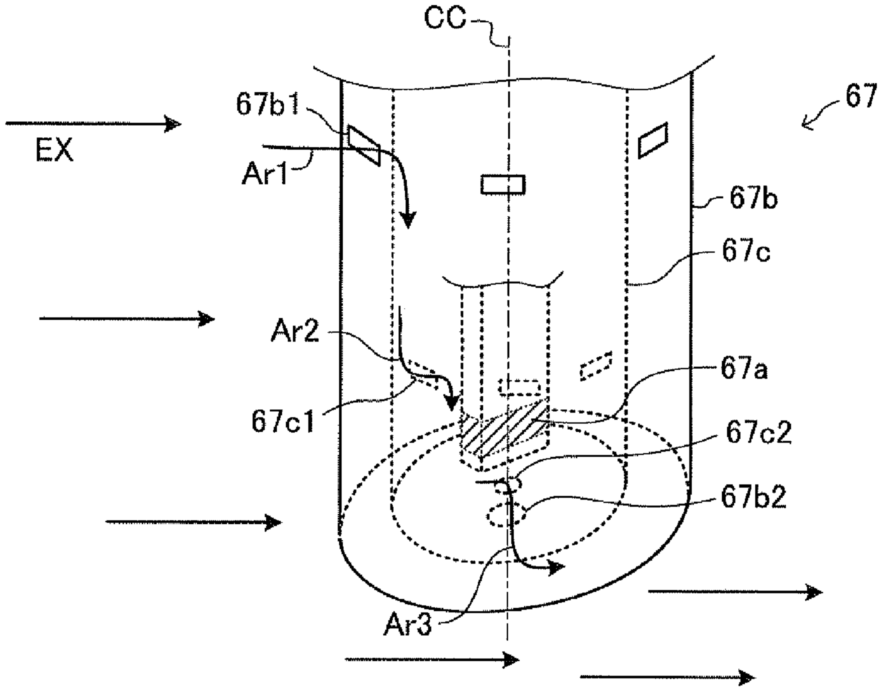
FIG. 8 is a partial schematic perspective view (through-view) of the air-fuel ratio sensor (upstream air-fuel ratio sensor) shown in FIGS. 1 and 7.
Figure 9:
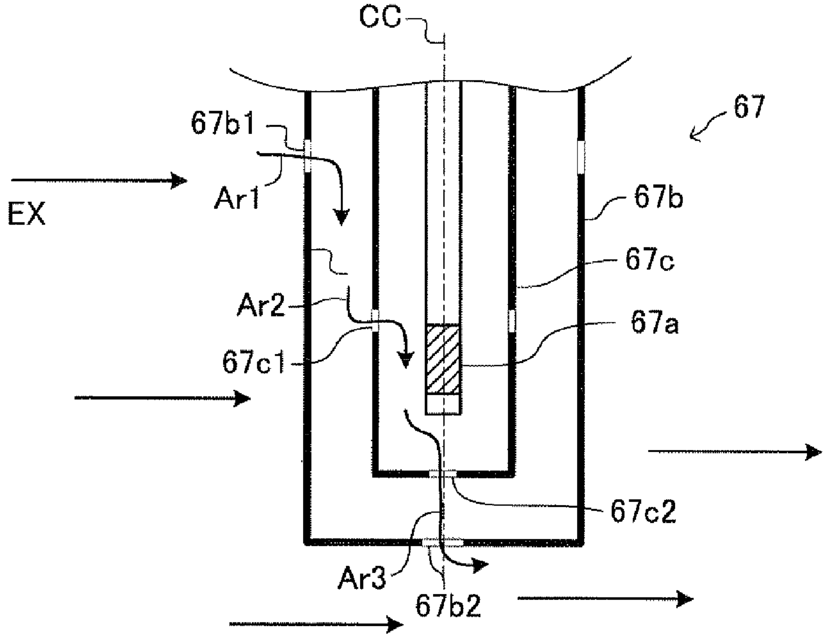
FIG. 9 is a partial sectional view of the air-fuel ratio sensor shown in FIGS. 1 and 7.

As shown in FIGS. 8 and 9, the upstream air-fuel ratio sensor 67 includes an air-fuel ratio detecting section 67a, an outer protective cover 67b, and an inner protective cover 67c.

The outer protective cover 67b is a hollow cylinder formed of metal. The outer protective cover 67b accommodates the inner protective cover 67c so as to cover it. The outer protective cover 67b has a plurality of inflow holes 67b1 formed in its peripheral wall. The inflow holes 67b1 are through holes for allowing the exhaust gas EX (the exhaust gas which is present outside the outer protective cover 67b) flowing through the exhaust passage to flow into the space inside the outer protective cover 67b. Further, the outer protective cover 67b has an outflow hole 67b2 formed in its bottom wall so as to allow the exhaust gas to flow from the space inside the outer protective cover 67b to the outside (exhaust passage).

The inner protective cover 67c formed of metal is a hollow cylinder whose diameter is smaller than that of the outer protective cover 67b. The inner protective cover 67c accommodates an air-fuel ratio detecting section 67a so as to cover it. The inner protective cover 67c has a plurality of inflow holes 67c1 in its peripheral wall. The inflow holes 67c1 are through holes for allowing the exhaust gas, which has flowed into the "space between the outer protective cover 67b and the inner protective cover 67c" through the inflow holes 67b1 of the outer protective cover 67b, to flow into the space inside the inner protective cover 67c. In addition, the inner protective cover 67c has an outflow hole 67c2 formed in its bottom wall so as to allow the exhaust gas to flow from the space inside the inner protective cover 67c to the outside.

Figure 2:
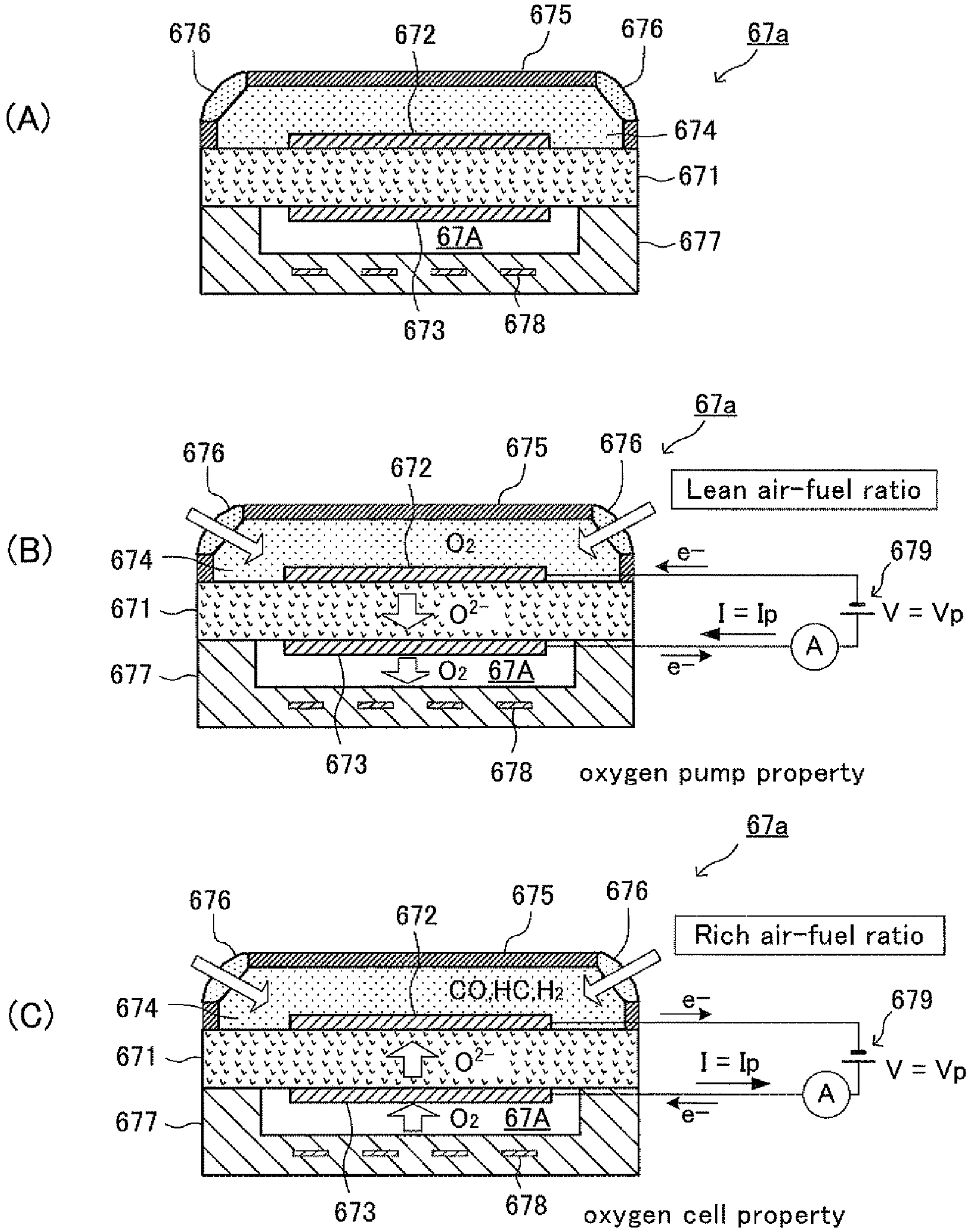
FIG. 2 (A) to (C) of FIG. 2 are schematic sectional views of an air-fuel ratio detecting section provided in an air-fuel ratio sensor (upstream air-fuel ratio sensor) shown in FIG. 1.

As shown in (A) to (C) of FIG. 2, the air-fuel ratio detecting section 67a includes a solid electrolyte layer 671, an exhaust-gas-side electrode layer 672, an atmosphere-side electrode layer 673, a diffusion resistance layer 674, a first partition section 675, a catalytic section 676, a second partition section 677, and a heater 678.

The solid electrolyte layer 671 is formed of an oxygen-ion-conductive sintered oxide. In this embodiment, the solid electrolyte layer 671 is a "stabilized zirconia element" which is a solid solution of $ZrO_2$ (zirconia) and CaO (stabilizer). The solid electrolyte layer 671 exhibits an "oxygen cell property"

and an "oxygen pump property," which are well known, when its temperature is equal to or higher than an activation temperature thereof.

The exhaust-gas-side electrode layer 672 is formed of a noble metal having a high catalytic activity, such as platinum (Pt). The exhaust-gas-side electrode layer 672 is formed on one of surfaces of the solid electrolyte layer 671. The exhaust-gas-side electrode layer 672 is formed through chemical plating, etc. so as to exhibit adequate degree of permeability (that is, it is formed into a porous layer).

The atmosphere-side electrode layer 673 is formed of a noble metal having a high catalytic activity, such as platinum (Pt). The atmosphere-side electrode layer 673 is formed on the other one of surfaces of the solid electrolyte layer 671 in such a manner it faces the exhaust-gas-side electrode layer 672 across the solid electrolyte layer 671. The atmosphere-side electrode layer 673 is formed through chemical plating, etc. so as to exhibit adequate permeability (that is, it is formed into a porous layer).

The diffusion resistance layer (diffusion-controlling layer) 674 is formed of a porous ceramic material (heat-resistant inorganic material). The diffusion resistance layer 674 is formed through, for example, plasma spraying in such a manner that it covers the outer surface of the exhaust-gas-side electrode layer 672.

The first partition section 675 is formed of dense and gas-nonpermeable alumina ceramic. The first partition section 675 is formed so as to cover the diffusion resistance layer 674 except a corner (a part) of the diffusion resistance layer 674. That is, the first partition section 675 has pass-through portions to expose parts of the diffusion resistance layer 674 to the outside.

The catalytic section 676 is formed in the pass-through portions to close the through hole. Similarly to the upstream catalyst 53, the catalytic section 676 includes the catalytic substance which facilitates/accelerates the oxidation-reduction reaction and a substance for storing oxygen which exerts the oxygen storage function. The catalytic section 676 is porous. Accordingly, as shown by a white painted arrow in (B) and (C) of FIG. 2, the exhaust gas (the above described exhaust gas which has flowed into the inside of the inner protective cover 67*c*) reaches the diffusion resistance layer 674 through the catalytic section 676, and then further reaches the exhaust-gas-side electrode layer 672 through the diffusion resistance layer 674.

The second partition section 677 is formed of dense and gas-nonpermeable alumina ceramic. The second partition section 677 is configured so as to form an "atmosphere chamber 67A" which is a space that accommodates the atmosphere-side electrode layer 673. Air is introduced into the atmosphere chamber 67A.

A power supply 679 is connected to the upstream air-fuel ratio sensor 67. The power supply 679 applies a voltage V (=Vp) in such a manner that the atmosphere-side electrode layer 673 is held at a high potential and the exhaust-gas-side electrode layer 672 is held at a low potential.

The heater 678 is buried in the second partition section 677. The heater 678 produces heat when energized by the electric controller 70 so as to heat up the solid electrolyte layer 671, the exhaust-gas-side electrode layer 672, and the atmosphere-side electrode layer 673 to adjust temperatures of those. Hereinafter, "the solid electrolyte layer 671, the exhaust-gas-side electrode layer 672, and the atmosphere-side electrode layer 673" that are heated up by the heater 678 may be referred to as "a sensor element section, or an air-fuel ratio sensor element." Accordingly, the heater 678 is configured so as to control the "air-fuel ratio sensor element temperature" which is the temperature of the sensor element section. An amount of energy supplied to the heater (and thus, the amount of heat generation) is adjusted to become greater as a duty signal (hereinafter, also referred to as a "heater duty Duty") generated by the electric controller 70 becomes greater. When the heater duty Duty is 100%, the amount of heat generation of the heater 678 becomes maximum. When the heater duty Duty is 0%, energizing the heater is stopped, and accordingly, the heater does not produce any heat.

The admittance Y of the solid electrolyte layer 671 varies depending on the air-fuel ratio sensor element temperature. In other words, the air-fuel ratio sensor element temperature can be estimated based on the admittance Y. Generally, the admittance Y becomes larger as the air-fuel ratio sensor element temperature becomes higher. The electric controller 70 applies the "applied voltage generated by an electric power supply 679" superimposed periodically with a "voltage having a rectangular waveform, a sine waveform, or the like" between the exhaust-gas-side electrode layer 672 and the atmosphere-side electrode layer 673, and obtains the actual admittance Yact of the air-fuel ratio sensor 67 based on the current flowing through the solid electrolyte layer 671.

Figure 3:
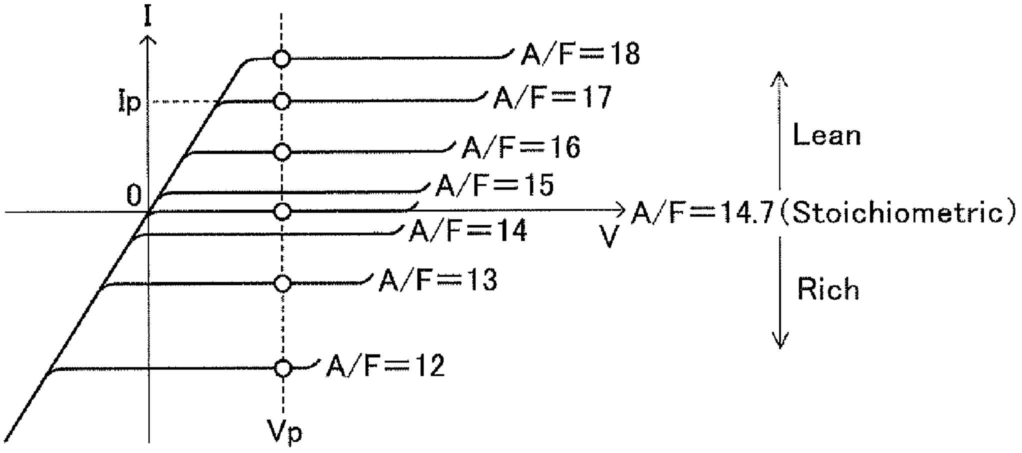
FIG. 3 is a graph showing the relation between the air-fuel ratio of exhaust gas and the limiting current of the air-fuel ratio sensor.

As shown in (B) of FIG. 2, when the air-fuel ratio of the exhaust gas is leaner than the stoichiometric air-fuel ratio, the thus configured upstream air-fuel ratio sensor 67 ionizes oxygen which has reached the exhaust-gas-side electrode layer 672 through the diffusion resistance layer 674, and makes the ionized oxygen reach the atmosphere-side electrode layer 673. As a result, an electrical current I flows from a positive electrode of the electric power supply 679 to a negative electrode of the electric power supply 679. As shown in FIG. 3, the magnitude of the electrical current I becomes a constant value which is proportional to a concentration of oxygen arriving at the exhaust-gas-side electrode layer 672 (or a partial pressure, the air-fuel ratio of the exhaust gas), when the electric voltage V is set at a predetermined value Vp or higher. The upstream air-fuel ratio sensor 67 outputs a value into which this electrical current (i.e., the limiting current Ip) is converted, as its output value Vabyfs.

To the contrary, as shown in (C) of FIG. 2, when the air-fuel ratio of the exhaust gas is richer than the stoichiometric air-fuel ratio, the upstream air-fuel ratio sensor 67 ionizes oxygen which is present in the atmosphere chamber 67A and makes the ionized oxygen reach the exhaust-gas-side electrode layer 672 so as to oxide the unburned combustibles (HC, CO, and $H_2$, etc.) reaching the exhaust-gas-side electrode layer 672 through the diffusion resistance layer 674. As a result, an electrical current I flows from the negative electrode of the electric power supply 679 to the positive electrode of the electric power supply 679. As shown in FIG. 3, the magnitude of the electrical current I also becomes a constant value which is proportional to a concentration of the unburned combustibles arriving at the exhaust-gas-side electrode layer 672 (i.e., the air-fuel ratio of the exhaust gas), when the electric voltage V is set at the predetermined value Vp or higher. The upstream air-fuel ratio sensor 67 outputs a value into which the electrical current (i.e., the limiting current Ip) is converted, as its output value Vabyfs.

Figure 4:
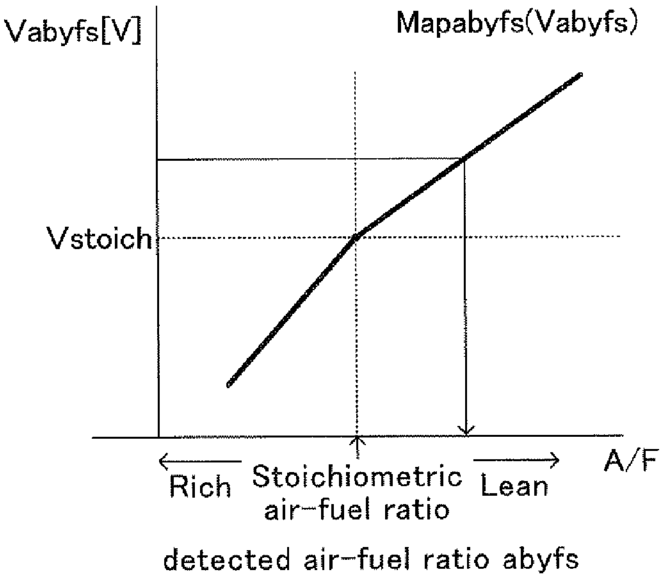
FIG. 4 is a graph showing the relation between the air-fuel ratio of exhaust gas and the output value of the air-fuel ratio sensor.

That is, the air-fuel detecting section 67*a*, as shown in FIG. 4, outputs, as the "air-fuel ratio sensor output", the output value Vabyfs being in accordance with the air-fuel ratio (an upstream air-fuel ratio abyfs, a detected air-fuel ratio abyfs) of the gas, which flows at the position at which the upstream air-fuel ratio sensor 67 is disposed and reaches the air-fuel detecting section 67*a* through the inflow holes 67*b*1 of the outer protective cover 67*b* and the inflow holes 67*c*1 of the inner protective cover 67*c*. The output value Vabyfs becomes larger as the air-fuel ratio of the gas reaching the air-fuel ratio detecting section 67*a* becomes larger (leaner). That is, the output value Vabyfs is substantially proportional to the air-fuel ratio of the exhaust gas reaching the air-fuel ratio detecting section 67*a*. It should be noted that the output value Vabyfs becomes equal to a stoichiometric air-fuel ratio corresponding value Vstoich, when the detected air-fuel ratio abyfs is equal to the stoichiometric air-fuel ratio.

The electric controller 70 stores an air-fuel ratio conversion table (map) Mapabyfs shown in FIG. 4, and detects an actual upstream air-fuel ratio abyfs (that is, obtains the detected air-fuel ratio abyfs) by applying the output value Vabyfs of the air-fuel ratio sensor 67 to the air-fuel ratio conversion table Mapabyfs.

Meanwhile, the upstream air-fuel ratio sensor 67 is disposed, in either the exhaust manifold 51 or the exhaust pipe 52, at the position between the exhaust merging portion HK of the exhaust manifold 51 and the upstream catalyst 53 in such a manner that the outer protective cover 67*b* is exposed.

More specifically, as shown in FIGS. 8 and 9, the air-fuel ratio sensor 67 is disposed in such a manner that the bottom walls of the protective covers (67*b* and 67*c*) are parallel to the flow of the exhaust gas EX and the central axis CC of the protective covers (67*b* and 67*c*) is perpendicular to the flow of the exhaust gas EX. This allows the exhaust gas EX, which has reached the inflow holes 67*b*1 of the outer protective cover 67*b*, to be sucked into the space inside the outer protective cover 67*b* and into the space inside the inner protective cover 67*c*, owing to the flow of the exhaust gas EX in the exhaust passage, which flows in the vicinity of the outflow hole 67*b*2 of the outer protective cover 67*b*.

Thus, as indicated by the arrow Ar1 shown in FIGS. 8 and 9, the exhaust gas EX flowing through the exhaust passage flows into the space between the outer protective cover 67*b* and the inner protective cover 67*c* through the inflow holes 67*b*1 of the outer protective cover 67*b*. Subsequently, as indicated by the arrow Ar2, the exhaust gas flows into the "the space inside the inner protective cover 67*c*" through the "inflow holes 67*c*1 of the inner protective cover 67*c*," and then reaches the air-fuel ratio detection element 67*a*. Thereafter, as indicated by the arrow Ar3, the exhaust gas flows out to the exhaust passage through the "outflow hole 67*c*2 of the inner protective cover 67*c* and the outflow hole 67*b*2 of the outer protective cover 67*b*."

Accordingly, the flow rate of the exhaust gas within "the outer protective cover 67*b* and the inner protective cover 67*c*" changes in accordance with the flow rate of the exhaust gas EX flowing near the outflow hole 67*b*2 of the outer protective cover 67*b* (i.e., the intake air flow rate Ga representing the intake air amount per unit time). In other words, a time duration from a "point in time at which an exhaust gas having a specific air-fuel ratio (first exhaust gas) reaches the inflow holes 67*b*1" to a "point in time at which the first exhaust gas reaches the air-fuel ratio detecting section 67*a*" depends on the intake air-flow rate Ga, but does not depend on the engine rotational speed NE. Accordingly, the output responsiveness (responsiveness) of the air-fuel ratio sensor 67 for (with respect to) the "air-fuel ratio of the exhaust gas flowing through the exhaust passage" becomes better as the flow rate (speed of flow) of the exhaust gas flowing in the vicinity of the outer protective cover 67*b* is higher. This can be true even in a case in which the upstream air-fuel ratio sensor 67 has the inner protective cover 67*c* only.

Referring back to FIG. 7 again, the downstream air-fuel ratio sensor 68 is disposed in the exhaust pipe 52, and at a position downstream of an upstream catalyst 53 and upstream of the downstream catalyst (i.e., in the exhaust passage between the upstream catalyst 53 and the downstream catalyst). The downstream air-fuel ratio sensor 68 is a well-known electro-motive-force-type oxygen concentration sensor (well-known concentration-cell-type oxygen concentration sensor using stabilized zirconia). The downstream air-fuel ratio sensor 68 is designed to generate an output value Voxs corresponding to the air-fuel ratio of a gas to be detected, the gas flowing through a portion of the exhaust passage at which the downstream air-fuel ratio sensor 68 is disposed (that is, the air-fuel ratio of the gas which flows out from the upstream catalyst 53 and flows into the downstream catalyst; namely, the time average (temporal mean value) of the air-fuel ratio of the mixture supplied to the engine).

Figure 10:
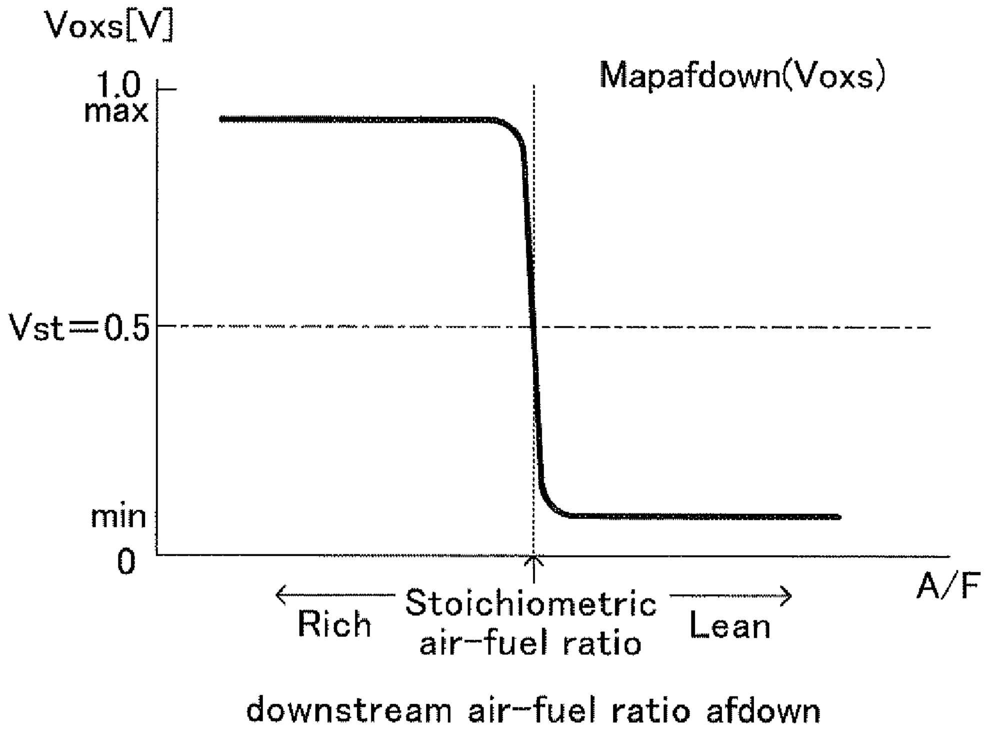
FIG. 10 is a graph showing the relation between the air-fuel ratio of exhaust gas and the output value of the downstream air-fuel ratio sensor shown in FIGS. 1 and 7.

As shown in FIG. 10, this output value Voxs becomes a "maximum output value max (e.g., about 0.9 V)" when the air-fuel ratio of the exhaust gas to be detected is richer than the stoichiometric air-fuel ratio, becomes a "minimum output value min (e.g., about 0.1 V) when the air-fuel ratio of the exhaust gas to be detected is leaner than the stoichiometric air-fuel ratio, and becomes a voltage Vst (midpoint voltage Vst, e.g., about 0.5 V) which is approximately the midpoint value between the maximum output value max and the minimum output value min when the air-fuel ratio of the exhaust gas to be detected is the stoichiometric air-fuel ratio. Further, this voltage Vox changes suddenly from the maximum output value max to the minimum output value min when the air-fuel ratio of the exhaust gas to be detected changes from the air-fuel ratio richer than the stoichiometric air-fuel ratio to the air-fuel ratio leaner than the stoichiometric air-fuel ratio, and changes suddenly from the minimum output value min to the maximum output value max when the air-fuel ratio of the exhaust gas to be detected changes from the air-fuel ratio leaner than the stoichiometric air-fuel ratio to the air-fuel ratio richer than the stoichiometric air-fuel ratio.

The accelerator opening sensor 69 shown in FIG. 7 is designed to output a signal which indicates the operation amount Accp of the accelerator pedal 81 operated by the driver (accelerator pedal operation amount Accp). The accelerator pedal operation amount Accp increases as the opening of the accelerator pedal 81 (accelerator pedal operation amount) increases.

The electric controller 70 is a well-known microcomputer which includes a CPU 71; a ROM 72 in which programs executed by the CPU 71, tables (maps and/or functions), constants, etc. are stored in advance; a RAM 73 in which the CPU 71 temporarily stores data as needed; a backup RAM 74; and an interface 75 which includes an AD converter, etc. These components are mutually connected via a bus.

The backup RAM 74 is supplied with an electric power from a battery mounted on a vehicle on which the engine 10 is mounted, regardless of a position (off-position, start position, on-position, and so on) of an unillustrated ignition key switch of the vehicle. While the electric power is supplied to the backup RAM 74, data is stored in (written into) the backup RAM 74 according to an instruction of the CPU 71, and the backup RAM 74 holds (retains, stores) the data in such a manner that the data can be read out. When the battery is taken out from the vehicle, and thus, when the backup RAM 74 is not supplied with the electric power, the backup RAM 74 can not hold the data. Accordingly, the CPU 71 initializes the data (sets the data to default values) to be stored in the backup RAM 74 when the electric power starts to be supplied to the backup RAM 74 again.

The interface 75 is connected to sensors 61 to 69 so as to send signals from these sensors to the CPU 71. In addition, the interface 75 is designed to send drive signals (instruction signals) to the actuator 33*a* of the variable intake timing control apparatus 33, the actuator 36*a* of a variable exhaust timing control apparatus 36, each of the igniters 38 of the cylinders, the fuel injection valves 39 each of which is provided for each of the cylinders, the throttle valve actuator 44*a*, the heater 678 of the air-fuel ratio sensor 67, etc., in response to instructions from the CPU 71.

The electric controller 70 is designed to send an instruction signal to the throttle valve actuator 44*a* so that the throttle valve opening TA increases as the obtained accelerator pedal operation amount Accp increases. That is, the electric controller 70 has throttle valve drive means for changing the opening of the "throttle valve 44 disposed in the intake passage of the engine 10" in accordance with the acceleration operation amount (accelerator pedal operation amount Accp) of the engine 10 which is changed by the driver.

(Outline of the Inter-Cylinder Air-Fuel Ratio Imbalance Determination)

Next, there will be described the outline of method for the "inter-cylinder air-fuel ratio imbalance determination" which is adopted/used by the first determination apparatus. The inter-cylinder air-fuel ratio imbalance determination is to determine whether or not non-uniformity of the air-fuel ratio among the cylinders exceeds a value requiring some warning due to the change of the property/characteristic of the fuel injection valve 39, etc. In other words, the first determination apparatus determines that the inter-cylinder air-fuel ratio imbalance state has occurred when the magnitude of the difference in air-fuel ratio (cylinder-by-cylinder air-fuel ratio difference) between the imbalanced cylinder and the balanced cylinder is equal to or larger than a "degree which is not permissible in terms of the emission".

The first determination apparatus obtains, in order to perform the inter-cylinder air-fuel ratio imbalance determination, the change amount per unit time (constant sampling time ts) of the air-fuel ratio represented by the output value Vabyfs of the air-fuel ratio sensor 67 (i.e., the detected air-fuel ratio abyfs obtained by applying the output value Vabyfs to the air-fuel ratio conversion table Mapabyfs shown in FIG. 4). The "change amount of the detected air-fuel ratio abyfs per unit time" can be said as (to be) a temporal (or time) differential value d(abyfs)/dt of the detected air-fuel ratio abyfs, if the unit time is very short, e.g., about 4 ms. Accordingly, the "change amount of the detected air-fuel ratio abyfs per unit time" will also simply be referred to as a "detected air-fuel ratio change rate ΔAF."

Exhaust gases from the cylinders reach the air-fuel ratio sensor 67 in the order of ignition (namely, in the order of exhaust). If the inter-cylinder air-fuel ratio imbalance state has not being occurring, the air-fuel ratios of the exhaust gases which are discharged from the cylinders and reach the air-fuel ratio sensor 67 are almost the same to each other. Accordingly, when the inter-cylinder air-fuel ratio imbalance state has not being occurring, the detected air-fuel ratio abyfs changes, for example, as indicated by a broken line C1 in (B) of FIG. 5. That is, when the inter-cylinder air-fuel ratio imbalance state has not being occurring, the waveforms of the output value Vabyfs of the air-fuel ratio sensor 67 are nearly flat. Thus, as shown by a broken line C3 in (C) of FIG. 5, when the inter-cylinder air-fuel ratio imbalance state has not being occurring, an absolute value of the detected air-fuel ratio change rate ΔAF is small.

Meanwhile, when the property of the "injection valve 39 injecting fuel to a specific cylinder (e.g., the first cylinder)" becomes a property that it injects fuel in an "amount greater than the instructed fuel injection amount", and thus, the inter-cylinder air-fuel ratio imbalance state has occurred, an air-fuel ratio of an exhaust gas of the specific cylinder (air-fuel ratio of the imbalanced cylinder) is greatly different from air-fuel ratios of exhaust gases of cylinders other than the specific cylinder (air-fuel ratio of the balanced cylinder).

Figure 12:
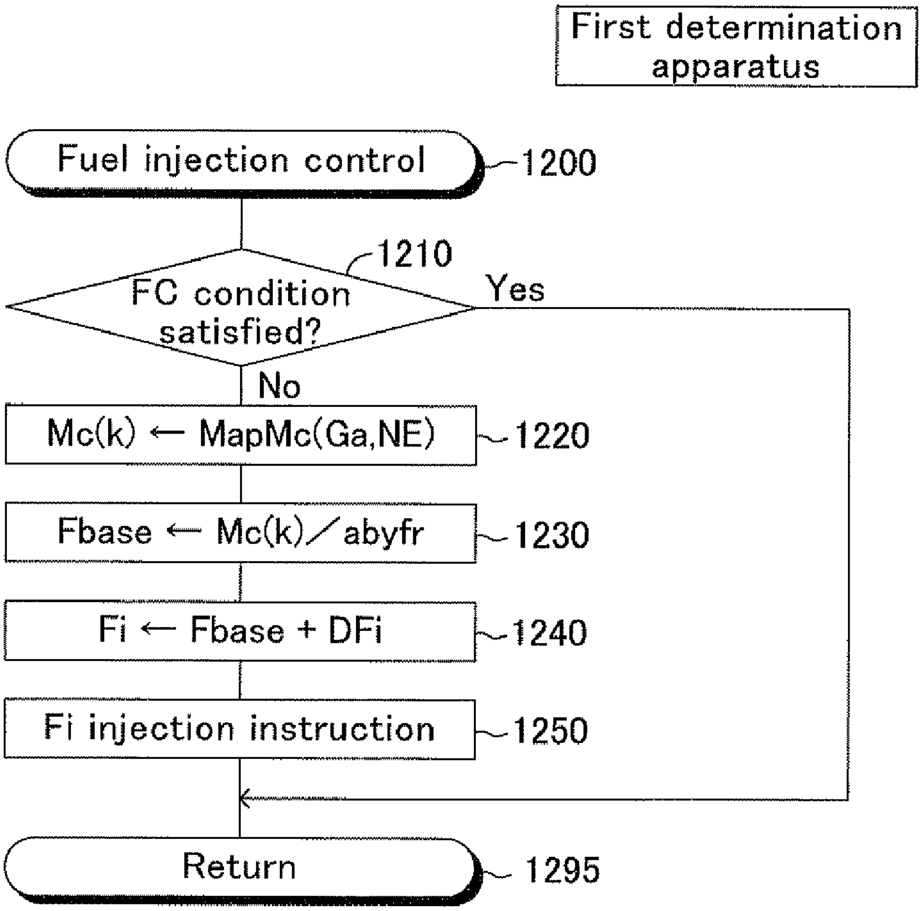
FIG. 12 is a flowchart showing a routine executed by a CPU of an inter-cylinder air-fuel ratio imbalance determination apparatus (first determination apparatus) according to a first embodiment of the present invention.

Accordingly, the detected air-fuel ratio abyfs when the inter-cylinder air-fuel ratio imbalance state is occurring changes/fluctuates greatly at an interval of the unit combustion cycle, as indicated by a solid line C2 in (B) of FIG. 12. Therefore, as shown by a solid line C4 in (C) of FIG. 5, when the inter-cylinder air-fuel ratio imbalance state is occurring, the absolute value of the detected air-fuel ratio change rate ΔAF becomes large. It should be noted that, in a case where the engine is an in-line four-cylinder four-cycle type, the unit combustion cycle period is a period for which a crank angle of 720° passes/elapses, that is, a period for which a crank angle passes, the crank angle being required for the engine to complete one combustion stroke in every and all of the cylinders that are the first to fourth cylinders, which discharge exhaust gases reaching the single air-fuel ratio sensor 67.

Furthermore, the absolute value |ΔAF| of the detected air-fuel ratio change rate ΔAF fluctuates more greatly as the air-fuel ratio of the imbalanced cylinder deviates more greatly from the air-fuel ratio of the balanced cylinder. For example, if the detected air-fuel ratio abyfs changes as indicated by the solid line C2 in (B) of FIG. 5 when a magnitude of a difference between the air-fuel ratio of the imbalanced cylinder and the air-fuel ratio of the balanced cylinder is equal to a first value, the detected air-fuel ratio abyfs changes as indicated by an alternate long and short dash line C2*a* in (B) of FIG. 5 when the magnitude of the difference between the air-fuel ratio of the imbalanced cylinder and the air-fuel ratio of the balanced cylinder is equal to a "second value larger than the first value." Accordingly, the absolute value of the detected air-fuel ratio change rate ΔAF becomes larger as the air-fuel ratio of the imbalanced cylinder deviates more greatly from the air-fuel ratio of the balanced cylinder.

In view of the above, the first determination apparatus obtains, as a base indicating amount, the detected air-fuel ratio change rate ΔAF every time the sampling time is elapses in a single unit combustion cycle period during/over a period (parameter obtaining period) in which a predetermined parameter obtaining condition is satisfied. The first determination apparatus obtains a mean value (an average value) of the absolute values |ΔAF| of a plurality of the detected air-fuel ratio change rates ΔAF obtained in the single unit combustion cycle period. Further, the first determination apparatus obtains a mean (average) value of the "mean values (average values) of the absolute values |ΔAF|", each has been obtained for each of a plurality of the combustion cycle periods, and adopts the obtained value as the air-fuel ratio fluctuation indicating amount AFD and as the imbalance determination parameter X. It should be noted that the imbalance determination parameter X is not limited to the above-described value, but may be obtained according to various methods described later.

Meanwhile, the first determination apparatus controls the air-fuel ratio sensor element temperature using the amount of heat generation by the heater 678. The first determination apparatus controls the air-fuel ratio sensor element temperature to be a first temperature (usual temperature) t1 in a period other than the parameter obtaining period (i.e., a period in which the detected air-fuel ratio change rate ΔAF serving as a base for the imbalance determination parameter is not being obtained). When the air-fuel ratio sensor element temperature is the first temperature, the air-fuel ratio sensor 67 is active, and the output value Vabyfs of the air-fuel ratio sensor 67 represents/indicates the air-fuel ratio of the exhaust gas. However, the responsiveness of the air-fuel ratio sensor 67 is relatively low, and therefore, the output value can not follow the quick change of the air-fuel ratio of the exhaust gas sufficiently.

In view of the above, the first determination apparatus controls the air-fuel ratio sensor element temperature to be a "second temperature (elevated temperature) t2 higher than the first temperature" in the parameter obtaining period (i.e., a period in which the detected air-fuel ratio change rate ΔAF is being obtained). Consequently, the responsiveness of the air-fuel ratio sensor 67 when the detected air-fuel ratio change rate ΔAF is obtained is (made) higher than the responsiveness of the air-fuel ratio sensor 67 when the detected air-fuel ratio change rate ΔAF is not obtained.

As a result, the first determination apparatus can obtain the imbalance determination parameter X while the responsiveness of the air-fuel ratio sensor 67 is made higher. The imbalance determination parameter X obtained by the first determination apparatus therefore accurately represents the "degree of the inter-cylinder air-fuel ratio imbalance state (the cylinder-by-cylinder air-fuel ratio difference)."

After the first determination apparatus obtains the imbalance determination parameter X, it compares the imbalance determination parameter X with an imbalance determination threshold Xth. The first determination apparatus determines that the inter-cylinder air-fuel-ratio imbalance state has occurred when the imbalance determination parameter X is larger than the imbalance determination threshold Xth. In contrast, the first determination apparatus determines that the inter-cylinder air-fuel-ratio imbalance state has not occurred when the imbalance determination parameter X is smaller than the imbalance determination threshold Xth. This is the outline of the method of inter-cylinder air-fuel-ratio imbalance determination employed by the first determination apparatus.

(Actual Operation)

<Fuel Injection Amount Control>

The CPU 71 of the first determination apparatus is designed to repeatedly execute a "routine for calculating the instructed fuel injection amount Fi and for instructing a fuel injection" shown in FIG. 12 for an arbitrary cylinder (hereinafter also referred to as a "fuel injection cylinder") each time the crank angle of that cylinder reaches a predetermined crank angle before its intake top dead center (e.g., BTDC 90° CA). Accordingly, when the predetermined timing comes, the CPU 71 starts processing from step 1200, and determines whether or not a fuel cut condition (hereinafter, expresses as "FC condition") is satisfied at step 1210.

It is assumed here that the FC condition is not satisfied. In this case, the CPU 71 makes a "No" determination at step 1210 to executes processes from step 1220 to step 1250. Thereafter, the CPU 71 proceeds to step 1295 to end the present routine tentatively.

Step 1210: The CPU 71 obtains an "in-cylinder intake air amount Mc(k)", namely, the "amount of air taken into the fuel injection cylinder", based on the "intake air flow rate Ga measured using the air flow meter 61, the engine rotational speed NE obtained based on the signal from the crank position sensor 64, and a lookup table MapMc." The in-cylinder intake air amount Mc(k) is stored with information specifying the intake stroke in the RAM. The in-cylinder intake air amount Mc(k) may be computed from a well-known air model (a model established in conformity with a physical law simulating the behavior of air in the intake passage).

Step 1230: The CPU 71 obtains a basic fuel injection amount Fbase through dividing the in-cylinder intake air amount Mc(k) by a target air-fuel ratio abyfr. The target air-fuel ratio abyfr (upstream-side target air-fuel ratio abyfr) is set to (at) the stoichiometric air-fuel ratio (e.g., 14.6) except for specific cases, such as a case after the start or a case in which the load is high. Accordingly, the basic fuel injection amount Fbase is a feedforward amount of the fuel injection amount which is required for realizing/achieving the target air-fuel ratio abyfr which is equal to the stoichiometric air-fuel ratio. The step 1230 constitutes feedforward control means (air-fuel ratio control means) for having the air-fuel ratio of the mixture supplied to the engine coincide with the target air-fuel ratio abyfr.

Step 1240: The CPU 71 corrects the basic fuel injection amount Fbase based on a main feedback amount DFi. More specifically, the CPU 71 computes the instructed fuel injection amount (final fuel injection amount) Fi by adding the main feedback amount DFi to the basic fuel injection amount Fbase. The main feedback amount DFi is an air-fuel ratio feedback amount to have the air-fuel ratio of the engine coincide with the target air-fuel ratio abyfr. A way of calculating of the main feedback amount DFi will be described later.

Step 1250: The CPU 71 sends the injection instruction signal to the fuel injection valve 39 provided for the fuel injection cylinder, so that fuel of the instructed injection amount Fi is injected from that fuel injection valve 39.

Consequently, the fuel of an amount required to have the air-fuel ratio of the engine coincide with the target air-fuel ratio abyfr (in most cases, the stoichiometric air-fuel ratio) is injected from the fuel injection valve 39 of the fuel injection cylinder. That is, steps from 1220 to 1250 constitute instructed fuel injection amount control means for controlling the instructed fuel injection amount Fi in such a manner that an "air-fuel ratio of the mixture supplied to the combustion chambers 25 of two or more of the cylinders (in the present example, all of the cylinder) which discharge the exhaust gases reaching the air-fuel ratio sensor 67."

Meanwhile, if the FC condition is satisfied when the CPU 71 executes the process of step 1210, the CPU 71 makes a "Yes" determination at step 1210 to directly proceed to step 1295 so as to end the present routine tentatively. In this case, fuel injection is not carried out by the process of step 1250, and the fuel cut control (fuel supply stop control) is therefore performed.

<Computation of the Main Feedback Amount>

Figure 13:
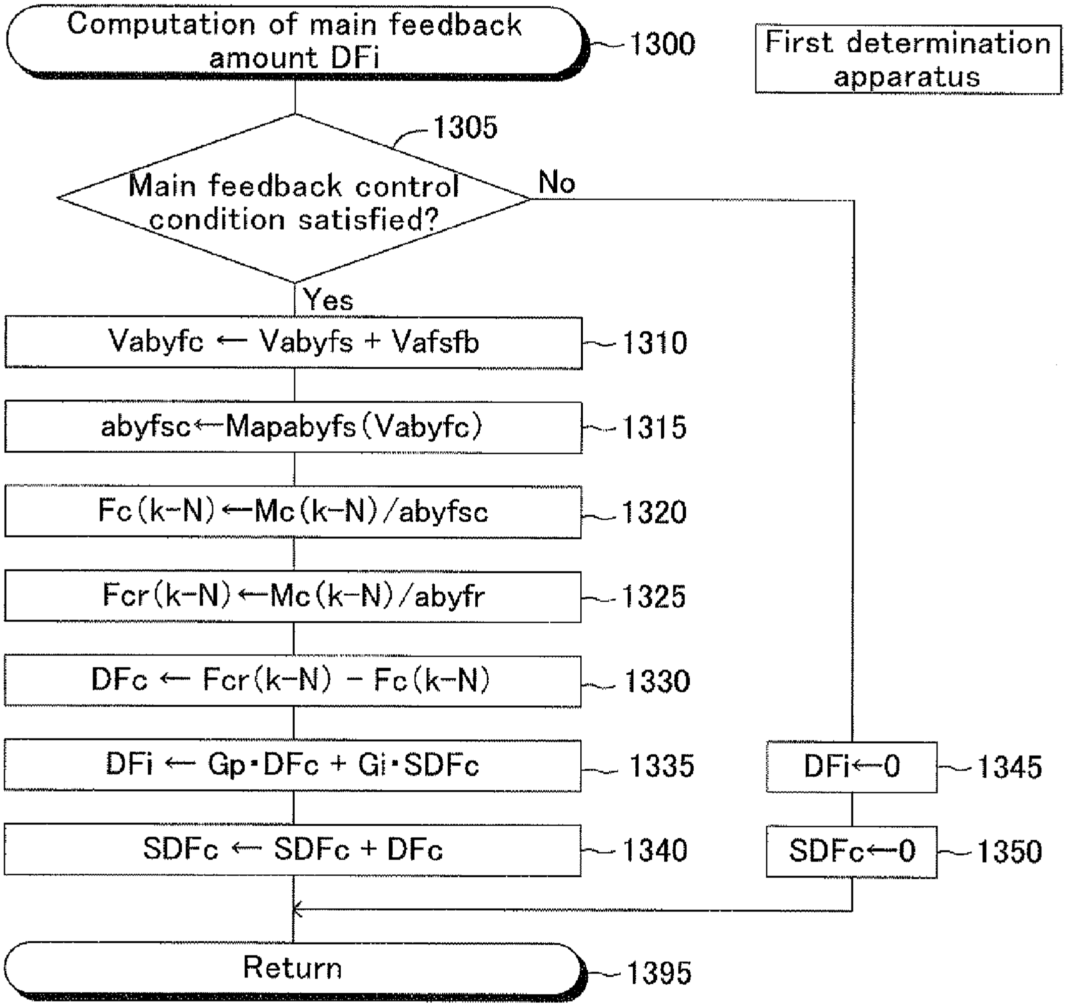
FIG. 13 is a flowchart showing another routine executed by the CPU of the first determination apparatus.

The CPU 71 repeatedly executes a "main feedback amount computation routine" shown by a flowchart of FIG. 13 every time a predetermined time elapses. Accordingly, when the predetermined timing comes, the CPU 71 starts processing from step 1300, and proceeds to step 1305 to determine whether or not a "main feedback control condition (upstream-side air-fuel ratio feedback control condition)" is satisfied.

The main feedback control condition is satisfied when all of the following conditions are satisfied:

(A1) The air-fuel ratio sensor 67 has been activated.

(A2) An engine load KL is equal to or smaller than a threshold KLth.

(A3) The fuel cut control is not being performed.

It should be noted that, in the present embodiment, the load KL is a loading rate obtained in accordance with a formula (1) given below. An accelerator pedal operation amount Accp may be used in place of the load factor KL. In the formula (1), Mc is the in-cylinder intake air amount, ρ is the density of air (unit: g/l), L is the displacement of the engine 10 (unit: l), and "4" is the number of the cylinders of the engine 10.

$$KL=(Mc/(\rho\cdot L/4))\cdot 100\% \quad (1)$$

A description will be continued on the assumption that the main feedback control condition is satisfied. In this case, the CPU 71 makes a "Yes" determination at step 1305 to execute processes from steps 1310 to 1340 described below one after another, and then proceeds to step 1395 to end the present routine tentatively.

Step 1310: The CPU 71 obtains an output value Vabyfc for a feedback control, according to a formula (2) described below. In the formula (2), Vabyfs is the output value of the air-fuel ratio sensor 67, Vafsfb is a sub feedback amount calculated based on the output value Voxs of the downstream air-fuel ratio sensor 68. The way by which the sub feedback amount Vafsfb is calculated is well known. For example, the sub feedback amount Vafsfb is decreased when the output value Voxs of the downstream air-fuel ratio sensor 68 is a value indicating an air-fuel ratio richer than the stoichiometric air-fuel ratio corresponding to the value Vst, and is increased when the output value Voxs of the downstream air-fuel ratio sensor 68 is a value indicating an air-fuel ratio leaner than the stoichiometric air-fuel ratio corresponding to the value Vst. Note that the first determination apparatus may set the sub feedback amount Vafsfb to (at) "0", so that it may not perform the sub feedback control.

$$Vabyfc=Vabyfs+Vafsfb \quad (2)$$

Step 1315: The CPU 71 obtains an air-fuel ratio abyfsc for a feedback control by applying the output value Vabyfc for a feedback control to the table Mapabyfs shown in FIG. 4, as shown by a formula (3) described below.

$$abyfsc=Mapabyfs(Vabyfc) \quad (3)$$

Step 1320: According to a formula (4) described below, the CPU 71 obtains a "in-cylinder fuel supply amount Fc(k−N)" which is an "amount of the fuel actually supplied to the combustion chamber 25 for a cycle at a timing N cycles before the present time." That is, the CPU 71 obtains the "in-cylinder fuel supply amount Fc(k−N)" through dividing the "in-cylinder intake air amount Mc(k−N) which is the in-cylinder intake air amount for the cycle the N cycles (i.e., N·720° crank angle) before the present time" by the "air-fuel ratio abyfsc for a feedback control."

$$Fc(k-N)=Mc(k-N)/abyfsc \quad (4)$$

The reason why the in-cylinder intake air amount Mc(k−N) for the cycle N cycles before the present time is divided by the air-fuel ratio abyfsc for a feedback control in order to obtain the in-cylinder fuel supply amount Fc(k−N) is because the "exhaust gas generated by the combustion of the mixture in the combustion chamber 25" requires time "corresponding to the N cycles" to reach the air-fuel ratio sensor 67.

Step 1325: The CPU 71 obtains a "target in-cylinder fuel supply amount Fcr(k−N)" which is a "fuel amount which was supposed to be supplied to the combustion chamber 25 for the cycle the N cycles before the present time", according to a formula (5) described below. That is, the CPU 71 obtains the target in-cylinder fuel supply amount Fcr(k−N) through dividing the in-cylinder intake air amount Mc(k−N) for the cycle the N cycles before the present time by the target air-fuel ratio abyfr.

$$Fcr(k-N)=Mc(k-N)/abyfr \quad (5)$$

Step 1330: The CPU 71 obtains an "error DFc of the in-cylinder fuel supply amount", according to a formula (6) described below. That is, the CPU 71 obtains the error DFc of the in-cylinder fuel supply amount by subtracting the in-cylinder fuel supply amount Fc(k−N) from the target in-cylinder fuel supply amount Fcr(k−N). The error DFc of the in-cylinder fuel supply amount represents excess and deficiency of the fuel supplied to the cylinder the N cycle before the present time.

$$DFc=Fcr(k-N)-Fc(k-N) \quad (6)$$

Step 1335: The CPU 71 obtains the main feedback amount DFi, according to a formula (7) described below. In the formula (7) below, Gp is a predetermined proportion gain, and Gi is a predetermined integration gain. Further, a "value SDFc" in the formula (7) is an "integrated value of the error DFc of the in-cylinder fuel supply amount". That is, the CPU 71 calculates the "main feedback amount DFi" based on a proportional-integral control to have the air-fuel ratio abyfsc for a feedback control become equal to the target air-fuel ratio abyfr.

$$DFi=Gp\cdot DFc+Gi\cdot SDFc \quad (7)$$

Step 1340: The CPU 71 obtains a new integrated value SDFc of the error of the in-cylinder fuel supply amount by adding the error DFc of the in-cylinder fuel supply amount obtained at the step 1330 to the current integrated value SDFc of the error DFc of the in-cylinder fuel supply amount.

As described above, the main feedback amount DFi is obtained based on the proportional-integral control. The main feedback amount DFi is reflected in (onto) the final fuel injection amount Fi by the process of the step 1240 shown in FIG. 12.

In contrast, when the determination is made at step 1305, and if the main feedback condition is not satisfied, the CPU 71 makes a "No" determination at step 1305 to proceed to step 1345, at which the CPU 71 sets the value of the main feedback amount DFi to (at) "0". Subsequently, the CPU 71 stores "0" into the integrated value SDFc of the error of the in-cylinder fuel supply amount at step 1350. Thereafter, the CPU 71 proceeds to step 1395 to end the present routine tentatively. As described above, when the main feedback condition is not satisfied, the main feedback amount DFi is set to (at) "0". Accordingly, the correction for the basic fuel injection amount Fbase with the main feedback amount DFi is not performed.

<Inter-Cylinder Air-Fuel Ratio Imbalance Determination>

Next, there will be described processing for performing "inter-cylinder air-fuel ratio imbalance determination." The CPU 71 is designed to execute an "inter-cylinder air-fuel ratio imbalance determination routine" shown in the flowchart of FIG. 14 every time 4 ms (predetermined, fixed sampling interval ts) elapses.

Therefore, when a predetermined timing comes, the CPU 71 starts processing from step 1400, and then proceeds to step 1405 to determine whether or not a value of a parameter obtaining permission flag Xkyoka is "1."

The value of the parameter obtaining permission flag Xkyoka is set to (at) "1", when a parameter obtaining condition (imbalance determination parameter obtaining permissible condition) described later is satisfied at a point in time at which the absolute crank angle CA reaches 0° crank angle, and is set to (at) "0" immediately after a point in time at which the parameter obtaining condition becomes unsatisfied.

The parameter obtaining condition is satisfied when all of conditions described below (conditions C1 to C6) are satisfied. Accordingly, the parameter obtaining condition is unsatisfied when at least one of the conditions described below (conditions C1 to C6) is unsatisfied. It should be noted that the conditions constituting the parameter obtaining condition are not limited to those conditions C1 to C6 described below.

(Condition 1) A final result as to the inter-cylinder air-fuel-ratio imbalance determination has not been obtained yet after the current start of the engine 10. The condition C1 is also referred to as an imbalance determination execution request condition. The condition C1 may be replaced by a condition satisfied when "an integrated value of an operation time of the engine or an integrated value of the intake air flow rate Ga is equal to or larger than a predetermined value."

(Condition 2) The intake air flow rate Ga measured by the air-flow meter 61 is within a predetermined range. That is, the intake air flow rate Ga is equal to or larger than a low-side intake air flow rate threshold GaLoth and is equal to or smaller than a high-side intake air flow rate threshold GaHith.

(Condition 3) The engine rotational speed NE is within a predetermined range. That is, the engine rotational speed NE is equal to or larger than a low-side engine rotational speed NELoth and is equal to or smaller than a high-side engine rotational speed NEHith.

(Condition 4) The cooling water temperature THW is equal to or higher than a threshold cooling water temperature THWth.

(Condition 5) The main feedback control condition is satisfied.

(Condition 6) The fuel cut control is not being performed.

It is assumed here that the value of the parameter obtaining permission flag Xkyoka is equal to "1". In this case, the CPU 71 makes a "Yes" determination at step 1405 to proceed to step 1410, at which the CPU 71 sets a value of a sensor element temperature elevation request flag Xtupreq to (at) "1." The value of the sensor element temperature elevation request flag Xtupreq is set to (at) "0" in an initial routine. The initial routine is a routine which is executed by the CPU 71 when the ignition key switch of the vehicle equipped with the engine 10 is turned from the OFF position to the ON position.

Figure 6:
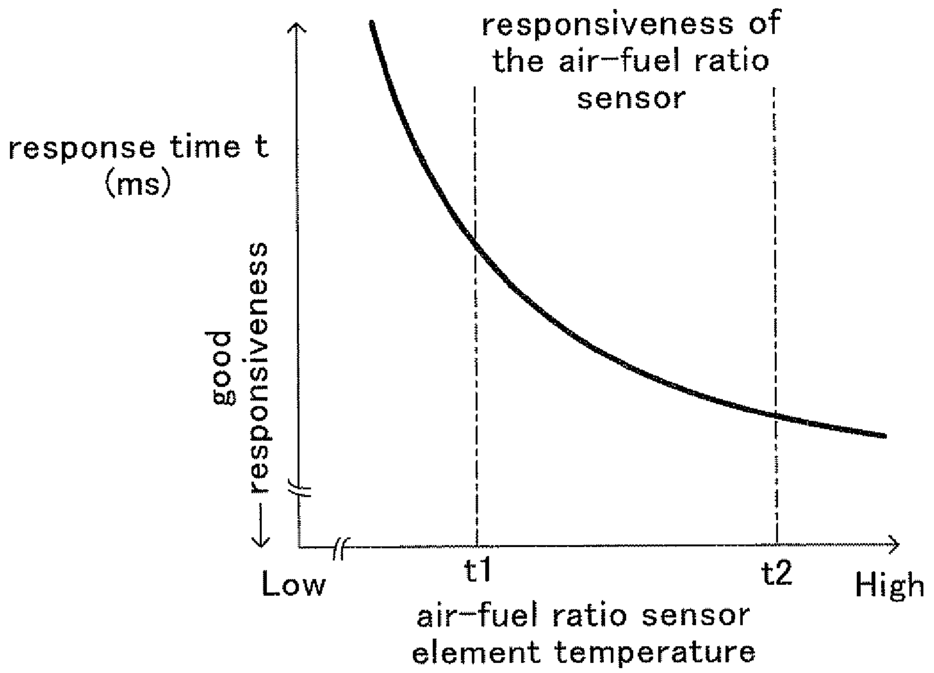
FIG. 6 is a graph showing the responsiveness of the air-fuel ratio sensor with respect to an air-fuel ratio sensor element temperature.

When the value of the sensor element temperature elevation request flag Xtupreq is set to (at) "1", the heater duty Duty representing the amount of energy supplied to the heater is increased by processing an "air-fuel ratio sensor heater control routine" shown in FIG. 15 described later, the temperature (air-fuel ratio sensor element temperature) of the air-fuel ratio detecting section 67*a* (especially, the sensor element section comprising the solid electrolyte layer 671, the exhaust-gas-side electrode layer 672, and the atmosphere-side electrode layer 673) is elevated/raised from the "first temperature (usual temperature) t1 serving as the parameter-non-obtaining-period-element-temperature" to the "second temperature (elevated temperature) t2 serving as the parameter-obtaining-period-element-temperature." As a result, the responsiveness of the air-fuel ratio sensor 67 becomes higher (refer to FIG. 6).

Subsequently, the CPU 71 proceeds to step 1415, at which the CPU 71 determines whether or not a delay time (a predetermined time) Tdelayth has elapsed since a point in time at which the value of the sensor element temperature elevation request flag Xtupreq was changed from "0" to "1." When the delay time Tdelayth has not elapsed since the point in time at which the value of the sensor element temperature elevation request flag Xtupreq was changed from "0" to "1", the CPU 71 makes a "No" determination at step 1415 to directly proceed to step 1495 to end the present routine tentatively.

In contrast, at a point in time at which the CPU 71 executes the process of step 1415, if the delay time Tdelayth has elapsed since the point in time at which the value of the sensor element temperature elevation request flag Xtupreq was changed from "0" to "1", the CPU 71 proceeds from step 1415 to step 1420, at which the CPU 71 obtains the "output value of the air-fuel ratio sensor 67 at that point in time" through an AD conversion. It should be noted that step 1415 may be omitted. In this case, the CPU 71 directly proceeds to step 1420 after step 1410.

Subsequently, the CPU proceeds to step 1425 to obtain a present/current detected air-fuel ratio abyfs by applying the output value Vabyfs obtained at step 1420 to the air-fuel ratio conversion table Mapabyfs shown in FIG. 4. It should be noted that the CPU 71 stores the detected air-fuel ratio obtained when the present routine was previously executed as a previous detected air-fuel ratio abyfsold, before the process of step 1420. That is, the previous detected air-fuel ratio abyfsold is the detected air-fuel ratio abyfs 4 ms (the sampling time ts) before the present time. An initial value of the previous detected air-fuel ratio abyfsold is set at a value corresponding to an AD-converted value of the stoichiometric air-fuel ratio in the above-described initial routine.

Subsequently, the CPU 71 proceeds to step 1430, at which the CPU 71, (A) obtains the detected air-fuel ratio changing rate SAF, (B) renews/updates a cumulated value SAFD of an absolute value |ΔAF| of the detected air-fuel ratio changing rate ΔAF, and (C) renews/updates a cumulated number counter Cn showing how many times the absolute value |ΔAF| of the detected air-fuel ratio changing rate ΔAF is accumulated (integrated) to the cumulated value SAFD.

Next will be described the ways in which these values are renewed more specifically.

(A) Obtainment of the detected air-fuel ratio change rate ΔAF:

The detected air-fuel ratio change rate ΔAF (differential value d(abyfs)/dt) is a data (basic indicating amount) which is a base data for the air-fuel ratio fluctuation indicating amount AFD as well as the imbalance determination parameter X. The CPU 71 obtains the detected air-fuel ratio change rate ΔAF by subtracting the previous detected air-fuel ratio abyfsold from the present detected air-fuel ratio abyfs. That is, when the present detected air-fuel ratio abyfs is expressed as abyfs(n) and the previous detected air-fuel ratio abyfs is expressed as abyfs(n−1), the CPU 71 obtains the "present detected air-fuel ratio change rate ΔAF(n)" at step 1430, according to a formula (8) described below.

$$\Delta AF(n)=abyfs(n)-abyfs(n-1) \tag{8}$$

(B) Renewal of the integrated value SAFD of the absolute value |ΔAF| of the detected air-fuel ratio change rate ΔAF:

The CPU 71 obtains the present integrated value SAFD(n) according to a formula (9) described below. That is, the CPU 71 renews the integrated value SAFD by adding the absolute value |ΔAF(n)| of the present detected air-fuel ratio change rate ΔAF(n) calculated as above to the previous integrated value SAFD(n−1) at the point in time when the CPU 71 proceeds to step 1430.

$$SAFD(n)=SAFD(n-1)+|\Delta AF(n)| \tag{9}$$

Figure 5:
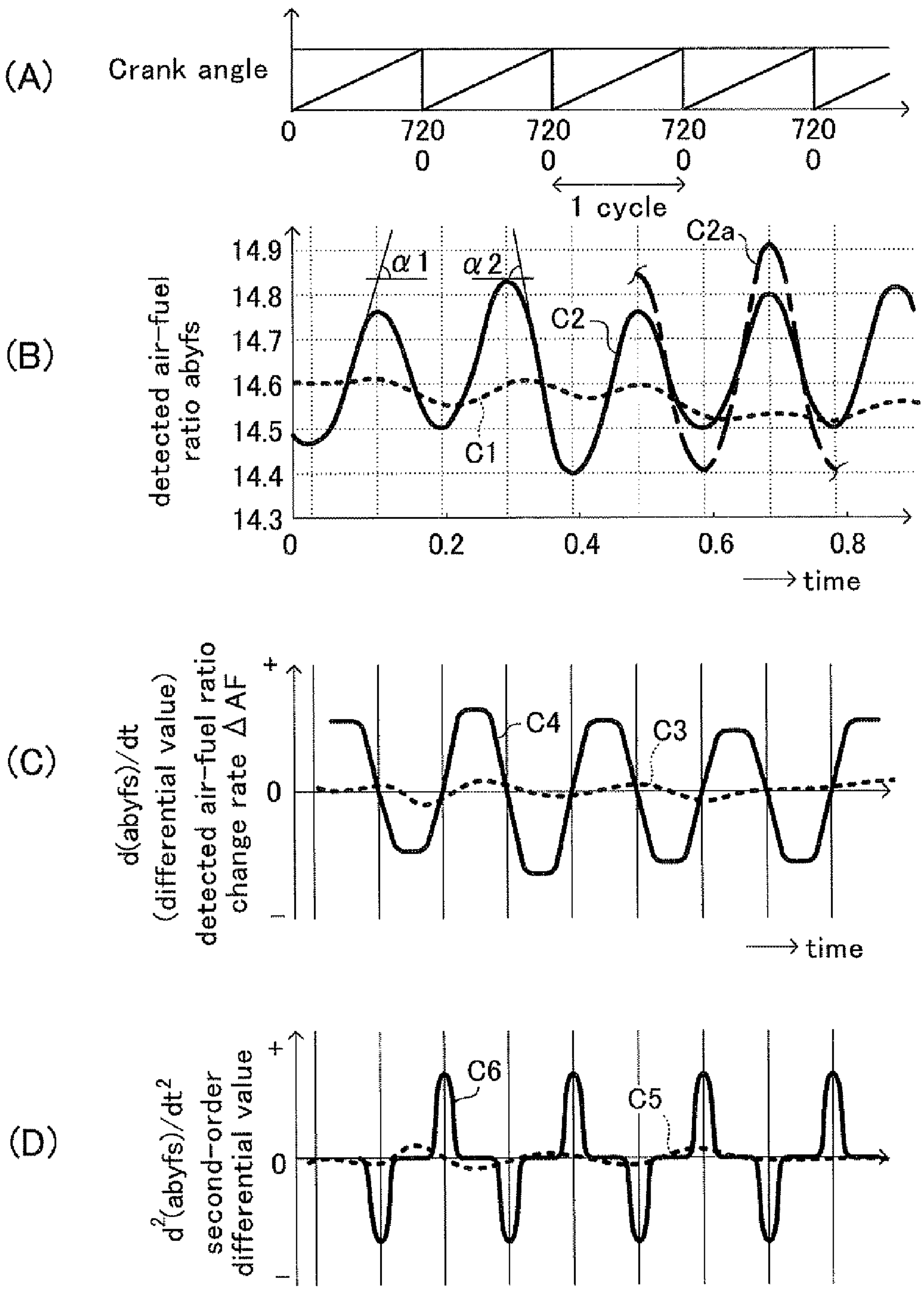
FIG. 5 is a set of time charts showing behaviors of values associated with imbalance determination parameters for the case where an inter-cylinder air-fuel ratio imbalance state has occurred and the case where an inter-cylinder air-fuel ratio imbalance state has not occurred.

The reason why the "absolute value |ΔAF(n)| of the present detected air-fuel ratio change rate" is added to the integrated value SAFD is that the detected air-fuel ratio change rate ΔAF(n) can become both a positive value and a negative value, as understood from (B) and (C) in FIG. 5. It should be noted that the integrated value SAFD is set to (at) "0" in the initial routine described above.

(C) Renewal of the cumulated number counter Cn of the absolute value |ΔAF| of the detected air-fuel ratio change rate ΔAF added to the integrated value SAFD:

The CPU 71 increments a value of the counter Cn by "1" according to a formula (10) described below. Cn(n) represents the counter Cn after the renewal, and Cn(n−1) represents the counter Cn before the renewal. The value of the counter Cn is set to (at) "0" in the initial routine described above, and is also set to (at) "0" at step 1475 described later. The value of the counter Cn therefore represents the number of data of the absolute value |ΔAF| of the detected air-fuel ratio change rate ΔAF which has been accumulated in the integrated value SAFD.

$$Cn(n)=Cn(n-1)+1 \quad (10)$$

Subsequently, the CPU 71 proceeds to step 1435 to determine whether or not the crank angle CA (the absolute crank angle CA) measured with reference to the top dead center of the compression stroke of the reference cylinder (in the present example, the first cylinder) reaches 720° crank angle. When the absolute crank angle CA is less than 720° crank angle, the CPU 71 makes a "No" determination at step 1435 to directly proceed to step 1495 at which the CPU 71 ends the present routine tentatively.

It should be noted that step 1435 is a step to define the smallest unit period for obtaining a mean value (or average) of the absolute values |ΔAF| of the detected air-fuel ratio change rates ΔAF. Here, the "720° crank angle which is the unit combustion cycle" corresponds to the smallest unit period. The smallest unit period may obviously be shorter than the 720° crank angle, however, may preferably be a time period longer than or equal to a period having an integral multiple of the sampling time ts. That is, it is preferable that the smallest unit period be set/determined in such a manner that a plurality of the detected air-fuel ratio change rates ΔAF are obtained in the smallest unit period.

Meanwhile, if the absolute crank angle CA reaches 720° crank angle when the CPU 71 executes the process of step 1435, the CPU 71 makes a "Yes" determination at step 1435 to proceed to step 1440.

The CPU 71, at step 1440:

(D) calculates a mean value (average) AveΔAF of the absolute values |ΔAF| of the detected air-fuel ratio change rates ΔAF, (E) renews/updates an integrated value Save of the mean value AveΔAF, and (F) renews/updates a cumulated number counter Cs.

The ways in which these values are renewed will be next be described more specifically.

(D) Calculation of the mean value AveΔAF of the absolute values |ΔAF| of the detected air-fuel ratio change rates ΔAF:

The CPU 71 calculates the mean value AveΔAF (=SAFD/Cn) of the absolute values |ΔAF| of the detected air-fuel ratio change rates ΔAF by dividing the integrated value SAFD by the value of the counter Cn, as shown in a formula (11) described below.

$$Ave\Delta AF=SAFD/Cn \quad (11)$$

(E) Renewal of the integrated value Save of the mean value AveΔAF:

The CPU 71 obtains the present integrated value Save(n) according to a formula (12) described below. That is, the CPU 71 renews the integrated value Save by adding the present mean value AveΔAF obtained as described above to the previous integrated value Save(n−1) at the point in time when the CPU 71 proceeds to step 1440. The value of the integrated value Save(n) is set to (at) "0" in the initial routine described above.

$$\mathrm{Save}(n)=\mathrm{Save}(n-1)+Ave\Delta AF \quad (12)$$

(F) Renewal of the cumulated number counter Cs:

The CPU 71 increments a value of the counter Cs by "1" according to a formula (13) described below. Cs(n) represents the counter Cs after the renewal, and Cs(n−1) represents the counter Cs before the renewal. The value of the counter Cs is set to (at) "0" in the initial routine described above. The value of the counter Cs therefore represents the number of data of the mean value AveΔAF which has been accumulated in the integrated value Save.

$$Cs(n)=Cs(n-1)+1 \quad (13)$$

Subsequently, the CPU 71 proceeds to step 1445 to determine whether or not the value of the counter Cs is larger than or equal to a threshold value Csth. When the value of the counter Cs is smaller than the threshold value Csth, the CPU 71 makes a "No" determination at step 1445 to directly proceed to step 1495 at which the CPU 71 ends the present routine tentatively. It should be noted that the threshold value Csth is a natural number, and is preferably larger than or equal to 2.

Meanwhile, if the value of the counter Cs is larger than or equal to the threshold value Csth when the CPU 71 executes the process of step 1445, the CPU 71 makes a "Yes" determination at step 1445 to execute processes of step 1450 and step 1455 one after another, and then proceeds to step 1460.

Step 1450: The CPU 71 obtains the air-fuel ratio fluctuation indicating amount AFD through dividing the integrated value Save by the value of the counter (=Csth) according to a formula (14) described below. The air-fuel ratio fluctuation indicating amount AFD is a value obtained by averaging the mean values of the absolute values |ΔAF| of the detected air-fuel ratio change rates ΔAF, each of the mean values being obtained for each of the unit combustion cycle periods, over a plurality (Csth) of the unit combustion cycle periods.

$$AFD=\mathrm{Save}/Csth \quad (14)$$

Step 1455: The CPU 71 obtains, as the imbalance determination parameter X, the air-fuel ratio fluctuation indicating amount AFD obtained at step 1450.

Subsequently, the CPU 71 proceeds to step 1460 to determine whether or not the imbalance determination parameter X is larger than an imbalance determination threshold Xth.

When the imbalance determination parameter X is larger than the imbalance determination threshold Xth, the CPU 71 makes a "Yes" determination at step 1460 to proceed to step 1465, at which the CPU 71 sets a value of an imbalance occurrence flag XINB to (at) "1." That is, the CPU 71 determines that an inter-cylinder air-fuel ratio imbalance state has been occurring. Furthermore, the CPU 71 may turn on a warning lamp which is not shown. Note that the value of the imbalance occurrence flag XINB is stored in the backup RAM 74. Next, the CPU 71 proceeds to step 1495 to end the present routine tentatively.

In contrast, if the imbalance determination parameter X is equal to or smaller than the imbalance determination threshold Xth when the CPU 71 performs the process of step 1460, the CPU 71 makes a "No" determination in step 1460 to proceed to step 1470, at which the CPU 71 sets the value of the imbalance occurrence flag XINB to (at) "2." That is, the CPU 71 memorizes the "fact that it has been determined that the inter-cylinder air-fuel ratio imbalance state has not occurred according to the result of the inter-cylinder air-fuel ratio imbalance determination." Next, the CPU 71 proceeds to step 1495 to end the present routine tentatively. Note that step 1470 may be omitted.

Meanwhile, if the value of the parameter obtaining permission flag Xkyoka is not "1" when the CPU 71 proceeds to step 1405, the CPU 71 makes a "No" determination at step 1405 to proceed to step 1475. Subsequently, the CPU 71 sets (clears) the each of the values (e.g., ΔAF, SAFD, SABF, Cn, etc.) to "0." Next, the CPU 71 proceeds to step 1480 to set the value of the sensor element temperature elevation request flag Xtupreq to (at) "0." This decreases the heater duty Duty, so that the air-fuel ratio sensor element temperature is returned to the usual temperature (first temperature t1 serving as the parameter-non-obtaining-period-element-temperature). Thereafter, the CPU 71 directly proceeds to step 1495 to end the present routine tentatively.

<Air-Fuel Ratio Sensor Heater Control>

Figure 15:
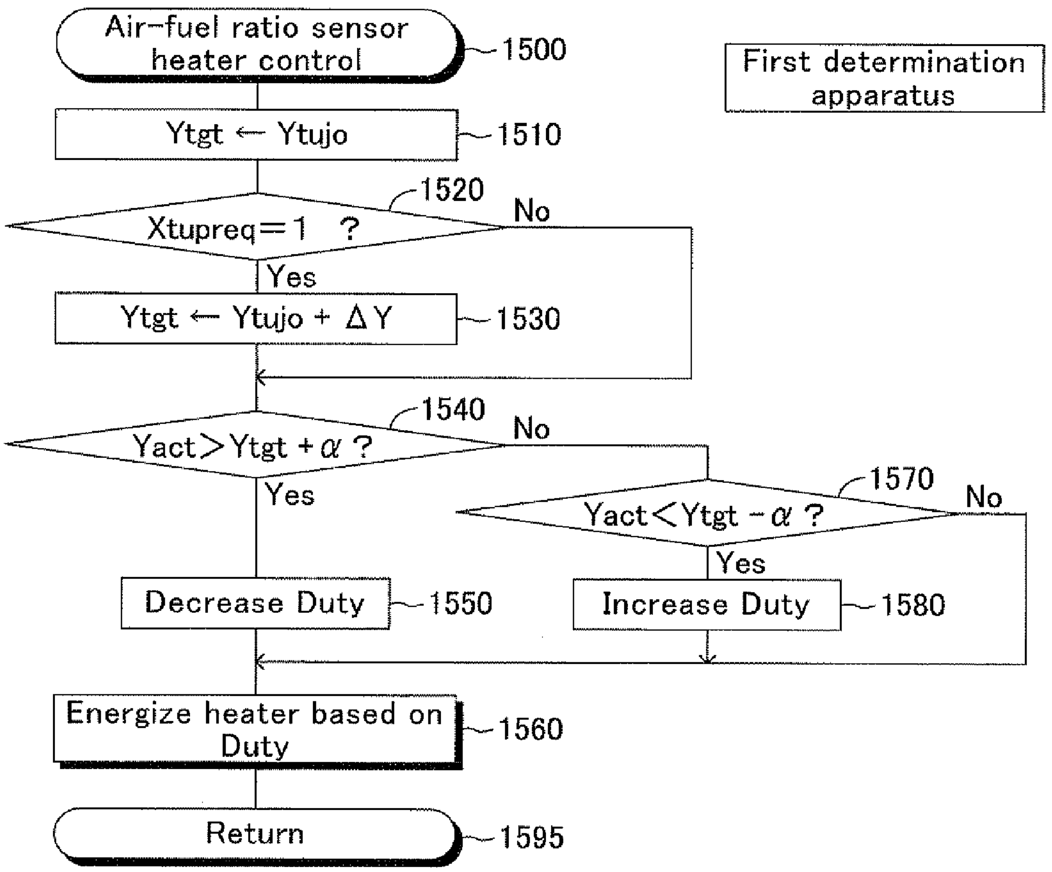
FIG. 15 is a flowchart showing another routine executed by the CPU of the first determination apparatus.

Further, the CPU 71 executes an "air-fuel ratio sensor heater control routine" shown by a flowchart of FIG. 15 every time a predetermined time elapses, in order to control the air-fuel ratio sensor element temperature.

Accordingly, when the predetermined timing comes, the CPU 71 starts processing from step 1500 in FIG. 15 to proceed to step 1510, at which the CPU 71 sets the target admittance Ytgt to (at) a usual value Ytujo. The target admittance Ytgt corresponds to a target value for the air-fuel ratio sensor element temperature. The usual value Ytujo is set to a value in such a manner that the air-fuel ratio sensor 67 becomes activated, and the output value Vabyfs corresponds to a value which coincides with an air-fuel ratio of the exhaust gas when the air-fuel ratio of the exhaust gas is stable. For example, the usual value Ytujo is an admittance Y when the sensor element temperature is about 700° C. The air-fuel ratio sensor element temperature corresponding to the usual value Ytujo is "the usual temperature and the first temperature t1" as described above.

Subsequently, the CPU 71 proceeds to step 1520 to determine whether or not the sensor element temperature elevation request flag Xtupreq is "1." When the sensor element temperature elevation request flag Xtupreq is "1", the CPU 71 makes a "Yes" determination at step 1520 to proceed to step 1530, at which the CPU 71 sets the target admittance Ytgt to (at) a "value obtained by adding a predetermined positive value ΔY to the usual value Ytujo." That is, the CPU 71 makes the target admittance Ytgt larger than the usual value Ytujo. Thereafter, the CPU 71 proceeds to step 1540.

The "value obtained by adding the predetermined positive value ΔY to the usual value Ytujo" may also be referred to as an elevated value. The elevated value is set to a value in such a manner that the air-fuel ratio sensor 67 becomes activated, and the responsiveness of the air-fuel ratio sensor 67 is a "degree at which the output value Vabyfs can sufficiently follow the fluctuation of the air-fuel ratio sensor of the exhaust gas." For example, the elevated value is an admittance Y when the sensor element temperature is about 850° C. The sensor element temperature corresponding to the elevated value is "the elevated temperature and the second temperature t2" as described above.

On the other hand, if the sensor element temperature elevation request flag Xtupreq is not "1" (that is, it is "0") when the CPU 71 executes the process of step 1520, the CPU 71 makes a "No" determination at step 1520 to directly proceed to step 1540.

The CPU 71, at step 1540, determines whether or not the actual admittance Yact of (the solid electrolyte layer 671 of) the air-fuel ratio sensor 67 is larger than a "value obtained by adding a predetermined positive value α to the target admittance Ytgt."

When the condition in step 1540 is satisfied, the CPU 71 makes a "Yes" determination at step 1540 to proceed to step 1550, at which the CPU 71 decreases the heater duty Duty by a predetermined amount AD. Subsequently, the CPU 71 proceeds to step 1560 to energize the heater 678 based on the heater duty Duty. In this case, because the heater duty is decreased, an amount of energy (current) supplied to the heater 678 is decreased, so that the amount of heat generation by the heater 678 is decreased. Consequently, the air-fuel ratio sensor element temperature is decreased. Thereafter, the CPU 71 proceeds to step 1595 to end the present routine tentatively.

In contrast, if the actual admittance Yact is smaller than or equal to the "value obtained by adding the predetermined positive value α to the target admittance Ytgt" when the CPU 71 executes the process of step 1540, the CPU 71 makes a "No" determination at step 1540 to proceed to step 1570. At step 1570, the CPU 71 determines whether or not the actual admittance Yact is smaller than a "value obtained by subtracting the predetermined positive value α from the target admittance Ytgt."

When the condition in step 1570 is satisfied, the CPU 71 makes a "Yes" determination at step 1570 to proceed to step 1580, at which the CPU 71 increases the heater duty Duty by the predetermined amount ΔD. Subsequently, the CPU 71 proceeds to step 1560 to energize the heater 678 based on the heater duty Duty. In this case, because the heater duty is increased, an amount of energy (current) supplied to the heater 678 is increased, so that the amount of heat generation by the heater 678 is increased. Consequently, the air-fuel ratio sensor element temperature is elevated/increased/raised. Thereafter, the CPU 71 proceeds to step 1595 to end the present routine tentatively.

In contrast, if the actual admittance Yact is larger than the "value obtained by subtracting the predetermined positive value α from the target admittance Ytgt" when the CPU 71 executes the process of step 1570, the CPU 71 makes a "No" determination at step 1570 to directly proceed to step 1560. In this case, because the heater duty is not changed, an amount of energy supplied to the heater 678 is not changed. Consequently, since the amount of heat generation by the heater 678 is not changed, the air-fuel ratio sensor element temperature does not greatly change. Thereafter, the CPU 71 proceeds to step 1595 to end the present routine tentatively.

In this manner, the actual admittance Yact is controlled within a rage in the vicinity of the target admittance Ytgt (the range between Ytgt−α and Ytgt+α) according to the heater control. In other words, the air-fuel ratio sensor element temperature is made coincide with a value corresponding to the target admittance Ytgt. Accordingly, the air-fuel ratio sensor element temperature is maintained at a temperature in the vicinity of the usual temperature when the value of the sensor element temperature elevation request flag Xtupreq is "0", and the air-fuel ratio sensor element temperature is maintained at a temperature in the vicinity of the elevated temperature when the value of the sensor element temperature elevation request flag Xtupreq is "1."

As described above, the first determination apparatus is applied to the multi-cylinder internal combustion engine 10 having a plurality of the cylinders.

Further, the first determination apparatus comprises the air-fuel ratio sensor 67 including the sensor element section, a plurality of the fuel injection valves 39, and heater control means for controlling the amount of heat generation of the heater 678 (the routine shown in FIG. 15).

Figure 14:
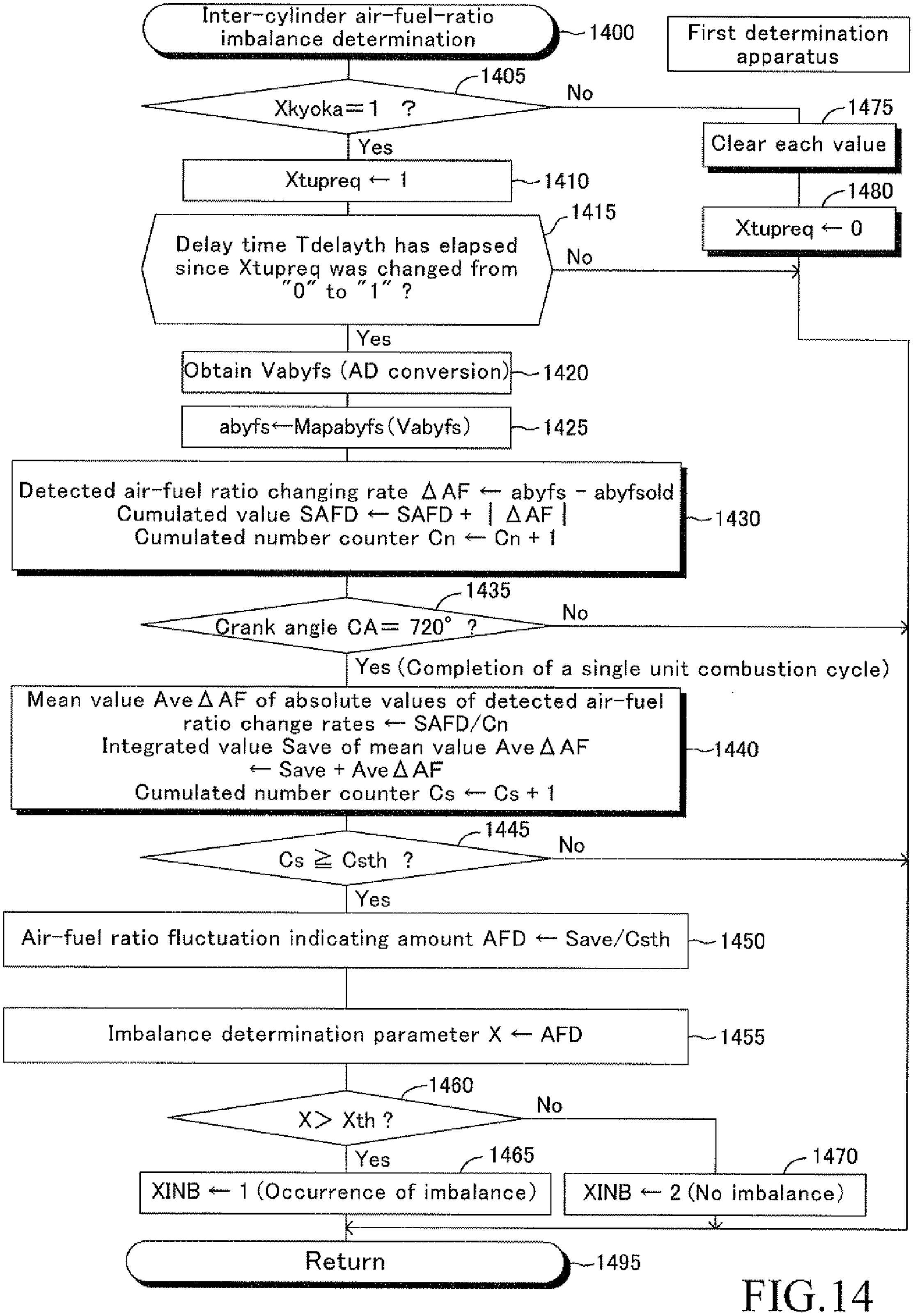
FIG. 14 is a flowchart showing another routine executed by the CPU of the first determination apparatus.

Furthermore, the first determination apparatus comprises imbalance determining means which:

obtains, based on the output value Vabyfs of the air-fuel ratio sensor 67, the imbalance determination parameter X which becomes larger as the air-fuel ratio variation/fluctuation of the "exhaust gas passing/flowing through the position at which the air-fuel ratio sensor 67 is disposed" becomes larger, in the period for/in which the predetermined parameter obtaining condition is being satisfied (parameter obtaining period in which the value of the parameter obtaining permission flag Xkyoka is "1") (the "Yes" determination at step 1405 of FIG. 14, and steps from step 1420 to step 1455); determines that the inter-cylinder air-fuel ratio imbalance state has occurred, when the obtained imbalance determination parameter X is larger than the predetermined imbalance determination threshold Xth (step 1460 and step 1465 of FIG. 14); and determines that the inter-cylinder air-fuel ratio imbalance state has not occurred, when the obtained imbalance determination parameter X is smaller than the imbalance determination threshold Xth (step 1460 and step 1470, of FIG. 14).

Further, the imbalance determining means is configured so as to make the heater control means perform the "sensor element section temperature elevation control to have/make the sensor element temperature for the parameter-obtaining-period be higher than the sensor element temperature for the period other than the parameter-obtaining-period (in which the sensor element section temperature is controlled to be the second temperature which is the elevated temperature) (the "Yes" determination at step 1405 of FIG. 14, step 1410 of FIG. 14, the "Yes" determination at step 1520 of FIG. 15, and step 1530 of FIG. 15).

Accordingly, the first determination apparatus can obtain the imbalance determination parameter X in the case where the responsiveness of the air-fuel ratio sensor 67 is good/superior. This allows the obtained imbalance determination parameter X to become a value which accurately represents the inter-cylinder air-fuel ratio imbalance state (cylinder-by-cylinder air-fuel ratio difference). Consequently, the first determination apparatus can accurately perform the inter-cylinder air-fuel-ratio imbalance determination.

Further, the first determination apparatus maintains the air-fuel ratio sensor element temperature at the "temperature, which is equal to or higher than the activation temperature, but which is relatively low (the usual temperature, the first temperature)" (the "No" determination at step 1405 of FIG. 14, step 1480 of FIG. 14, and the "No" determination at step 1520 of FIG. 15). Accordingly, it is possible to avoid that the air-fuel ratio sensor 67 deteriorates early, as compared to the case in which the air-fuel ratio sensor element temperature is always maintained at the relatively high temperature (the elevated temperature, the second temperature).

Second Embodiment

Next, there will be described a determination apparatus according to a second embodiment of the present invention (hereinafter simply referred to as the "second determination apparatus").

The second determination apparatus firstly obtains the air-fuel ratio fluctuation indicating amount AFD as a tentative parameter X in a state in which the air-fuel ratio sensor element temperature is maintained at the usual temperature (first temperature t1), compares the tentative parameter X with a predetermined high-side threshold XHith, and determines that the inter-cylinder air-fuel ratio imbalance state has been occurring when the tentative parameter X is larger than the high-side threshold XHith.

The high-side threshold XHith is set to (at) a relatively large value which allows the apparatus to clearly determine that the "inter-cylinder air-fuel ratio imbalance state has been occurring" when the tentative parameter X, which is obtained in the case in which the air-fuel ratio sensor element temperature is usual temperature, and thus, the responsiveness of the air-fuel ratio sensor 67 is relatively low, is larger than the high-side threshold XHith.

On the other hand, when the tentative parameter X is smaller than the high-side threshold XHith, the second determination apparatus compares the tentative parameter X with a low-side threshold XLoth. The low-side threshold XLoth is smaller than the high-side threshold XHith by a predetermined amount. The low-side threshold XLoth is set to (at) a relatively small value which allows the apparatus to clearly determine that the "inter-cylinder air-fuel ratio imbalance state has not been occurring" when the tentative parameter X is smaller than the low-side threshold XLoth. Further, the second determination apparatus determines that the "inter-cylinder air-fuel ratio imbalance state has not been occurring" when the tentative parameter X is smaller than the low-side threshold XLoth.

When the determination as to whether or not the inter-cylinder air-fuel ratio imbalance state has been occurring is made using the tentative parameter X as described above, the second determination apparatus does not perform the sensor element section temperature elevating control at least until the current operation of the engine is stopped.

On the other hand, the second determination apparatus withholds (making) the determination as to whether or not the inter-cylinder air-fuel-ratio imbalance state has been occurring, when the tentative parameter X is "smaller than the high-side threshold XHith and larger than the low-side threshold XLoth", and performs the sensor element section temperature elevating control.

Thereafter, the second determination apparatus again obtains the air-fuel ratio fluctuation indicating amount AFD according to the method described above, in a state in which the air-fuel ratio sensor element temperature is elevated/increased to the elevated temperature (the second temperature t2). The obtained air-fuel ratio fluctuation indicating amount AFD is the imbalance determination parameter X, and is referred to as a final parameter X, for convenience.

When the final parameter X is obtained, the second determination apparatus compares the final parameter X with an imbalance determination threshold Xth (imbalance determination threshold Xth being equal to the high-side threshold XHith, in the second determination apparatus), and determines that the inter-cylinder air-fuel ratio imbalance state has been occurring when the final parameter X is larger than the imbalance determination threshold Xth. In contrast, the second determination apparatus determines that the inter-cylinder air-fuel ratio imbalance state has not been occurring when the final parameter X is smaller than the imbalance determination threshold Xth. These are the principles employed by the second determination apparatus for the inter-cylinder air-fuel-ratio imbalance determination.

It should be noted that the imbalance determination threshold Xth may be set to (at) a value between the low-side threshold XLoth and the high-side threshold XHith. In other words, the high-side threshold XHith may be equal to or larger than the imbalance determination threshold Xth, and the low-side threshold XLoth may be smaller than the imbalance determination threshold Xth.

(Actual Operation)

The CPU 71 of the second determination apparatus executes the routines shown in FIGS. 12, 13, and 15, similarly to the first determination apparatus. Further, the CPU 71 of the second determination apparatus executes routines shown by flowcharts of "FIGS. 16 and 18" every time a predetermined time (the sampling time ts) elapses. The routines shown in FIGS. 12, 13, and 15 have been already described. Accordingly, the routines shown in FIGS. 16 and 18 will be described hereinafter. It should be noted that each step in FIGS. 16 and 18 at which the same processing is performed as each step shown in FIG. 14 is given the same numeral as one given to such step shown in FIG. 14.

Figure 16:
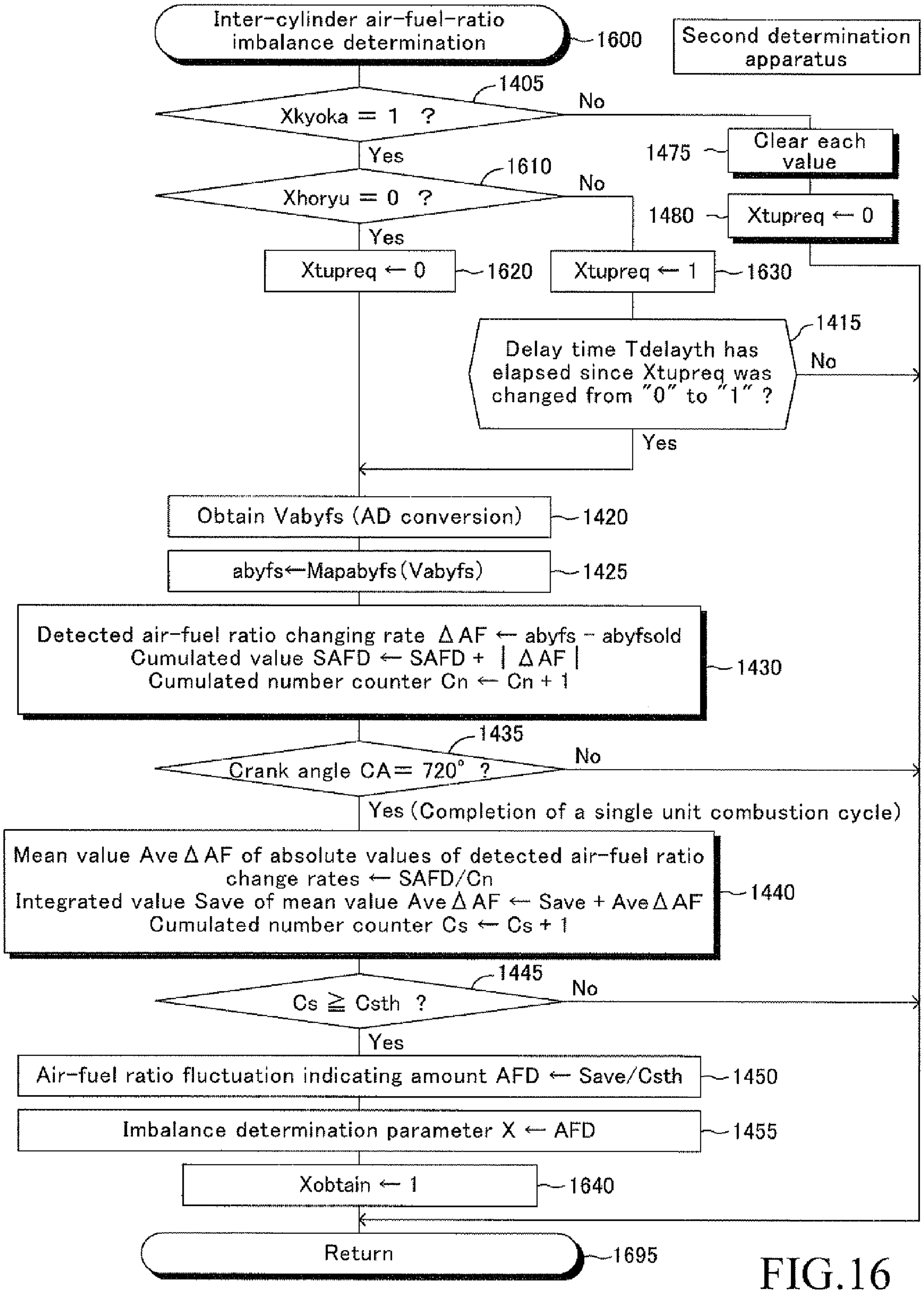
FIG. 16 is a flowchart showing a routine executed by a CPU of an inter-cylinder air-fuel ratio imbalance determination apparatus (second determination apparatus) according to a second embodiment of the present invention.

It is assumed here that the parameter obtaining condition becomes satisfied in a state in which the imbalance determination has not been made yet since the current start of the engine 10, and the parameter obtaining permission flag Xkyoka is therefore set to (at) "1." In this case, the CPU 71 makes a "Yes" determination at step 1405 shown in FIG. 16 to determine whether or not a value of an imbalance determination withholding flag Xhoryu is "0."

The value of the imbalance determination withholding flag Xhoryu is set to (at) "0" in the initial routine described above. Further, the value of the imbalance determination withholding flag Xhoryu is set to (at) "1" after the imbalance determination is made based on the tentative parameter X obtained while the air-fuel ratio sensor element temperature is not elevated (i.e., while the air-fuel ratio sensor element temperature is maintained at the usual temperature) (and the value of the flag Xhoryu is set to (at) "1" when the imbalance determination is withheld) (refer to step 1780 shown in FIG. 17 described later).

Accordingly, the value of the imbalance determination withholding flag Xhoryu is "0." This causes the CPU 71 to make a "Yes" determination at step 1610, and to proceed to step 1620, at which the CPU 71 sets the value of the sensor element temperature elevation request flag Xtupreq to (at) "0." As a result, the air-fuel ratio sensor element temperature is maintained at the usual temperature (the air-fuel ratio sensor element temperature when the actual admittance Yact is equal to the usual target admittance Ytgt=Ytujo").

It should be noted that the value of the sensor element temperature elevation request flag Xtupreq is set to (at) "0" in the initial routine described above. Accordingly, the process of step 1620 at this stage does not change the value of the sensor element temperature elevation request flag Xtupreq substantially.

Thereafter, the CPU 71 obtains, as the "tentative parameter X", the imbalance determination parameter X, by the processes of steps from step 1420 to step 1455. That is, the air-fuel ratio fluctuation indicating amount AFD is obtained in the case in which the air-fuel ratio sensor element temperature is not elevated (the air-fuel ratio sensor element temperature is maintained at the usual temperature), and the air-fuel ratio fluctuation indicating amount AFD is adopted as the imbalance determination parameter X (the tentative parameter X).

After the tentative parameter X is obtained at step 1455, the CPU 71 proceeds to step 1640 to set a value of a parameter obtainment completion flag Xobtain to (at) "1." The value of the parameter obtainment completion flag Xobtain is also set to (at) "0" in the initial routine described above. Thereafter, the CPU 71 proceeds to step 1695 to end the present routine tentatively.

Figure 17:
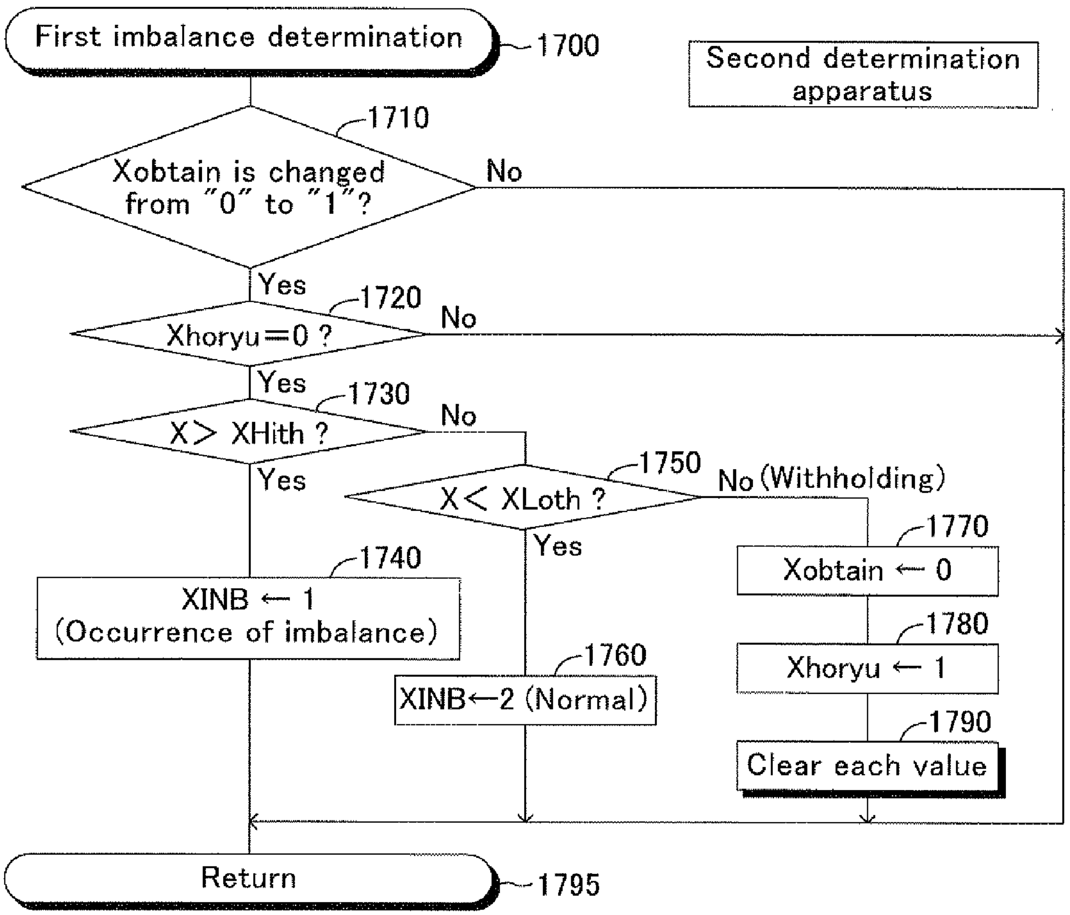
FIG. 17 is a flowchart showing another routine executed by the CPU of the second determination apparatus.

Meanwhile, the CPU 71 starts processing from step 1700 shown in FIG. 17, and proceeds to step 1710 to determine whether or not the present point in time is immediately after the value of the parameter obtainment completion flag Xobtain was changed from "0" to "1." When the determining condition at step 1710 is not satisfied, the CPU 71 makes a "No" determination at step 1710 to directly proceed to step 1795 to end the present routine tentatively.

Figure 18:
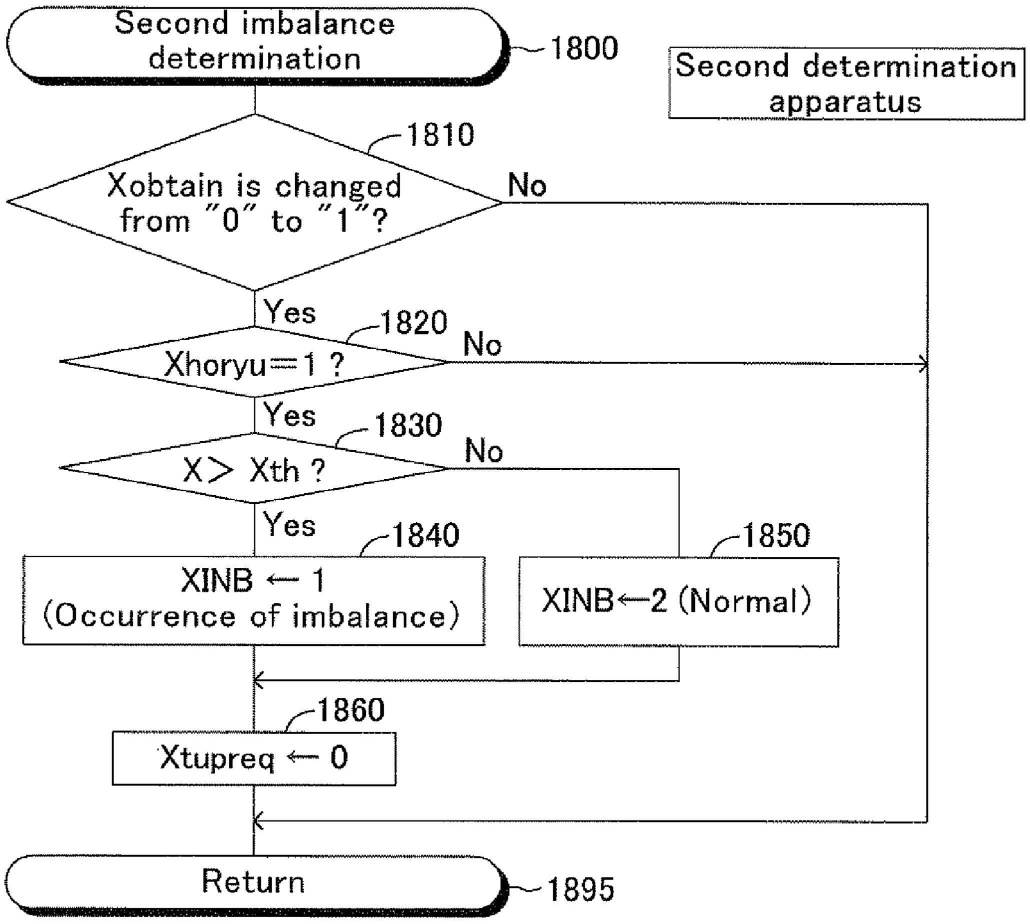
FIG. 18 is a flowchart showing another routine executed by the CPU of the second determination apparatus.

Similarly, the CPU 71 starts processing from step 1800 shown in FIG. 18, and determines whether or not the present point in time is immediately after the value of the parameter obtainment completion flag Xobtain was changed from "0" to "1" at step 1810. When the determining condition at step 1810 is not satisfied, the CPU 71 makes a "No" determination at step 1810 to directly proceed to step 1895 to end the present routine tentatively.

Accordingly, when the tentative parameter X is obtained at step 1455 of FIG. 16, and the value of the parameter obtainment completion flag Xobtain is changed to "1" by the process of step 1640, the CPU 71 makes a "Yes" determination at step 1710 shown in FIG. 17 when the CPU 71 proceeds to step 1710, and then proceeds to step 1720 to determine whether or not the value of the imbalance determination withholding flag Xhoryu (or the sensor element temperature elevation request flag Xtupreq) is "0"

At the present time, the value of the imbalance determination withholding flag Xhoryu is "0". Accordingly, the CPU 71 makes a "Yes" determination at step 1720 to proceed to step 1730, at which the CPU 71 determines whether or not the value of the tentative parameter X is larger than a "predetermined high-side threshold XHith."

When the value of the tentative parameter X is larger than the high-side threshold XHith, the CPU 71 makes a "Yes" determination at step 1730 to proceed to step 1740, at which the CPU 71 sets the value of the imbalance occurrence flag XINB to "1." That is, the CPU 71 determines that the inter-cylinder air-fuel-ratio imbalance state has been occurring. At this time, the CPU 71 may turn on an unillustrated warning lamp. Thereafter, the CPU 71 proceeds to step 1795 to end the present routine tentatively.

In contrast, if the value of the tentative parameter X is smaller than or equal to the high-side threshold XHith, the CPU 71 makes a "No" determination at step 1730 to proceed to step 1750, at which the CPU 71 determines whether or not the value of the tentative parameter X is smaller than a "predetermined "low-side threshold XLoth." The low-side threshold XLoth is smaller than the high-side threshold XHith.

When the tentative parameter X is smaller than the low-side threshold XLoth, the CPU 71 makes a "Yes" determination at step 1750 to proceed to step 1760, at which the CPU 71 sets the value of the value of the imbalance occurrence flag XINB to "2." That is, the CPU 71 memorizes the "fact that it has been determined that the inter-cylinder air-fuel ratio imbalance state has not been occurring according to the result of the inter-cylinder air-fuel ratio imbalance determination." Thereafter, the CPU 71 proceeds to step 1795 to end the present routine tentatively.

On the other hand, if the tentative parameter X is larger than or equal to the low-side threshold XLoth when the CPU 71 executes the process of step 1750, the CPU 71 withholds the imbalance determination. That is, the CPU 71 withholds making a conclusion as to whether or not the inter-cylinder air-fuel-ratio imbalance state has occurred. Thereafter, the CPU 71 elevates the air-fuel ratio sensor element temperature to again perform the obtainment of the imbalance parameter X (air-fuel ratio fluctuation indicating amount AFD) and the imbalance determination.

More specifically, when the tentative parameter X is larger than or equal to the low-side threshold XLoth, the CPU 71 makes a "No" determination at step 1750 to proceed to step 1770, at which the CPU 71 sets the value of the parameter obtainment completion flag Xobtain to (at) "0." Subsequently, the CPU 71 proceeds to step 1780 to set the value of the imbalance determination withholding flag Xhoryu to (at) "1." Thereafter, the CPU 71 proceeds to step 1790 to set (or clear) each of the values used for obtaining the imbalance determination parameter X (e.g., ΔAF, SAFD, Cn, AveΔAF, Save, Cs, and so on) to (at) "0". Subsequently, the CPU 71 proceeds to step 1795 to end the present routine tentatively.

After that, when the CPU 71 starts processing the routine shown in FIG. 16 to proceed to step 1610, the CPU 71 makes a "No" determination at step 1610 since the value of the imbalance determination withholding flag Xhoryu is set to (at) "1", and proceeds to step 1630, at which the CPU 71 sets the value of the sensor element temperature elevation request flag Xtupreq to (at) "1."

When the value of the sensor element temperature elevation request flag Xtupreq is set to (at) "1", the target admittance Ytgt is set to the elevated value (the value obtained by adding the predetermined positive value ΔY to the usual value Ytujo) at step 1530 shown in FIG. 15. This improves/increases the responsiveness of the air-fuel ratio sensor sufficiently, and thus, the accurate imbalance determination parameter X can be obtained.

Further, the CPU 71 executes the processes of steps from step 1415 to step 1445, shown in FIG. 16. Accordingly, when the counter Cs becomes equal to or larger than the threshold value Csth, the CPU 71 proceeds from step 1445 to step 1455 to again obtain the imbalance determination parameter X.

The imbalance determination parameter X is a parameter obtained while the air-fuel ratio sensor element temperature is elevated, and is also referred to as the "final parameter" for convenience.

Subsequently, the CPU 71 sets the value of the parameter obtainment completion flag Xobtain to (at) "1" at step 1640, and proceeds to step 1695 to end the present routine tentatively.

Consequently, the value of the parameter obtainment completion flag Xobtain is changed from "0" to "1." Accordingly, the CPU 71 makes a "Yes" determination at step 1710 shown in FIG. 17 when the CPU 71 proceeds to step 1710, and proceeds to step 1720. At this moment, the value of the imbalance determination withholding flag Xhoryu is "1." The CPU 71 therefore makes a "No" determination at step 1720 to directly proceed to step 1795 to end the present routine tentatively.

Meanwhile, when the CPU 71 proceeds to step 1810 shown in FIG. 18 at this stage, the CPU 71 makes a "Yes" determination at step 1810 to proceed to step 1820. The CPU 71 determines whether or not the value of the imbalance determination withholding flag Xhoryu is "1" at step 1820. Here, the value of the imbalance determination withholding flag Xhoryu is "1." Accordingly, the CPU 71 makes a "Yes" determination at step 1820 to proceed to step 1830, at which the CPU 71 determines whether or not the final parameter X is larger than the imbalance determination threshold Xth (which is equal to the high-side threshold XHith, in the present example).

When the final parameter X is larger than the imbalance determination threshold Xth, the CPU 71 makes a "Yes" determination at step 1830 to proceed to step 1840, at which the CPU **71*b* sets the value of the imbalance occurrence flag XINB to "1." That is, the CPU 71 determines that the inter-cylinder air-fuel ratio imbalance state has been occurring. Thereafter, the CPU 71 proceeds to step 1860**.

To the contrary, if the final parameter X is smaller than or equal to the imbalance determination threshold Xth when the CPU 71 executes the process of step 1830, the CPU 71 makes a "No" determination at step 1830 to proceed to step 1850, at which the CPU **71*b* sets the value of the imbalance occurrence flag XINB to "2." That is, the CPU 71 memorizes the "fact that it has been determined that the inter-cylinder air-fuel ratio imbalance state has not been occurring according to the result of the inter-cylinder air-fuel ratio imbalance determination." Subsequently, the CPU 71 proceeds to step 1860**.

The CPU 71 sets the value of the sensor element temperature elevation request flag Xtupreq to (at) "0" at step 1860, and proceeds to step 1895 to end the present routine tentatively. As a result, the air-fuel ratio sensor element temperature is returned to the usual temperature.

It should be noted that, if the value of the imbalance determination withholding flag Xhoryu is "0" when the CPU 71 proceeds to step 1820 shown in FIG. 18, the CPU 71 makes a "No" determination at step 1820 to directly proceed to step 1895 to end the present routine tentatively.

As described above, the imbalance determining means of the second determination apparatus:

obtains, based on the output value Vabyfs of the air-fuel ratio sensor 67, the imbalance determination parameter X as the tentative parameter X before having the heater control means perform the "sensor element section temperature elevating control" in/during the parameter-obtaining-period (the parameter obtaining permission flag Xkyoka=1) (step 1610, step 1620, and steps from step 1420 to step 1455, in FIG. 16), determines that the inter-cylinder air-fuel ratio imbalance state has been occurring, when the obtained tentative parameter X is larger than the "high-side threshold Hith" (step 1730 and step 1740, in FIG. 17), and determines that the inter-cylinder air-fuel ratio imbalance state has not been occurring, when the obtained tentative parameter X is smaller than the "low-side threshold XLoth which is smaller by the predetermined value than the high-side threshold XHith" (step 1750 and step 1760, in FIG. 17).

Further, the imbalance determining means:

withholds (making) the determination as to whether or not the inter-cylinder air-fuel-ratio imbalance state has occurred, when the obtained tentative parameter X is smaller than the high-side threshold XHith and is larger than the low-side threshold XLoth (refer to the "No" determinations in both step 1730 and step 1750, in FIG. 17), has the heater control means perform the sensor element section temperature elevating control in/during the parameter-obtaining-period (the parameter obtaining permission flag Xkyoka=1) in the case in which the determination as to whether or not the inter-cylinder air-fuel-ratio imbalance state has occurred is being withheld (the imbalance determination withholding flag Xhoryu=1) (step 1780 in FIG. 17, step 1610 and step 1630 in FIG. 16, step 1520 and step 1530, in FIG. 15), and obtain, based on the output value Vabyfs of the air-fuel ratio sensor 67, the imbalance determination parameter X as the final parameter X (steps from step 1420 to step 1455, in FIG. 16); and determines that the inter-cylinder air-fuel-ratio imbalance state has occurred when the obtained final parameter X is larger than the imbalance determination threshold Xth (step 1830 and step 1840, in FIG. 18), and determines that the inter-cylinder air-fuel-ratio imbalance state has not occurred when the obtained final parameter X is smaller than the imbalance determination threshold Xth (step 1830 and step 1850, in FIG. 18).

According to the second determination apparatus, the sensor element section temperature elevating control is not performed, when it is possible to make a clear determination as to "whether or not the inter-cylinder air-fuel-ratio imbalance state has occurred" based on the imbalance determination parameter (the tentative parameter) obtained while the responsiveness of the air-fuel ratio sensor is relatively low. Consequently, chances/frequency of elevating/raising the air-fuel ratio sensor element temperature to the relatively high temperature (the elevated temperature) for the imbalance determination is decreased, and thus, it can be avoided that the deterioration of the air-fuel ratio sensor 67 is accelerated.

Further, according to the second determination apparatus, in the case in which the determination as to whether or not the inter-cylinder air-fuel-ratio imbalance state has occurred is withheld, the air-fuel ratio sensor element temperature is elevated (raised) to the elevated temperature, and thus, the imbalance determination parameter (the final parameter) can be obtained while the responsiveness of the air-fuel ratio sensor 67 is high. Accordingly, even in the case in which it is not possible to clearly determine whether or not the inter-cylinder air-fuel-ratio imbalance state has occurred using the tentative parameter, the imbalance determination can be performed accurately using the final parameter.

Third Embodiment

Next, there will be described a determination apparatus according to a third embodiment of the present invention (hereinafter simply referred to as the "third determination apparatus").

The third determination apparatus is different from the first determination apparatus only in that the third determination apparatus shortens a delay time Tdelayth as the intake air flow rate Ga becomes larger, the delay time Tdelayth being a time (period) from a point in time the amount of energy supplied to the heater 678 is increased in order to elevate the air-fuel ratio sensor element temperature (i.e., a point in time at which the apparatus starts having the heater control means perform the sensor element section temperature elevating control) to a point in time the base indicating amount (detected air-fuel ratio change rate ΔAF) which is the base data for the air-fuel ratio fluctuation indicating amount AFD (imbalance determination parameter) starts to be obtained.

(Actual Operation)

Figure 19:
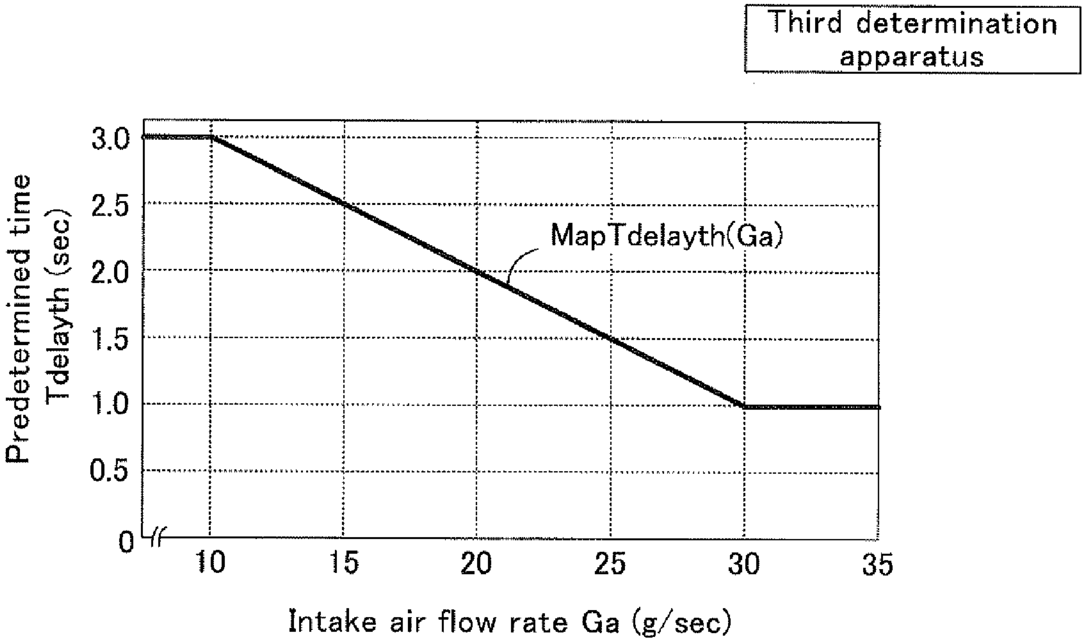
FIG. 19 is a flowchart showing a routine executed by a CPU of an inter-cylinder air-fuel ratio imbalance determination apparatus (third determination apparatus) according to a third embodiment of the present invention.

The CPU 71 of the third determination apparatus determines the delay time Tdelayth based on the intake air flow rate Ga when the CPU 71 proceeds to step 1415 shown in FIG. 14. More specifically, at step 1415, the CPU 71 determines the delay time Tdelayth by applying the intake air flow rate Ga at that point in time to a delay time table MapTdelayth(Ga) shown in FIG. 19.

According to the delay time table MapTdelayth(Ga), the delay time Tdelayth is determined in such a manner that the delay time Tdelayth becomes shorter as the intake air flow rate Ga becomes larger. This is because the air-fuel ratio sensor element temperature more rapidly becomes higher when the intake air flow rate Ga becomes larger, since the exhaust gas temperature is higher as the intake air flow rate Ga is larger.

In this manner, the third determination apparatus changes the delay time Tdelayth based on the intake air flow rate Ga, and thus, the delay time Tdelayth can be set to be as short as possible. As a result, chances to obtain the air-fuel ratio fluctuation indicating amount AFD (the imbalance determination parameter) can be increased.

It should be noted that, similarly to the third determination apparatus, "changing the delay time Tdelayth based on the intake air flow rate Ga" can be applied not only to the first embodiment but also to "the second embodiment and another embodiments described later." Further, the delay time Tdelayth may be determined based on "the engine load KL, the exhaust gas temperature (estimated or actually measured temperature), and the like" in place of the intake air flow rate Ga. That is, the delay time Tdelayth may be determined based on an operating parameter relating to (associated with) the exhaust gas temperature. For example, in a determination apparatus equipped with an exhaust gas temperature sensor, the delay time Tdelayth may be set so as to be shorter as the exhaust gas temperature measured by the exhaust gas temperature sensor is higher. Alternatively, the delay time Tdelayth may be set so as to be shorter as the load (KL) of the engine 10 is higher.

Fourth Embodiment

Next, there will be described a determination apparatus according to a fourth embodiment of the present invention (hereinafter simply referred to as the "fourth determination apparatus").

The fourth determination apparatus is different from the first determination apparatus only in that the fourth determination apparatus starts the sensor element section temperature elevating control immediately after the warming up of the engine 10 has completed after the start of the engine (i.e., at the completion of the warming-up), even when the parameter obtaining condition is not satisfied.

(Actual Operation)

The CPU 71 of the fourth determination apparatus executes the routines shown in FIGS. 12 and 13, similarly to the CPU 71 of the first determination apparatus. Further, the CPU 71 of the fourth determination apparatus executes routines shown by flowcharts of FIGS. 20 and 22 every time a predetermined time (the sampling time ts) elapses. The routines shown in FIGS. 12 and 13 have been already described. Accordingly, the routines shown in FIGS. 20 and 22 will be described hereinafter. It should be noted that each step in FIGS. 20 and 22 at which the same processing is performed as each step which has been already described is given the same numeral as one given to such step.

It is assumed that the present time is immediately after the engine 10 was started. Usually, warming up of the engine 10 has not completed at the point in time immediately after the engine 10 was started (that is, the state is not the completion of the warming-up).

Figure 20:
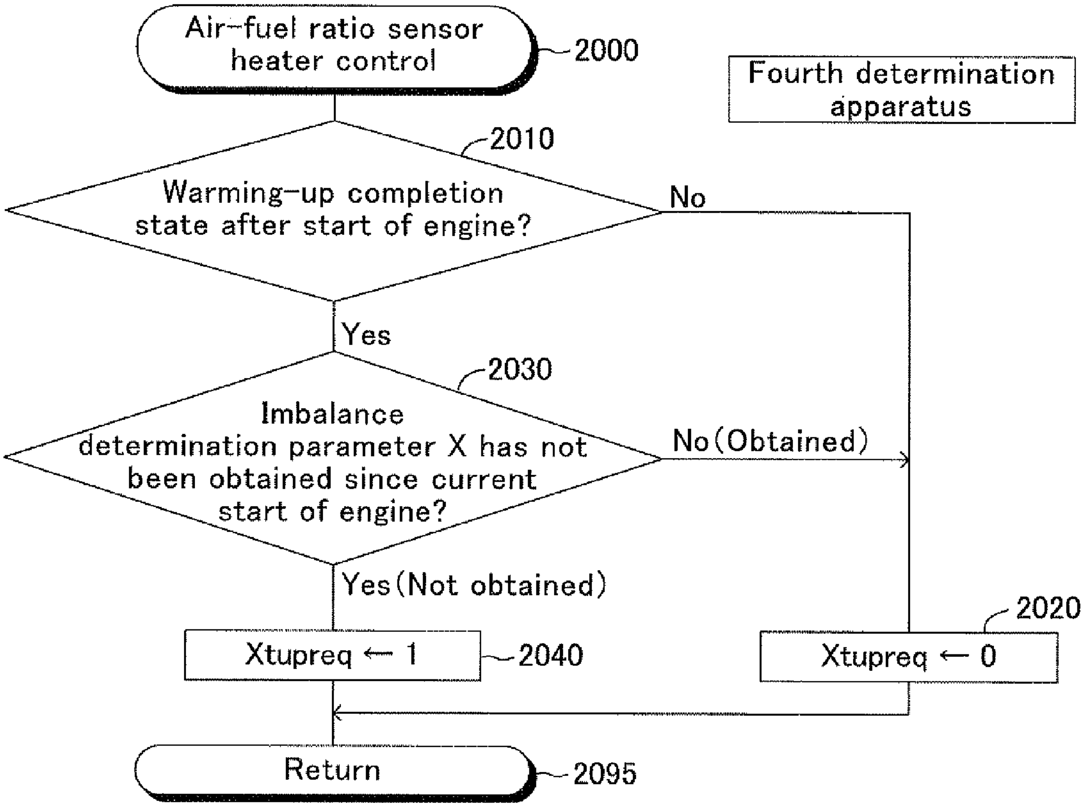
FIG. 20 is a flowchart showing a routine executed by a CPU of an inter-cylinder air-fuel ratio imbalance determination apparatus (fourth determination apparatus) according to a fourth embodiment of the present invention.

When the predetermined timing comes, the CPU 71 starts processing from step 2000 shown in FIG. 20 to proceed to step 2010, at which the CPU 71 determines whether or not the state of the engine 10 reaches the warming-up completion state after the current start of the engine. For example, the CPU 71 determines whether or not the state of the engine 10 reaches the warming-up completion state by determining whether or not the cooling water temperature THW is equal to or higher than a "threshold cooling water temperature THWth which is a cooling water temperature at the warming-up completion state." Further, the CPU 71 may determine whether or not the state of the engine 10 reaches the warming-up completion state by obtaining threshold air flow rate integrated value SGath which becomes smaller as the cooling water temperature THW at the start of the engine 10 becomes higher, obtaining integrated value SGa of the intake air flow rate Ga after the start of the engine 10, and determining whether or not the integrated value SGa becomes higher than the threshold air flow rate integrated value SGath, for instance.

According to the assumption described above, since the present point in time is immediately after the start of the engine, the state of the engine 10 has not reached the warming-up completion state. The CPU 71 therefore makes a "No" determination at step 2010 to proceed to step 2020, at which the CPU 71 sets the value of the sensor element temperature elevation request flag Xtupreq to (at) "0." Thereafter, the CPU 71 proceeds to step 2095 to end the present routine tentatively.

Figure 21:
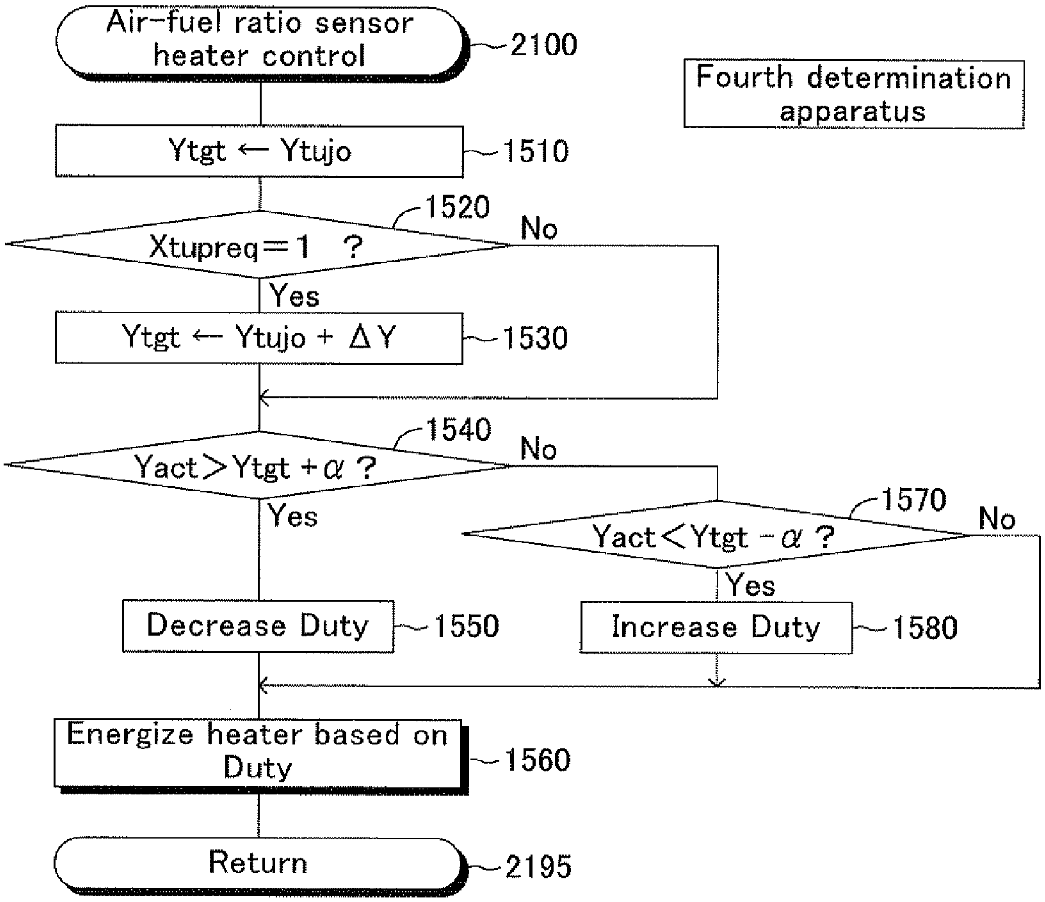
FIG. 21 is a flowchart showing another routine executed by the CPU of the fourth determination apparatus.

Further, the CPU 71 starts processing from step 2100 shown in FIG. 21 at a predetermined timing. The "air-fuel ratio sensor heater control routine" shown in FIG. 21 is the same as the "air-fuel ratio sensor heater control routine" shown in FIG. 15 executed by the CPU 71 of the first determination apparatus.

In addition, the value of the sensor element temperature elevation request flag Xtupreq is set to (at) "0" at the present point in time. Accordingly, the CPU 71 executes processes of step 1510 and step 1520, and thereafter proceeds to steps following step 1540 without executing the process of step 1530. Consequently, the heater 678 is energized in such a manner that the air-fuel ratio sensor element temperature coincides with the usual temperature (i.e., the actual admittance Yact coincides with the usual value Ytujo).

Figure 22:
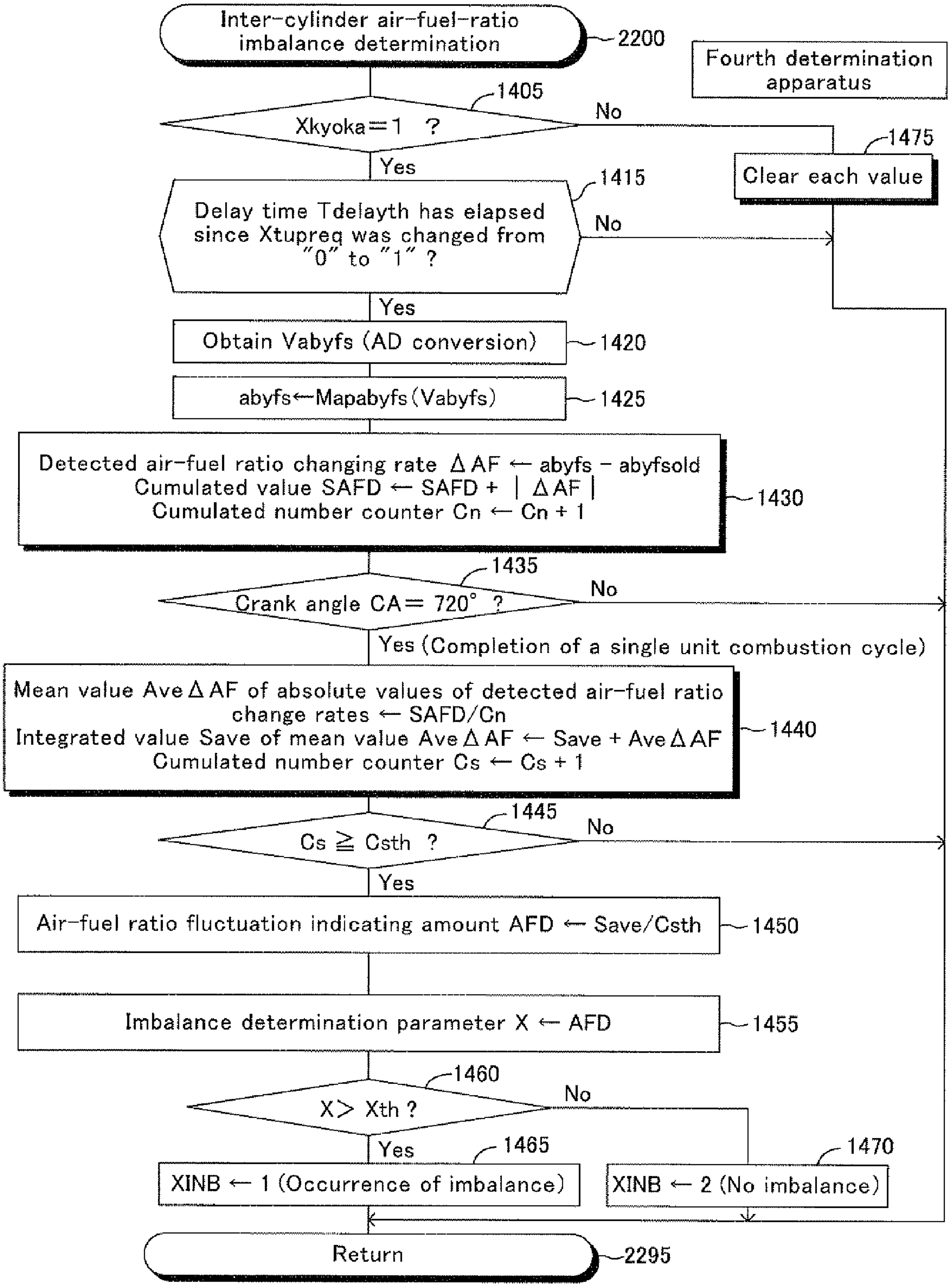
FIG. 22 is a flowchart showing another routine executed by the CPU of the fourth determination apparatus.

Further, the CPU 71 starts processing from step 2200 shown in FIG. 22 at a predetermined timing. The "inter-cylinder air-fuel-ratio imbalance determination routine" shown in FIG. 22 is the same as the "inter-cylinder air-fuel-ratio imbalance determination routine" shown in FIG. 14 executed by the CPU 71 of the first determination apparatus, except that "step 1410 and step 1480" are omitted/deleted from the routine shown in FIG. 14.

Accordingly, if the value of the parameter obtaining permission flag Xkyoka is not "1" (i.e., the parameter obtaining condition is not satisfied) when the CPU 71 executes the process of step 1405 shown in FIG. 22, the CPU 71 makes a "No" determination at step 1405 to proceed to step 1475, at which the CPU 71 clears each of the values. Thereafter, the CPU 71 proceeds to step 2295 to end the present routine tentatively.

In contrast, if the value of the parameter obtaining permission flag Xkyoka is "1" (i.e., the parameter obtaining condition is satisfied) when the CPU 71 executes the process of step 1405, the CPU 71 makes a "Yes" determination at step 1405 to proceed to step 1415. At step 1415, the CPU 71 determines whether or not a delay time Tdelayth has elapsed since a point in time at which the value of the sensor element temperature elevation request flag Xtupreq was changed from "0" to "1."

At the present point in time, the value of the sensor element temperature elevation request flag Xtupreq is set to (at) "0" (refer to step 2020 shown in FIG. 20 described above). The CPU 71 therefore makes a "No" determination at step 1415 shown in FIG. 22 to directly proceed to step 2295 so as to end the present routine tentatively.

Thereafter, the state of the engine 10 reaches the warming-up completion state when a predetermined time elapses. At this moment, when the CPU 71 executes the process of step 2020 shown in FIG. 20, the CPU 71 makes a "Yes" determination at step 2010 to proceed to step 2030, at which the CPU 71 determines whether or not "obtainment of the imbalance determination parameter X has not been completed (the imbalance determination parameter has not been obtained) since the current start of the engine 10".

The present point in time is immediately after a point in time at which the engine 10 reached the warming-up completion state after the start of the engine 10. Accordingly, the imbalance determination parameter X has not been obtained yet, and the CPU 71 therefore makes a "Yes" determination at step 2030 to proceed to step 2040, at which the CPU 71 sets the value of the sensor element temperature elevation request flag Xtupreq to "1." Thereafter, the CPU 71 proceeds to step 2095 to end the present routine tentatively.

In this state, since the value of the sensor element temperature elevation request flag Xtupreq is set to (at) "1", when the CPU 71 starts processing the routine shown in FIG. 21 from step 2100, the CPU 71 proceeds to step 2100, step 1510, step 1520, and then, step 1530, at which the CPU 71 sets the target admittance Ytgt to (at) the "value (elevated value) obtained by adding the predetermined positive value ΔY to the usual value Ytujo." Subsequently, the CPU 71 proceeds to steps following step 1540. Consequently, the heater 678 is energized in such a manner that the air-fuel ratio sensor element temperature coincides with the elevated temperature (the actual admittance Yact coincides with the value obtained by adding the predetermined positive value ΔY to the usual value Ytujo).

Under this state, if the value of the parameter obtaining permission flag Xkyoka is set to (at) "1" owing to the satisfaction of the parameter obtaining condition, the CPU 71 makes a "Yes" determination at step 1405 shown in FIG. 22 when the CPU 71 proceeds to step 1405, and then proceeds to step 1415.

At this moment, if the delay time Tdelayth has not elapsed since the point in time at which the value of the sensor element temperature elevation request flag Xtupreq was changed from "0" to "1", the CPU 71 makes a "No" determination at step 1415 to directly proceed to step 2295 to end the present routine tentatively.

In contrast, at a point in time at which the CPU 71 executes the process of step 1415, if the delay time Tdelayth has elapsed since the point in time at which the value of the sensor element temperature elevation request flag Xtupreq was changed from "0" to "1", the CPU 71 proceeds from step 1415 to step 1420.

As a result, the air-fuel ratio fluctuation indicating amount AFD and the imbalance determination parameter X are obtained while the air-fuel ratio sensor element temperature is at the elevated temperature. Further, the processes following step 1460 shown in FIG. 22, the imbalance determination is made based on the comparison result between the imbalance determination parameter X and the imbalance determination threshold Xth.

Further, when the CPU 71 executes the process of step 2030 shown in FIG. 20 after the completion of the obtainment of the imbalance determination parameter X owing to the processes of step 1450 and step 1455 shown in FIG. 22, the CPU 71 makes a "No" determination at step 2030 so as to proceed to step 2020. That is, the sensor element temperature elevation request flag Xtupreq is set/returned to "0" immediately after the imbalance determination parameter X is obtained and the imbalance determination is completed. As a result, the air-fuel ratio sensor element temperature is decreased to the usual temperature immediately after the completion of the obtainment of the imbalance determination parameter X.

As described above, the fourth determination apparatus comprises imbalance determining means which is configured so as to have/make the heater control means start to perform the sensor element section temperature elevating control at the point in time at which the warming-up of the engine 10 is completed after the start of the engine 10 (step 2010, step 2040, and step 2040, shown in FIG. 20), and so as to have/make the heater control means finish/end the sensor element section temperature elevating control at the point in time at which obtaining the imbalance determination parameter X is completed (step 2030 and step 2020, shown in FIG. 20).

It requires some time for the air-fuel ratio sensor element temperature to actually increase/becomes higher after the start of the execution of the sensor element section temperature elevating control. Accordingly, if the sensor element section temperature elevating control is started after the parameter obtaining condition becomes satisfied, obtaining the base indicating amount (detected air-fuel ratio change rate ΔAF) which is the base data for the imbalance determination parameter X can not be started until the air-fuel ratio sensor element temperature becomes sufficiently high. Alternatively, if the base indicating amount (detected air-fuel ratio change rate ΔAF) is started to be obtained at the same time of the start of performing the sensor element section temperature elevating control after the satisfaction of the parameter obtaining condition, the base indicating amount (and accordingly, the air-fuel ratio fluctuation indicating amount AFD and the imbalance determination parameter X) can not become a value which sufficiently accurately represents the cylinder-by-cylinder air-fuel ratio difference, because the responsiveness of the air-fuel ratio sensor 67 is not sufficiently high.

Moreover, for example, according to the first determination apparatus, if the parameter obtaining condition becomes unsatisfied in a period from the start of the execution of the sensor element section temperature elevating control to a point in time at which the air-fuel ratio sensor element temperature becomes sufficiently high, the sensor element section temperature elevating control is stopped. Consequently, chances/frequency to obtain the imbalance determination parameter may decrease.

On the other hand, in a case in which the engine 10 has not been warmed up yet after the start of the engine 10, moisture in the exhaust gas is easily cooled down by members constituting the engine 10, the outer protective cover 67*b*, or the like, to thereby be likely to form water droplets. In a case in which the water droplets adhere to the air-fuel ratio sensor 67 (hereinafter, this is expressed as "the air-fuel ratio sensor gets wet with water"), if the temperature of the "air-fuel ratio detecting section including the sensor element section" is elevated by the sensor element section temperature elevating control, a great temperature unevenness in the air-fuel ratio detecting section of the air-fuel ratio sensor 67 occurs, and thus, the air-fuel ratio detecting section may crack/dunt (be broken). Accordingly, it is not preferable to perform the sensor element section temperature elevating control immediately after the start of the engine.

In view of the above, the imbalance determining means of the fourth determination apparatus starts the sensor element section temperature elevating control at the point in time at which the warming up of the engine 10 has been completed. Accordingly, the air-fuel ratio sensor element temperature is elevated in a state in which it is unlikely that the air-fuel ratio sensor gets wet with water. Therefore, the fourth determination apparatus can increase chances in which the air-fuel ratio sensor element temperature is sufficiently high when the parameter obtaining condition becomes satisfied while avoiding the state in which the air-fuel ratio sensor 67 is broken due to getting wet with water. Consequently, the fourth determination apparatus can increase chances to obtain the imbalance determination parameter X which has a high accuracy and increase chances to perform the imbalance determination using such an imbalance determination parameter.

Fifth Embodiment

Next, there will be described a determination apparatus according to a fifth embodiment of the present invention (hereinafter simply referred to as the "fifth determination apparatus").

Figure 23:
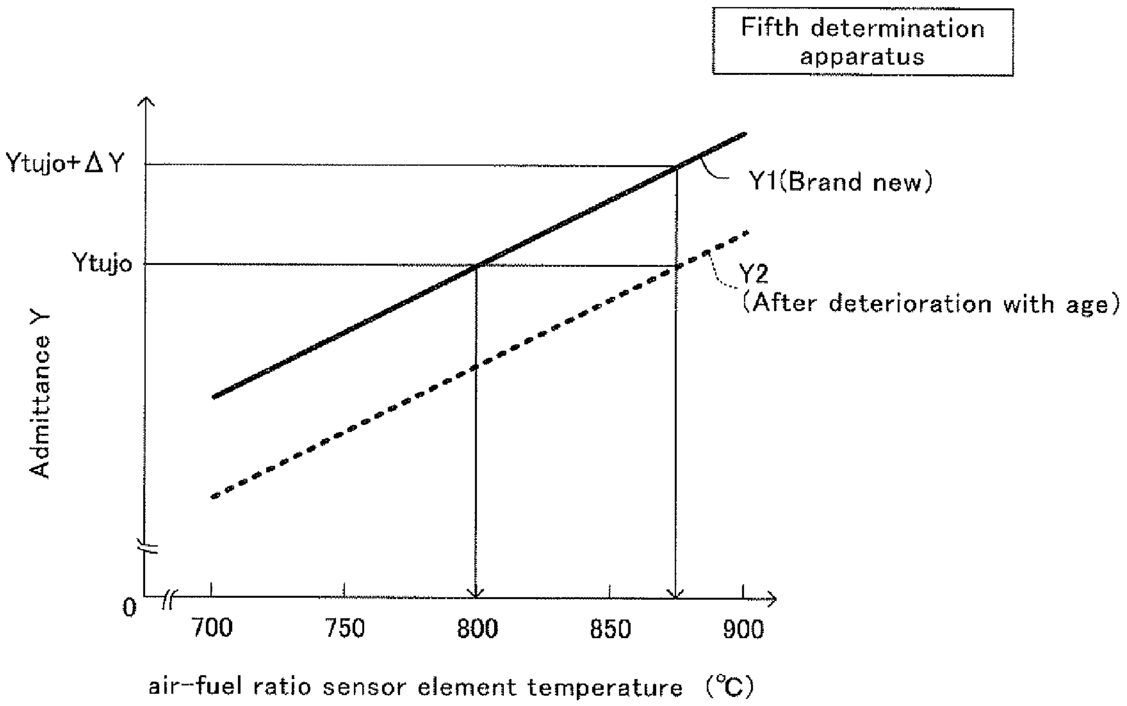
FIG. 23 is a graph showing the relation between the air-fuel ratio sensor element temperature and the admittance of the solid electrolyte layer.

FIG. 23 is a graph showing a relation between the air-fuel ratio sensor element temperature and the admittance Y of the solid electrolyte layer 671. In FIG. 23, a solid line Y1 indicates the admittance Y when the air-fuel ratio sensor 67 has not deteriorated with age (for example, when the air-fuel ratio sensor 67 is brand new), and a broken line Y2 indicates the admittance Y when the air-fuel ratio sensor 67 has deteriorated with age (for example, when the air-fuel ratio sensor 67 has been used for a relatively long time).

As understood from FIG. 23, when the admittance Y is a "certain specific value", the element temperature of the air-fuel ratio sensor 67 which has deteriorated with age is higher than the element temperature of the air-fuel ratio sensor 67 which has not deteriorated with age. Meanwhile, the electric controller 70 control the amount of energy supplied to the heater 678 in such a manner that the actual admittance Yact of the air-fuel ratio sensor 67 coincides with the target admittance Ytgt.

From the above fact, it is understood that the element temperature of the air-fuel ratio sensor 67 which has deteriorated with age is sufficiently high even when the target admittance Ytgt is maintained at the usual value Ytujo. That is, in the example shown in FIG. 23, the air-fuel ratio sensor element temperature is about 800° C. when the actual admittance Yact of the air-fuel ratio sensor 67 which has not deteriorated with age is made equal to the usual value Ytujo, and the air-fuel ratio sensor element temperature is about 870° C. when the actual admittance Yact of the air-fuel ratio sensor 67 which has not deteriorated with age is made equal to the elevated value (Ytujo+ΔY). In contrast, the air-fuel ratio sensor element temperature is about 870° C. when the actual admittance Yact of the air-fuel ratio sensor 67 which has deteriorated with age is made equal to the usual value Ytujo.

In other words, the element temperature of the air-fuel ratio sensor 67 which has deteriorated with age while the target admittance Ytgt is set to (at) the usual value Ytujo is roughly equal to the element temperature of the air-fuel ratio sensor 67 which has not deteriorated with age while the target admittance Ytgt is set to (at) the elevated value (Ytujo+ΔY). Accordingly, it can be said that the responsiveness of the air-fuel ratio sensor 67 which has deteriorated with age is sufficiently high even if the target admittance Ytgt is set to (at) the usual value Ytujo.

In view of the above, if the air-fuel ratio sensor 67 has not deteriorated with age, the fifth determination apparatus performs the sensor element section temperature elevating control when obtaining the air-fuel ratio fluctuation indicating amount AFD and the imbalance determination parameter X, similarly to the first determination apparatus. On the other hand, if the air-fuel ratio sensor 67 has deteriorated with age, the fifth determination apparatus does not perform the sensor element section temperature elevating control when obtaining the air-fuel ratio fluctuation indicating amount AFD and the imbalance determination parameter X.

(Actual Operation)

The CPU 71 of the fifth determination apparatus executes the routines shown in FIGS. 12, 13, and 15, similarly to the CPU 71 of the first determination apparatus. Further, the CPU 71 of the fifth determination apparatus executes routines shown by flowcharts of FIGS. 24 and 25 every time a predetermined time (the sampling time ts) elapses. The routines shown in FIGS. 12, 13, and 15 have been already described. Accordingly, the operation of the CPU 71 will be described hereinafter with reference to the routines shown in FIGS. 24 and 25. It should be noted that each step in FIGS. 24 and 25 at which the same processing is performed as each step which has been already described is given the same numeral as one given to such step.

Figure 24:
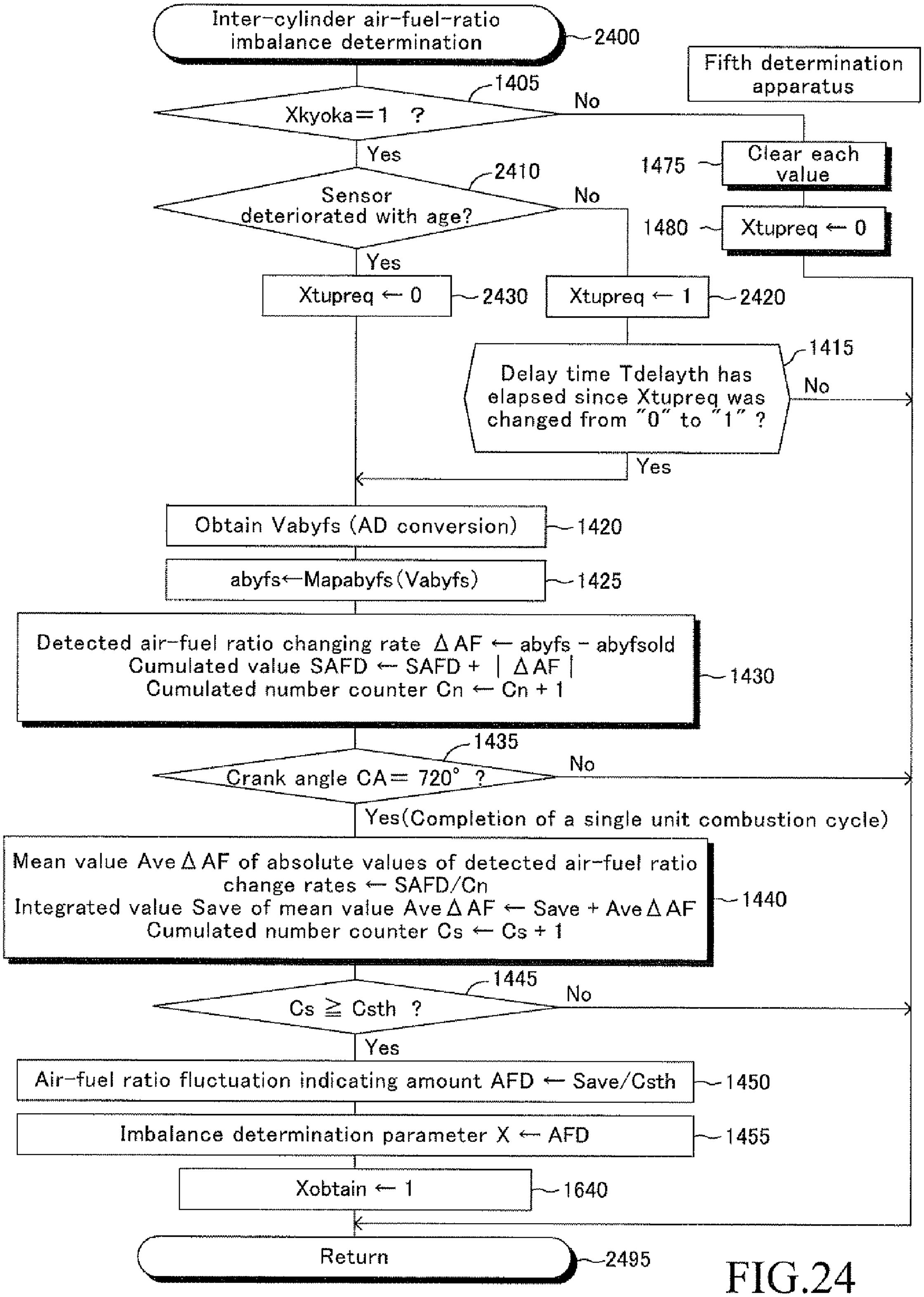
FIG. 24 is a flowchart showing a routine executed by a CPU of an inter-cylinder air-fuel ratio imbalance determination apparatus (fifth determination apparatus) according to a fifth embodiment of the present invention.

When the CPU 71 starts processing from step 2400 shown in FIG. 24 to proceed to step 1405, the CPU 71 makes a "No" determination at step 1405 if the value of the parameter obtaining permission flag Xkyoka is "0", so that the CPU 71 executes the processes of step 1475 and step 1480, and directly proceeds to step 2495 to end the present routine tentatively.

In contrast, if the value of the parameter obtaining permission flag Xkyoka is "1" when the CPU 71 executes the process of step 1405, the CPU 71 makes a "Yes" determination at step 1405.

Thereafter, at step 2410, the CPU 71 determines whether or not the air-fuel ratio sensor 67 has deteriorated with age (i.e., it has deteriorated as compared to a brand new sensor) using any one of the following ways. That is, it is determined whether or not the air-fuel ratio sensor 67 is an aged sensor.

(Method 1 for Determination of Deterioration with Age)

The CPU 71 obtains a "duty integrated value SD" which is a value obtained by integrating/accumulating a value of the heater duty Duty which is the instruction signal supplied to the heater 678." The integrated value SD is stored in the backup RAM 74. That is, the integrated value SD is an integrated value of the heater duty Duty for a period from a point in time when the air-fuel ratio sensor 67 was a brand new one to a present point in time. Thereafter, the CPU 71 determines that the air-fuel ratio sensor has deteriorated with age, when the integrated value SD becomes equal to or larger than a predetermined deterioration determination threshold SDth.

(Method 2 for Determination of Deterioration with Age)

The CPU 71 obtains a time integration value SIh of an actual current value (heater current) Ih flowing through the heater 678. The time integration value SIh is stored in the backup RAM 74. That is, the time integration value SIh is an integrated/accumulated value of the heater current Ih for a period from a point in time when the air-fuel ratio sensor was brand new and the present point in time. Thereafter, the CPU 71 determines that the air-fuel ratio sensor 67 has deteriorated with age when the time integration value SIh is equal to or larger than a predetermined deterioration determination threshold SIhth.

(Method 3 for Determination of Deterioration with Age)

The CPU 71 obtains a time integration value SGa of the intake air flow rate Ga. The time integration value SGa is stored in the backup RAM 74. That is, the time integration value SGa is an integrated/accumulated value of the intake air flow rate Ga for a period from a point in time when the air-fuel ratio sensor was brand new and the present point in time. Thereafter, the CPU 71 determines that the air-fuel ratio sensor 67 has deteriorated with age when the time integration value SGa is equal to or larger than a predetermined deterioration determination threshold SrGath.

(Method 4 for Determination of Deterioration with Age)

The CPU 71 obtains an integrated/accumulated running distance SS of the vehicle on which the engine 10 is mounted. The integrated running distance SS is stored in the backup RAM 74. That is, the integrated running distance SS is a "total running distance of the vehicle" for a period from a point in time when the air-fuel ratio sensor was brand new and the present point in time. Thereafter, the CPU 71 determines that the air-fuel ratio sensor 67 has deteriorated with age when the integrated running distance SS is equal to or larger than a predetermined deterioration determination threshold SSth.

It is assumed here that the air-fuel ratio sensor 67 is substantially new, and therefore, has not deteriorated. In this case, the CPU 71 makes a "No" determination at step 2410 to proceed to step 2420, at which the CPU 71 sets the value of the sensor element temperature elevation request flag Xtupreq to (at) "1." Consequently, by the execution of the routine shown in FIG. 15, the sensor element section temperature elevating control is performed.

Subsequently, the CPU 71 proceeds to step 1415 to determine whether or not the delay time Tdelay has elapsed since the value of the sensor element temperature elevation request flag Xtupreq was changed from "0" to "1." When the delay time Tdelay has not elapsed since the value of the sensor element temperature elevation request flag Xtupreq was changed from "0" to "1", the CPU 71 makes a "No" determination at step 1415 to directly proceed to step 2495, at which the CPU 71 ends the present routine tentatively.

On the other hand, if the delay time Tdelay has elapsed since the value of the sensor element temperature elevation request flag Xtupreq was changed from "0" to "1" when the CPU 71 executes the process of step 1415 shown in FIG. 24, the CPU 71 proceeds from step 1415 to steps following step 1420. Consequently, the air-fuel ratio fluctuation indicating amount AFD is obtained at step 1450, and the imbalance determination parameter X is obtained at step 1455. Further, the value of the parameter obtainment completion flag Xobtain is set to (at) "1" at step 1640.

Figure 25:
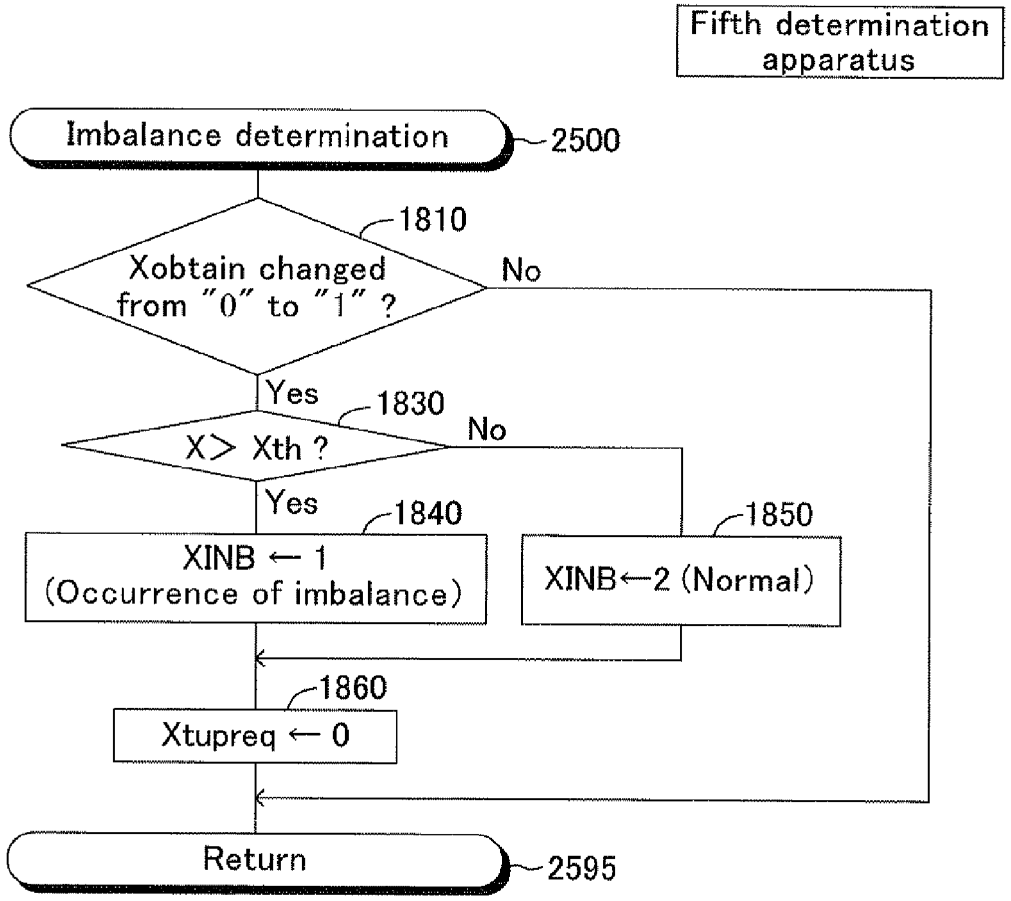
FIG. 25 is a flowchart showing another routine executed by the CPU of the fifth determination apparatus.

Meanwhile, the CPU 71 starts processing the routine from step 2500 shown in FIG. 25 every time a predetermined time elapses, and always determines whether or not the value of the parameter obtainment completion flag Xobtain is changed from "0" to "1."

Accordingly, when the value of the parameter obtainment completion flag Xobtain is changed from "0" to "1" at step 1640 shown in FIG. 24, the CPU 71 makes a "Yes" determination at step 1810 shown in FIG. 25 to proceed to steps following step 1830, so that the CPU 71 determines whether or not the inter-cylinder air-fuel-ratio imbalance state has occurred based on the comparison result between the imbalance determination parameter X and the imbalance determination threshold Xth. That is, the CPU 71 determines that the inter-cylinder air-fuel-ratio imbalance state has been occurring, when the imbalance determination parameter X is larger than the imbalance determination threshold Xth (step 1830 and step 1840). Further, the CPU 71 determines that the inter-cylinder air-fuel-ratio imbalance state has not occurred, when the imbalance determination parameter X is smaller than or equal to the imbalance determination threshold Xth (step 1830 and step 1850).

Thereafter, the CPU 71 sets the value of the sensor element temperature elevation request flag Xtupreq to (at) "0" at step 1860, and proceeds to step 2995 to end the present routine tentatively. This stops the sensor element section temperature elevating control.

As described above, when the air-fuel ratio sensor 67 has not deteriorated with age, the imbalance determination parameter X is obtained under the state in which the sensor element section temperature elevating control is being performed, and the inter-cylinder air-fuel-ratio imbalance determination is carried out using the imbalance determination parameter X.

Next, there will be described the case in which the air-fuel ratio sensor 67 has deteriorated with age. In this case, the CPU 71 makes a "Yes" determination at step 2410 shown in FIG. 24 when the CPU 71 proceeds to step 2410. Thereafter, the CPU 71 proceeds to step 2430 to set the value of the sensor element temperature elevation request flag Xtupreq to (at) "0." It should be noted that, in actuality, since the value of the sensor element temperature elevation request flag Xtupreq is set to (at) "0" in the initial routine described above, the CPU 71 does not change the value of the sensor element temperature elevation request flag Xtupreq at step 2430. Consequently, the sensor element section temperature elevating control is not carried out.

Thereafter, the CPU 71 proceeds to steps following step 1420. Consequently, the air-fuel ratio fluctuation indicating amount AFD is obtained at step 1450, and the imbalance determination parameter X is obtained at step 1455. Further, the value of the parameter obtainment completion flag Xobtain is set to (at) "1" at step 1640.

When the value of the parameter obtainment completion flag Xobtain is step to (at) "1" at step 1640 shown in FIG. 24, the CPU 71 makes a "Yes" determination at step 1810 shown in FIG. 25 to proceed to steps following step 1830, so that the CPU 71 performs the above described imbalance determination based on the comparison result between the imbalance determination parameter X and the imbalance determination threshold Xth. Thereafter, the CPU 71 proceeds to step 2595 via step 1860 to end the present routine tentatively.

As described above, according to the fifth determination apparatus, when the air-fuel ratio sensor 67 has deteriorated with age, the imbalance determination parameter X is obtained without performing the sensor element section temperature elevating control, and the inter-cylinder air-fuel-ratio imbalance determination is carried out using the imbalance determination parameter X.

That is, similarly to the heater control means of the first to fourth determination apparatus, the heater control means of the fifth determination apparatus controls amount of heat generation of the heater in such a manner that the difference between the value corresponding to the actual admittance Yact (e.g. the actual admittance) of the solid electrolyte layer 671 and the target value (the target admittance Ytgt) becomes smaller (refer to the routine shown in FIG. 15). Further, the heater control means is configured so as to realize the sensor element section temperature elevating control by making the target value (the target admittance Ytgt) during the sensor element section temperature elevating control is being performed different from (larger than) the target value during the sensor element section temperature elevating control is not being performed (steps from step 1510 to step 1530, shown in FIG. 15).

Further, the imbalance determining means of the fifth determination apparatus is configured so as to:

include deterioration-with-age-occurrence determining means for determining whether or not the air-fuel ratio has deteriorated with age (step 2410 shown in FIG. 24); and obtain, when it is determined that the air-fuel ratio has deteriorated with age, the imbalance determination parameter X without performing the sensor element section temperature elevating control even if the sensor element section temperature elevating control should be performed (that is, even if the value of the parameter obtaining permission flag Xkyoka is "1") (step 2410, step 2430, steps from step 1420 to step 1455, shown in FIG. 24).

Accordingly, since the fifth determination apparatus does not elevate the air-fuel ratio sensor element temperature more than necessary, it can perform accurate inter-cylinder air-fuel-ratio imbalance determination while avoiding the early deterioration of the air-fuel ratio sensor.

It should be noted that the heater control means of the fifth determination apparatus (and the other apparatuses) may adopt/employ an impedance Zact of the solid electrolyte layer 671 as the value corresponding to the actual admittance Yact of the solid electrolyte layer 671, and control the amount of heat generation of the heater in such a manner that a difference between the actual impedance Zact and a target value (target impedance Ztgt) becomes smaller. In this case, the heater control means may be configured so as to realize the sensor element section temperature elevating control by making the target value (the target impedance Ytgt) during the sensor element section temperature elevating control is being performed different from (smaller than) the target value during the sensor element section temperature elevating control is not being performed.

Sixth Embodiment

Next, there will be described a determination apparatus according to a sixth embodiment of the present invention (hereinafter simply referred to as the "sixth determination apparatus").

The sixth determination apparatus obtains, as a usual temperature air-fuel ratio fluctuation indicating amount Ztujo, the air-fuel ratio fluctuation indicating amount AFD while maintaining the air-fuel ratio sensor element temperature at the usual temperature (the first temperature); obtains, as an elevated temperature air-fuel ratio fluctuation indicating amount Ztup, the air-fuel ratio fluctuation indicating amount AFD while maintaining the air-fuel ratio sensor element temperature at the elevated temperature (the second temperature); and performs the imbalance determination based on a comparison result between a value corresponding those values (e.g., a difference=Ztup Ztujo) and an imbalance determination threshold. Other than that, the sixth determination apparatus is the same as the first determination apparatus.

(Actual Operation)

The CPU 71 of the sixth determination apparatus executes the routines shown in FIGS. 12, 13, and 15, similarly to the CPU 71 of the first determination apparatus. Further, the CPU 71 of the sixth determination apparatus executes routines shown by flowcharts of "FIGS. 26 and 27" in place of FIG. 14 every time a predetermined time (the sampling time ts) elapses. The routines shown in FIGS. 12, 13, and 15 have been already described. Accordingly, the routines shown in FIGS. 26 and 27 will be described hereinafter. It should be noted that each step in FIGS. 26 and 27 at which the same processing is performed as each step which has been already described is given the same numeral as one given to such step.

It is assumed here that the value of the parameter obtaining permission flag Xkyoka is set to (at) "1" owing to a first satisfaction of the parameter obtaining condition after the current start of the engine 10. In this case, the CPU 71 makes a "Yes" determination at step 1405 shown in FIG. 26 to proceed to step 2610, at which the CPU 71 determines whether or not a value of a tentative flag Xkari is "0." The value of the tentative flag Xkari is set to (at) "0" in the initial routine described above.

Accordingly, the CPU 71 makes a "Yes" determination at step 2610 to proceed to step 2620, at which the CPU 71 sets the value of the sensor element temperature elevation request flag Xtupreq to (at) "0." As a result, the air-fuel ratio sensor element temperature is maintained at the usual temperature.

It should be noted that the value of the sensor element temperature elevation request flag Xtupreq is set to (at) "0" in the initial routine described above. Accordingly, the process of step 2620 at this stage does not change the value of the sensor element temperature elevation request flag Xtupreq substantially.

Thereafter, the CPU 71 obtains the air-fuel ratio fluctuation indicating amount AFD by the processes of steps from step 1420 to step 1450. That is, the air-fuel ratio fluctuation indicating amount AFD is obtained in the case in which the air-fuel ratio sensor element temperature is not elevated (the air-fuel ratio sensor element temperature is maintained at the usual temperature).

After the air-fuel ratio fluctuation indicating amount AFD is obtained at step 1450, the CPU 71 proceeds to step 2630 to determine whether or not the value of the tentative flag Xkari is "0." At the present point in time, the value of the tentative flag Xkari is "0." Accordingly, the CPU 71 makes a "Yes" determination at step 2630 to proceed to step 2640, at which the CPU 71 sets the value of the tentative flag Xkari to (at) "1."

Subsequently, the CPU 71 proceeds to step 2650 to store the air-fuel ratio fluctuation indicating amount AFD obtained at step 1450 as the usual temperature air-fuel ratio fluctuation indicating amount Ztujo (refer to FIG. 11). Thereafter, the CPU 71 proceeds to step 2695 to end the present routine tentatively.

Figure 27:
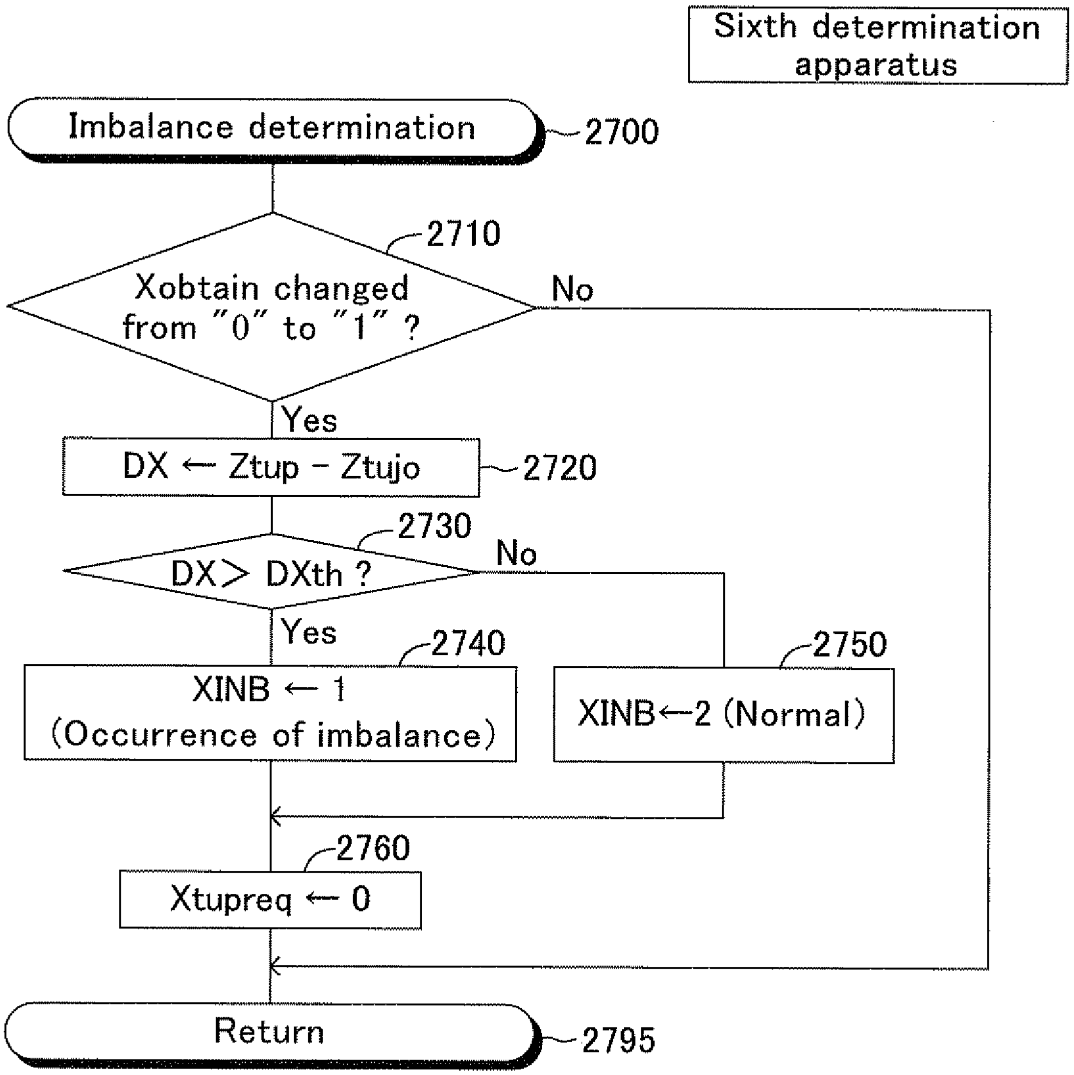
FIG. 27 is a flowchart showing another routine executed by the CPU of the sixth determination apparatus.

On the other hand, the CPU 71 starts processing from step 2700 shown in FIG. 27 at a predetermined timing, and determines at step 2710 whether or not the present point in time is immediately after the value of the parameter obtainment completion flag Xobtain was changed from "0" to "1." The value of the parameter obtainment completion flag Xobtain is set to (at) "0" in the initial routine described above. Further, at this point in time, the value of the parameter obtainment completion flag Xobtain was not changed to "1." Accordingly, the CPU 71 makes a "No" determination at step 2710 to directly proceed to step 2795 so as to end the present routine tentatively.

Figure 26:
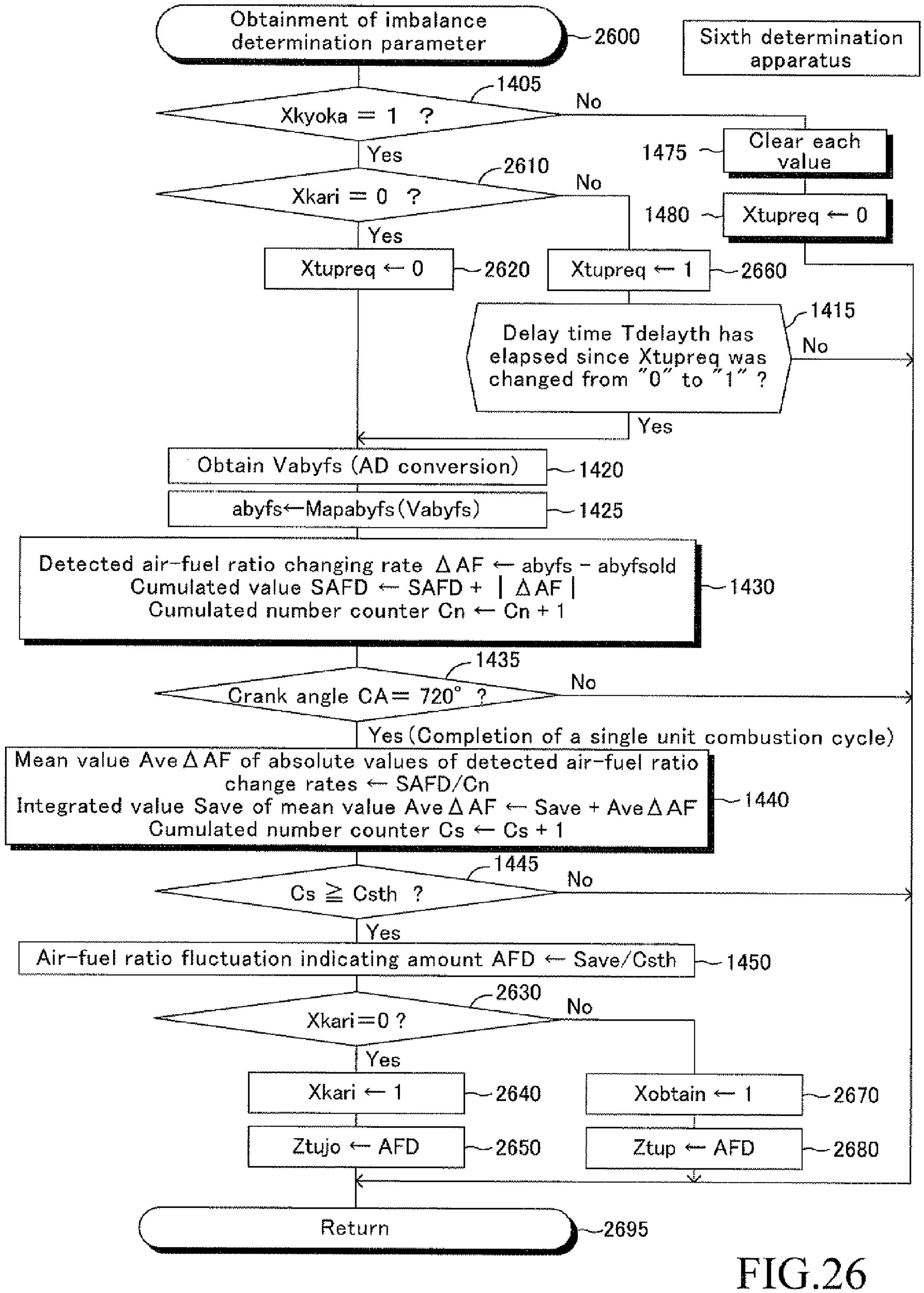
FIG. 26 is a flowchart showing a routine executed by a CPU of an inter-cylinder air-fuel ratio imbalance determination apparatus (sixth determination apparatus) according to a sixth embodiment of the present invention.

Under this state, if the value of the parameter obtaining permission flag Xkyoka is equal to "1", the CPU 71 makes a "Yes" determination at step 1405 shown in FIG. 26 when the CPU 71 proceeds to step 1405 to proceed to step 2610.

At this point in time, the value of the tentative flag Xkari is set to (at) "1.", Accordingly, the CPU 71 makes a "No" determination at step 2610 to proceed to step 2660, at which the CPU 71 sets the value of the sensor element temperature elevation request flag Xtupreq to (at) "1."Consequently, the air-fuel ratio sensor element temperature is elevated to the elevated temperature by the execution of the routine shown in FIG. 15.

Subsequently, the CPU 71 proceeds to step 1415 to determine whether or not the delay time Tdelayth has elapsed since a point in time at which the value of the sensor element temperature elevation request flag Xtupreq was changed from "0" to "1." When the delay time Tdelayth has not elapsed since the point in time at which the value of the sensor element temperature elevation request flag Xtupreq was changed from "0" to "1", the CPU 71 makes a "No" determination at step 1415 to directly proceed to step 2695 so as to end the present routine tentatively.

On the other hand, if the delay time Tdelayth has elapsed since the point in time at which the value of the sensor element temperature elevation request flag Xtupreq was changed from "0" to "1" when the CPU 71 executes the process of step 1415 shown in FIG. 26, the CPU 71 proceeds from step 1415 to steps following step 1420. Consequently, the air-fuel ratio fluctuation indicating amount AFD is obtained at step 1450.

At this point in time, the value of the tentative flag Xkari is set to (at) "1." Accordingly, when the CPU 71 proceeds to step 2630 following step 1450, the CPU 71 makes a "No" determination at step 2630 to proceed to step 2670, at which the CPU 71 sets the value of the parameter obtainment completion flag Xobtain to (at) "1."

Subsequently, the CPU 71 proceeds to step 2680 to store/memorize the air-fuel ratio fluctuation indicating amount AFD obtained at step 1450, as the "elevated temperature air-fuel ratio fluctuation indicating amount Ztup" (refer to FIG. 11). Thereafter, the CPU 71 proceeds to step 2695 to end the present routine tentatively.

When the CPU 71 proceeds to step 2710 shown in FIG. 27 immediately after this point in time, the CPU 71 makes a "Yes" determination at step 2710 to proceed to step 2720, since the present point in time is immediately after the value of the parameter obtainment completion flag Xobtain was changed from "0" to "1."

The CPU 71 obtain, as the imbalance determination parameter DX, a "value obtained by subtracting the usual temperature air-fuel ratio fluctuation indicating amount Ztujo from the elevated temperature air-fuel ratio fluctuation indicating amount Ztup" at step 2720. The imbalance determination parameter DX is a value which becomes larger as a degree of difference between the elevated temperature air-fuel ratio fluctuation indicating amount Ztup and the usual temperature air-fuel ratio fluctuation indicating amount Ztujo becomes larger. The imbalance determination parameter DX may be a ratio of the elevated temperature air-fuel ratio fluctuation indicating amount Ztup to the usual temperature air-fuel ratio fluctuation indicating amount Ztujo. Subsequently, the CPU 71 proceeds to step 2730 to determine whether or not the imbalance determination parameter DX is larger than a predetermined imbalance determination threshold DXth.

When the imbalance determination parameter DX is larger than the imbalance determination threshold DXth, the CPU 71 makes a "Yes" determination at step 2730 to proceed to step 2740, at which the CPU 71 sets the value of the imbalance occurrence flag XINB to "1." That is, the CPU 71 determines that the inter-cylinder air-fuel-ratio imbalance state has been occurring. Thereafter, the CPU 71 proceeds to step 2795 to end the present routine tentatively.

In contrast, if the imbalance determination parameter DX is smaller than or equal to the imbalance determination threshold DXth when the CPU 71 executes the process of step 2730, the CPU 71 makes a "No" determination at step 2730 to proceed to step 2750, at which the CPU 71 sets the value of the imbalance occurrence flag XINB to "2." That is, the CPU 71 memorizes the "fact that it has been determined that the inter-cylinder air-fuel ratio imbalance state has not occurred according to the result of the inter-cylinder air-fuel ratio imbalance determination." Thereafter, the CPU 71 proceeds to step 2760 to set the value of the sensor element temperature elevation request flag Xtupreq to "0", and proceeds to step 2795 to end the present routine tentatively. This stops the sensor element section temperature elevating control. It should be noted that step 2750 may be omitted.

As described above, the imbalance determining means of the sixth determination apparatus is configured so as to:

control the temperature of the sensor element section to the first temperature using the heater 678 during the parameter-obtaining-period in which the predetermined parameter obtaining condition is satisfied (parameter obtaining permission flag Xkyoka=1) (refer to step 1405, step 2610, and step 2620, shown in FIG. 26, step 1510 shown in FIG. 15, and the "No" determination at step 1520 shown in FIG. 15), and obtain, as the usual temperature air-fuel ratio fluctuation indicating amount Ztujo, the value corresponding to the air-fuel ratio fluctuation indicating amount AFD which becomes larger as the fluctuation of the air-fuel ratio of said exhaust gas passing/flowing through the position at which the air-fuel ratio sensor 67 is disposed becomes larger (steps from step 1420 to step 1450, step 2630, and step 2650, shown in FIG. 26);

control the temperature of the sensor element section to the "second temperature higher than the first temperature" using the heater 678 during the parameter-obtaining-period (parameter obtaining permission flag Xkyoka=1) (step 1405, step 2610, and step 2660 shown in FIG. 26, step 1510, step 1520, and step 1530, shown in FIG. 15), and obtain, as the elevated temperature air-fuel ratio fluctuation indicating amount Ztup, the value corresponding to an air-fuel ratio fluctuation indicating amount AFD which becomes larger as the fluctuation of the air-fuel ratio of said exhaust gas passing/flowing through the position at which the air-fuel ratio sensor 67 is disposed becomes larger (steps from step 1420 to step 1450, step 2630, and step 2680, shown in FIG. 26);

further obtain, based on the elevated temperature air-fuel ratio fluctuation indicating amount Ztup and the usual temperature air-fuel ratio fluctuation indicating amount Ztujo, the value which becomes larger as the degree of the difference between the elevated temperature air-fuel ratio fluctuation indicating amount Ztup and the usual temperature air-fuel, ratio fluctuation indicating amount Ztujo becomes larger, as the imbalance determination parameter DX (step 2720 shown in FIG. 27); and determine that the inter-cylinder air-fuel-ratio imbalance state has occurred when the obtained imbalance determination parameter DX is larger than the predetermined imbalance determination threshold DXth, and determine that the inter-cylinder air-fuel-ratio imbalance state has not occurred when the obtained imbalance determination parameter DX is smaller than the predetermined imbalance determination threshold DXth (steps from step 2730 to step 2750, shown in FIG. 27).

Figure 11:
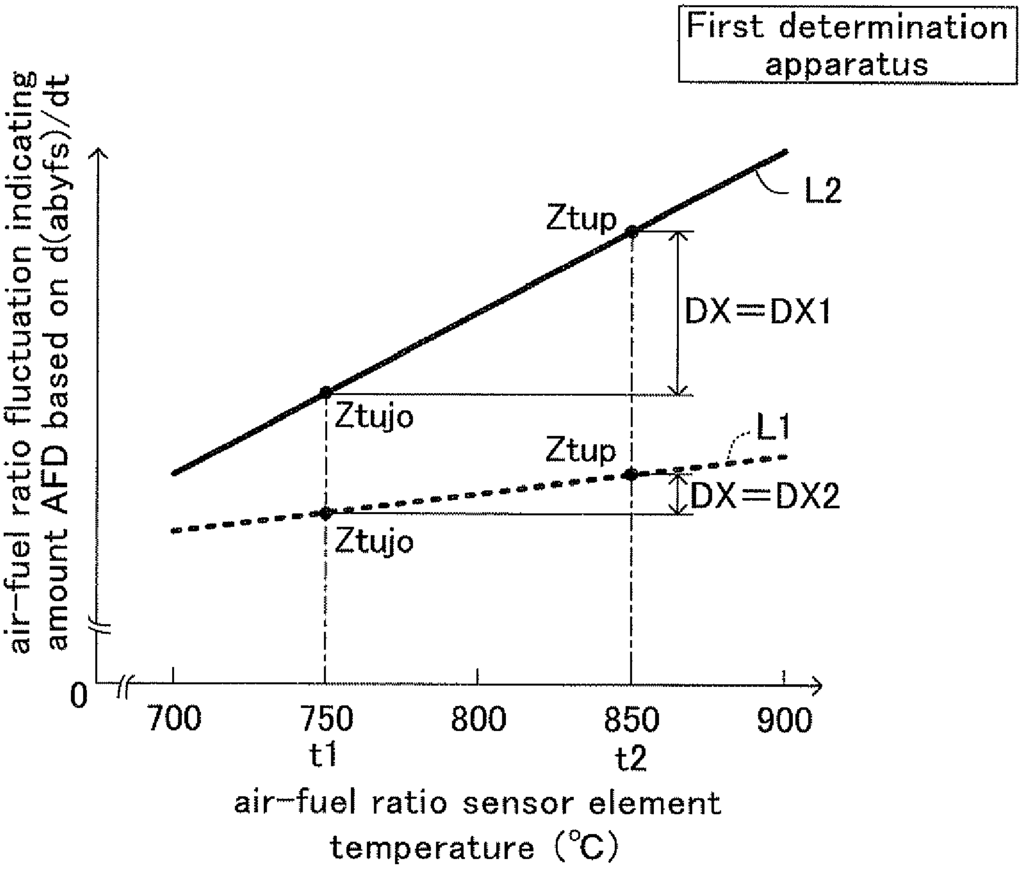
FIG. 11 is a graph showing a behavior of an air-fuel ratio fluctuation indicating amount with respect to the air-fuel ratio sensor element temperature.

As understood from FIG. 11, the value DX (e.g., DX=Ztup−Ztjujo), which becomes larger as the degree of the difference between the elevated temperature air-fuel ratio fluctuation indicating amount Ztup and the usual temperature air-fuel ratio fluctuation indicating amount Ztujo becomes larger, increases as the air-fuel ratio sensor element temperature becomes higher. Further, the value DX (=DX1) when the imbalance state is occurring (refer to the solid line L2) is larger than the value DX (=DX2) when the imbalance state is not occurring (refer to the broken line L1). In addition, the difference between the value DX1 and the value DX2 becomes larger as the difference between the elevated temperature (second temperature t2) and the usual temperature (first temperature t1) becomes larger.

Accordingly, as the sixth determination apparatus, when the values, each corresponding to the air-fuel ratio fluctuation indicating amounts, are obtained at the first temperature t1 as well as at the second temperature t2, and the imbalance determination is made based on the value which becomes larger as the degree of the difference between those values, each corresponding those air-fuel ratio fluctuation indicating amount (e.g., based on the difference DX between those values, or the ratio Ztup/Ztujo, etc.), the imbalance determination can be performed accurately.

It should be noted that the sixth determination apparatus obtains firstly the usual temperature air-fuel ratio fluctuation indicating amount Ztujo, and thereafter, obtains the elevated temperature air-fuel ratio fluctuation indicating amount Ztup, however, it may obtain firstly the elevated temperature air-fuel ratio fluctuation indicating amount Ztup, and thereafter, obtain the usual temperature air-fuel ratio fluctuation indicating amount Ztujo.

As described above, each of the determination apparatuses according to each of the embodiments of the present invention can obtain the imbalance determination parameter which can accurately represent the degree of the inter-cylinder air-fuel ratio imbalance state by elevating the temperature of the sensor element section of the air-fuel ratio sensor 67 when obtaining the imbalance determination parameter. Accordingly, each of the determination apparatuses according to each of the embodiments can accurately determine whether or not the inter-cylinder air-fuel ratio imbalance state has been occurring (has occurred).

The present invention is not limited to the above-described embodiments, and may be adopt various modifications within the scope of the present invention. For example, the air-fuel ratio fluctuation indicating amount AFD obtained as the imbalance determination parameter X, the elevated temperature air-fuel ratio fluctuation indicating amount Ztup, the usual temperature air-fuel ratio fluctuation indicating amount Ztujo, and the like" may be one of parameters described below.

(P1) The air-fuel ratio fluctuation indicating amount AFD may be a value corresponding to the trace/trajectory length of the output value Vabyfs of the air-fuel ratio sensor 67 (base indicating amount) or the trace/trajectory length of the detected air-fuel ratio abyfs (base indicating amount). For example, the trace length of the detected air-fuel ratio abyfs may be obtained by obtaining the output value Vabyfs every elapse of the definite sampling time ts, converting the output value Vabyfs into the detected air-fuel ratio abyfs, and integrating/accumulating an absolute value of a difference between the detected air-fuel ratio abyfs and a detected air-fuel ratio abyfs which was obtained the definite sampling time ts before.

It is preferable that the trace length be obtained every elapse of the unit combustion cycle period. An average of the trace lengths for a plurality of the unit combustion cycle periods (i.e., the value corresponding to the trace length) may also be adopted as the air-fuel ratio fluctuation indicating amount AFD. It should be noted that the trace length of the output value Vabyfs or the trace length of the detected air-fuel ratio abyfs has a tendency that they become larger as the engine rotational speed becomes higher. Accordingly, when the imbalance determination parameter based on the trace length is used for the imbalance determination, it is preferable that the imbalance determination threshold Xth be made larger as the engine rotational speed NE becomes higher.

(P2) The air-fuel ratio fluctuation indicating amount AFD may be obtained as a value corresponding to a base indicating amount which is obtained by obtaining a change rate of the change rate of the output value Vabyfs of the air-fuel ratio sensor 67 or a change rate of the change rate of the detected air-fuel ratio abyfs (i.e., a second-order differential value of each of those values with respect to time). For example, the air-fuel ratio fluctuation indicating amount AFD may be a maximum value of absolute values of the "second-order differential value ($d^2(Vabyfs)/dt^2$) of the output value Vabyfs of the air-fuel ratio sensor 67 with respect to time" in the unit combustion cycle period, or a maximum value of absolute values of the "second-order differential value ($d^2(abyfs)/dt^2$) of the detected air-fuel ratio abyfs represented by the output value Vabyfs of the upstream air-fuel ratio sensor 67 with respect to time" in the unit combustion cycle period.

For example, the change rate of the change rate of the detected air-fuel ratio abyfs may be obtained as follows.

The output value Vabyfs is obtained every elapse of the definite sampling time ts.

The output value Vabyfs is converted into the detected air-fuel ratio abyfs.

A difference between the detected air-fuel ratio abyfs and a detected air-fuel ratio abyfs obtained the definite sampling time ts before is obtained as the change rate of the detected air-fuel ratio abyfs.

A difference between the change rate of the detected air-fuel ratio abyfs and a change rate of the detected air-fuel ratio abyfs obtained the definite sampling time is before is obtained as the change rate of the change rate of the detected air-fuel ratio abyfs (second-order differential value ($d^2((abyfs)/dt^2$).

In this case, among a plurality of the change rates of the change rate of the detected air-fuel ratio abyfs, that are obtained during the unit combustion cycle period, a value whose absolute value is the largest may be selected as a representing value. In addition, such a representing value may be obtained for each of a plurality of the unit combustion cycle periods. Further, an average of a plurality of the representing values may be adopted as the air-fuel ratio fluctuation indicating amount AFD.

In addition, each of the determination apparatuses adopts the differential value d(abyfs)/dt (detected air-fuel ratio changing rate ΔAF) as the base indicating amount, and adopts, as the air-fuel ratio fluctuation indicating amount AFD, the value based on the average of the absolute values of the base indicating amounts in the unit combustion cycle period.

On the other hand, each of the determination apparatuses may obtain the differential value d(abyfs)/dt (detected air-fuel ratio changing rate ΔAF) as the base indicating amount, obtain a value P1 whose absolute value is the largest among the differential values d(abyfs)/dt, each of which is obtained in the unit combustion cycle period and has a positive value, obtain a value P2 whose absolute value is the largest among the differential values d(abyfs)/dt, each of which is obtained in the unit combustion cycle period and has a negative value, and adopt a value whichever larger between the value P1 and the value P2, as the base indicating amount. Then, the each of the determination apparatuses may adopt, as the air-fuel ratio fluctuation indicating amount AFD, a mean value of absolute values of the base indicating amounts that are obtained in a plurality of unit combustion cycle periods.

Furthermore, each of the determination apparatuses described above may be applied to a V-type engine. In such a case, the V-type engine may comprise, a right bank upstream catalyst disposed at a position downstream of an exhaust gas merging portion of two or more of cylinders belonging to a right bank (a catalyst disposed in the exhaust passage of the engine and at a position downstream of the exhaust gas merging portion into which the exhaust gases merge, the exhaust gases being discharged from chambers of at least two or more of the cylinders among a plurality of the cylinders), and a left bank upstream catalyst disposed at a position downstream of an exhaust gas merging portion of two or more of cylinders belonging to a left bank (a catalyst disposed in the exhaust passage of the engine and at a position downstream of the exhaust merging portion into which the exhaust gases merge, the exhaust gases being discharged from chambers of two or more of the cylinders among the rest of the at least two or more of the cylinders).

Further, the V-type engine may comprise an upstream air-fuel ratio sensor for the right bank and a downstream air-fuel ratio sensor for the right bank disposed upstream and downstream of the right bank upstream catalyst, respectively, and may comprise upstream air-fuel ratio sensor for the left bank and a downstream air-fuel ratio sensor for the left bank disposed upstream and downstream of the left bank upstream catalyst, respectively. Each of the upstream air-fuel ratio sensors, similarly to the air-fuel ratio sensor 67, is disposed between the exhaust gas merging portion of each of the banks and the upstream catalyst of each of the banks. In this case, a main feedback control for the right bank and a sub feedback for the right bank are performed based on the output values of the upstream air-fuel ratio sensor for the right bank and the downstream air-fuel ratio sensor for the right bank, and a main feedback control for the left bank and a sub feedback for the left bank are independently performed based on the output values of the upstream air-fuel ratio sensor for the left bank and the downstream air-fuel ratio sensor for the left bank.

Further, in this case, the determination apparatus may obtain "an air-fuel ratio fluctuation indicating amount AFD (an imbalance determination parameter X)" for the right bank based on the output value of the upstream air-fuel ratio sensor for the right bank, and may determine whether or not an inter-cylinder air-fuel ratio imbalance state has been occurring among the cylinders belonging to the right bank using those values.

Similarly, the determination apparatus may obtain "an air-fuel ratio fluctuation indicating amount AFD (an imbalance determination parameter X)" for the left bank based on the output value of the upstream air-fuel ratio sensor for the left bank, and may determine whether or not an inter-cylinder air-fuel ratio imbalance state has been occurring among the cylinders belonging to the left bank using those values.

In addition, each of the determination apparatuses may change the imbalance determination threshold Xth (including the high-side threshold XHith and the low-side threshold XLoth) in such a manner that the threshold Xth becomes larger as the intake air-flow rate Ga becomes larger. This is because the responsiveness of the air-fuel ratio sensor 67 becomes lower as the intake air-flow rate Ga becomes smaller due to the presence of the protective covers 67*b* and 67*c*.

Furthermore, it is preferable that the high-side threshold XHith be equal to or larger than the imbalance determination threshold Xth, and the low-side threshold XLoth be equal to or smaller than the imbalance determination threshold Xth. It should be noted that the high-side threshold XHith may be smaller than the imbalance determination threshold Xth, if it can be clearly determined that the inter-cylinder air-fuel ratio imbalance state has been occurring when the tentative parameter Xz is larger than the high-side threshold XHith. Similarly, the low-side threshold XLoth may be a value which allows the apparatus to clearly determine that the inter-cylinder air-fuel ratio imbalance state has not been occurring when the tentative parameter Xz is smaller than the low-side threshold XLoth.

Further, each of the determination apparatuses comprises indicated fuel injection amount control means for controlling the indicated fuel injection amount in such a manner that the air-fuel ratio of the mixture supplied to the combustion chambers of the two or more of the cylinders coincides with the target air-fuel ratio (routines shown in FIGS. 12 and 13). The instructed fuel injection amount control means includes air-fuel ratio feedback control means for calculating the air-fuel ratio feedback amount (DFi), based on the air-fuel ratio (detected air-fuel ratio abyfs) represented by the output value Vabyfs of the air-fuel ratio sensor 67 and the target air-fuel ratio abyfr, in such a manner that those values become equal to each other, and for determining (adjusting, controlling) the instructed fuel injection amount based on the air-fuel ratio feedback amount (DFi) (step 1240 shown in FIG. 12 and the routine shown in FIG. 13). In addition, the instructed fuel injection amount control means may be feedforward control means, for example, for determining (controlling), as the instructed fuel injection amount, a value obtained by dividing the in-cylinder intake air amount (air amount taken into a single cylinder per one intake stroke) Mc determined based on the intake air flow rate and the engine rotational speed by the target air-fuel ratio abyfr without including the air-fuel ratio feedback control means. That is, the air-fuel ratio feedback amount DFi shown in FIG. 12 may be set to (at) "0."

Furthermore, the heater control means of each of the determination apparatuses described above may be configured so as to set the heater duty Duty to 100% (i.e., to set the amount of energy supplied to the heater 678 to the maximum value) when the actual admittance Yact is smaller than the "value obtained by subtracting the predetermined positive value α from the target admittance Ytgt", set the heater duty Duty to "0" (i.e., to set the amount of energy supplied to the heater 678 to the minimum value) when the actual admittance Yact is larger than the "value obtained by adding the predetermined positive value α to the target admittance Ytgt", and set the heater duty Duty to a "predetermined value (e.g., 50%) larger than 0 and smaller than 100%" when the actual admittance Yact is between the "value obtained by subtracting the predetermined positive value α from the target admittance Ytgt"

and the "value obtained by adding the predetermined positive value α to the target admittance Ytgt."

The invention claimed is:

1. An inter-cylinder air-fuel ratio imbalance determination apparatus for an internal combustion engine, applied to a multi-cylinder internal combustion engine having a plurality of cylinders, comprising:

an air-fuel ratio sensor, which is disposed at a position in an exhaust merging portion of an exhaust passage of said engine into which exhaust gases discharged from at least two or more cylinders among a plurality of said cylinders merge or disposed in said exhaust passage at a position downstream of said exhaust merging portion, and which includes a solid electrolyte layer, an exhaust-gas-side electrode layer which is formed on one of surfaces of said solid electrolyte layer, a diffusion resistance layer which covers said exhaust-gas-side electrode layer and which said exhaust gases reach, an atmosphere-side electrode layer which is formed on the other one of said surfaces of said solid electrolyte layer, and a heater which heats a sensor element section including said solid electrolyte layer, said exhaust-gas-side electrode layer, and said atmosphere-side electrode layer, wherein, when a predetermined voltage is applied between said exhaust-gas-side electrode layer and said atmosphere-side electrode layer, said air-fuel ratio sensor outputs, based on a limiting current flowing through said solid electrolyte layer, an output value corresponding to an air-fuel ratio of an exhaust gas passing through said position at which said air-fuel ratio sensor is disposed;

a plurality of fuel injection valves, each of which is disposed in such a manner that it corresponds to each of said at least two or more of said cylinders, and each of which injects fuel, contained in an air-fuel mixture supplied to each of combustion chambers of said two or more of said cylinders, in an amount in accordance with an instructed fuel injection amount;

imbalance determining unit which is configured to:

control a temperature of said sensor element section to a first temperature using said heater during a parameter-obtaining-period in which a predetermined parameter obtaining condition is satisfied, and obtain, as a usual temperature air-fuel ratio fluctuation indicating amount, a value corresponding to an air-fuel ratio fluctuation indicating amount which becomes larger as a fluctuation of an air-fuel ratio of said exhaust gas passing through said position at which said air-fuel ratio sensor is disposed becomes larger;

control said temperature of said sensor element section to a second temperature higher than said first temperature using said heater during said parameter-obtaining-period, and obtain, as an elevated temperature air-fuel ratio fluctuation indicating amount, said value corresponding to said air-fuel ratio fluctuation indicating amount which becomes larger as said fluctuation of said air-fuel ratio of said exhaust gas passing through said position at which said air-fuel ratio sensor is disposed becomes larger; and obtain, based on said elevated temperature air-fuel ratio fluctuation indicating amount and said usual temperature air-fuel ratio fluctuation indicating amount, a value which becomes larger as a degree becomes larger of a difference between said elevated temperature air-fuel ratio fluctuation indicating amount and said usual temperature air-fuel ratio fluctuation indicating amount, as an imbalance determination parameter, and determine that an inter-cylinder air-fuel-ratio imbalance state has occurred when said obtained imbalance determination parameter is larger than a predetermined imbalance determination threshold, and determine that said inter-cylinder air-fuel-ratio imbalance state has not occurred when said obtained imbalance determination parameter is smaller than said imbalance determination threshold.

2. An inter-cylinder air-fuel ratio imbalance determination apparatus for an internal combustion engine, applied to a multi-cylinder internal combustion engine having a plurality of cylinders, comprising:

an air-fuel ratio sensor, which is disposed at a position in an exhaust merging portion of an exhaust passage of said engine into which exhaust gases discharged from at least two or more cylinders among a plurality of said cylinders merge or disposed in said exhaust passage at a position downstream of said exhaust merging portion, and which includes a solid electrolyte layer, an exhaust-gas-side electrode layer which is formed on one of surfaces of said solid electrolyte layer, a diffusion resistance layer which covers said exhaust-gas-side electrode layer and which said exhaust gases reach, an atmosphere-side electrode layer which is formed on the other one of said surfaces of said solid electrolyte layer, and a heater which heats a sensor element section including said solid electrolyte layer, said exhaust-gas-side electrode layer, and said atmosphere-side electrode layer, wherein, when a predetermined voltage is applied between said exhaust-gas-side electrode layer and said atmosphere-side electrode layer, said air-fuel ratio sensor outputs, based on a limiting current flowing through said solid electrolyte layer, an output value corresponding to an air-fuel ratio of an exhaust gas passing through said position at which said air-fuel ratio sensor is disposed;

a plurality of fuel injection valves, each of which is disposed in such a manner that it corresponds to each of said at least two or more of said cylinders, and each of which injects fuel, contained in an air-fuel mixture supplied to each of combustion chambers of said two or more of said cylinders, in an amount in accordance with an instructed fuel injection amount;

heater control unit which is configured to control an amount of heat generation by said heater;

imbalance determining unit which is configured to obtain, based on said output value of said air-fuel ratio sensor, an imbalance determination parameter which becomes larger as a fluctuation of an air-fuel ratio of said exhaust gas passing through said position at which said air-fuel ratio sensor is disposed becomes larger, in a parameter-obtaining-period which is a period in which a predetermined parameter obtaining condition is being satisfied, to determine that an inter-cylinder air-fuel ratio imbalance state has occurred when said obtained imbalance determination parameter is larger than a predetermined imbalance determination threshold, and to determine that said inter-cylinder air-fuel ratio imbalance state has not occurred when said obtained imbalance determination parameter is smaller than said imbalance determination threshold;

wherein, said imbalance determining unit is configured to make the heater control unit perform a sensor element section temperature elevating control to have a temperature of said air-fuel ratio sensor element for said parameter-obtaining-period be higher than a temperature of said air-fuel ratio sensor element for a period other than said parameter-obtaining-period.

3. The inter-cylinder air-fuel ratio imbalance determination apparatus according to claim 2, wherein said imbalance determining unit is configured to:

obtain, based on said output value of said air-fuel ratio sensor, said imbalance determination parameter as a tentative parameter before having said heater control unit perform said sensor element section temperature elevating control in said parameter-obtaining-period;

determine that said inter-cylinder air-fuel ratio imbalance state has been occurred when said obtained tentative parameter is larger than a predetermined high-side threshold;

determine that said inter-cylinder air-fuel ratio imbalance state has not occurred when said obtained tentative parameter is smaller than a low-side threshold which is smaller by a predetermined value than said high-side threshold;

withhold a determination as to whether or not said inter-cylinder air-fuel-ratio imbalance state has occurred when said obtained tentative parameter is between said high-side threshold and said low-side threshold;

have said heater control unit perform said sensor element section temperature elevating control during said parameter-obtaining-period, and obtain, based on said output value of said air-fuel ratio sensor, said imbalance determination parameter as a final parameter, while said determination as to whether or not said inter-cylinder air-fuel-ratio imbalance state has occurred is being withheld; and determine that said inter-cylinder air-fuel-ratio imbalance state has occurred when said obtained final parameter is larger than said imbalance determination threshold, and determine that said inter-cylinder air-fuel-ratio imbalance state has not occurred when said obtained final parameter is smaller than said imbalance determination threshold.

4. The inter-cylinder air-fuel ratio imbalance determination apparatus according to claim 2, wherein said imbalance determining unit is configured to have said heater control unit start to perform said sensor element section temperature elevating control at a point in time at which a warming-up of said engine is completed after a start of said engine, and have said heater control unit finish said sensor element section temperature elevating control at a point in time at which obtaining said imbalance determination parameter is completed.

5. The inter-cylinder air-fuel ratio imbalance determination apparatus according to claim 2, wherein said heater control unit is configured to control said amount of heat generation of said heater in such a manner that a difference between a value corresponding to an actual admittance of said solid electrolyte layer and a target value is decreased, and to realize said sensor element section temperature elevating control by making said target value while said sensor element section temperature elevating control is being performed different from said target value while said sensor element section temperature elevating control is not being performed; and said imbalance determining unit is configured to determine whether or not said air-fuel ratio has deteriorated with age, and obtain, when it is determined that said air-fuel ratio has deteriorated with age, said imbalance determination parameter without performing said sensor element section temperature elevating control even when said sensor element section temperature elevating control should be performed.

6. The inter-cylinder air-fuel ratio imbalance determination apparatus according to claim 2, wherein, said air-fuel ratio detecting section of said air-fuel ratio sensor includes a catalytic section which accelerates an oxidation-reduction reaction and has an oxygen storage function, and said air-fuel ratio sensor is configured to have said exhaust gas passing through said exhaust passage reach said diffusion resistance layer through said catalytic section.

7. The inter-cylinder air-fuel ratio imbalance determination apparatus according to claim 2, wherein said imbalance determining unit is configured to start to obtain said imbalance determination parameter after a predetermined delay time has elapsed since a point in time at which said sensor element section temperature elevating control was started.

8. The inter-cylinder air-fuel ratio imbalance determination apparatus according to claim 7, wherein said imbalance determining unit is configured to set said predetermined delay time in such a manner that said delay time is shorter as a temperature of said exhaust gas is higher.

9. The inter-cylinder air-fuel ratio imbalance determination apparatus according to claim 7, wherein said imbalance determining unit is configured to set said predetermined delay time in such a manner that said delay time is shorter as an intake air flow rate of said engine or a load of said engine is greater.

10. The inter-cylinder air-fuel ratio imbalance determination apparatus according to claim 2, wherein, said air-fuel ratio sensor further comprises a protective cover, which accommodates said air-fuel ratio detecting section to cover said air-fuel ratio detecting section in its inside, and which includes an inflow hole for allowing said exhaust gas flowing through said exhaust passage to flow into said inside and an outflow hole for allowing said exhaust gas which has flowed into said inside to flow out to said exhaust passage.

11. The inter-cylinder air-fuel ratio imbalance determination apparatus according to claim 10, wherein, said imbalance determining unit is configured to obtain, as a base indicating amount, a time differential value of said output value of said air-fuel ratio sensor or of a detected air-fuel ratio represented by said output value, and obtain said imbalance determination parameter based on said obtained base indicating amount.

12. The inter-cylinder air-fuel ratio imbalance determination apparatus according to claim 10, wherein, said imbalance determining unit is configured to obtain, as a base indicating amount, a time second-order differential value of said output value of said air-fuel ratio sensor or of a detected air-fuel ratio represented by said output value, and obtain said imbalance determination parameter based on said obtained base indicating amount.

* * * * *